(12) United States Patent
Stapleton et al.

(10) Patent No.: US 11,601,266 B1
(45) Date of Patent: Mar. 7, 2023

(54) SYSTEMS AND METHODS FOR QUANTUM CONSENSUS

(71) Applicant: Wells Fargo Bank, N.A., San Francisco, CA (US)

(72) Inventors: Jeff J. Stapleton, O'Fallon, MO (US); Robert L. Carter, Jr., Pleasant Hill, IA (US); Pierre Arbajian, Matthews, NC (US); Bradford A. Shea, Mint Hill, NC (US); Peter Bordow, Fountain Hills, AZ (US); Michael Erik Meinholz, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 596 days.

(21) Appl. No.: 16/787,619

(22) Filed: Feb. 11, 2020

(51) Int. Cl.
*H04L 9/08* (2006.01)
*G06N 10/00* (2022.01)
(Continued)

(52) U.S. Cl.
CPC ............ *H04L 9/0852* (2013.01); *G06F 21/72* (2013.01); *G06N 10/00* (2019.01); *H04L 9/14* (2013.01);
(Continued)

(58) Field of Classification Search
CPC ....... H04L 9/0662; H04L 9/08; H04L 9/0816; H04L 9/0819; H04L 9/0827;
(Continued)

(56) References Cited

U.S. PATENT DOCUMENTS

| | | | |
|---|---|---|---|
| 8,885,828 B2* | 11/2014 | Wiseman | ............... H04L 9/065 380/278 |
| 2014/0068765 A1* | 3/2014 | Choi | ................... H04L 63/1416 726/23 |

(Continued)

OTHER PUBLICATIONS

Zeng, Guihua, and Weiping Zhang. "Identity verification in quantum key distribution." 2000, Physical Review A 61.2 (2000): 022303. (Year: 2000).*

(Continued)

*Primary Examiner* — Jeremy S Duffield
(74) *Attorney, Agent, or Firm* — Womble Bond Dickinson (US) LLP

(57) ABSTRACT

Systems, apparatuses, and methods are disclosed for quantum entanglement authentication (QEA). An example method includes receiving, by a first computing device, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles, receiving, from the second computing device, a first number and a fourth number, generating, by the first computing device, a third number based on the first subset of the first set of entangled quantum particles, and authenticating, by session authentication circuitry of the first computing device, in an instance in which the third number corresponds to the first number and the fourth number corresponds to the second number, a session between the first computing device and the second computing device.

20 Claims, 10 Drawing Sheets

(51) Int. Cl.
*H04L 9/40* (2022.01)
*H04L 9/14* (2006.01)
*G06F 21/72* (2013.01)

(52) U.S. Cl.
CPC ...... *H04L 63/0435* (2013.01); *H04L 63/0442* (2013.01)

(58) Field of Classification Search
CPC ... H04L 9/0838; H04L 9/0852; H04L 9/0855; H04L 9/0858; H04L 9/0861; H04L 9/0869; H04L 9/3226; H04L 63/08; H04L 63/0869; H04L 63/06; H04L 63/061; G06N 10/00; H04B 10/70; G06F 7/582; G06F 7/588
See application file for complete search history.

(56) References Cited

U.S. PATENT DOCUMENTS

2015/0222619 A1\* 8/2015 Hughes ................ H04L 63/083
 713/168
2019/0103962 A1\* 4/2019 Howe .................. G06F 21/606

OTHER PUBLICATIONS

X. Liu and M. Nie, "Quantum Secure Direct Communication Protocol Based on Entangled State and Quantum State," 2012 International Conference on Industrial Control and Electronics Engineering, 2012, pp. 828-831. (Year: 2012).\*

\* cited by examiner

380

SYSTEMS AND METHODS FOR QUANTUM CONSENSUS

TECHNOLOGICAL FIELD

Example embodiments of the present disclosure relate generally to cryptography and, more particularly, to systems and methods for quantum cryptography.

BACKGROUND

Session authentication may describe various techniques for securing electronic communications between two computing devices, such as a server device and a client device, using a unique session key. Selecting a session key that cannot be guessed is thus an important element of preventing attacks whereby a perpetrator derives the session key and then uses it to intercept communications by tapping into the communication path between the server device and the client device. This security concern is amplified in high volume session authentication systems designed to authenticate multiple sessions between multiple computing devices, such as multiple server devices and multiple client devices, at any given time.

Generating session keys to be used in session authentication often relies upon the use of pseudo-random number generation. While often referred to as "random number generation," generating truly random numbers historically has been difficult, and tools for "random" number generation have usually employed procedures whose outputs can be reproduced if certain underlying inputs are known. And while historically such pseudo-random number generation has been sufficient to generate session keys that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, to include the threat of quantum computing. Accordingly, because perpetrators have a greater ability to determine the method by which a session key is pseudo-randomly generated, those perpetrators may replicate the method to generate the same session key, and then break into a user's session.

BRIEF SUMMARY

Computing systems, computing apparatuses, computer-implemented methods, and computer program products are disclosed herein for quantum one-time pad generation, quantum entanglement random number generation (QERNG), and quantum entanglement authentication (QEA) for improved session authentication and post-quantum cryptography (PQC) that, in some instances, facilitate the migration of classical information systems to quantum-resistant information systems using one or more of the techniques described herein. In some embodiments, the QEA system provided herein solves the above problems by measuring entangled quantum particles in order to generate truly random duplicate session keys or seeds for a pseudo-random number generation process used to establish a secure session between two physically distant computing devices.

In one example embodiment, a system is provided for QEA. The system may comprise quantum cryptographic circuitry, classical communications circuitry, and session authentication circuitry. In some embodiments, the classical communications circuitry may be configured to receive, by a first computing device, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles; and receive, from the second computing device, a first number and a fourth number. In some embodiments, the session authentication circuitry may be configured to generate a third number based on the first subset of the first set of entangled quantum particles and authenticate, in an instance in which the third number corresponds to the first number and the fourth number corresponds to the second number, a session between the first computing device and the second computing device. In some embodiments, the classical communications circuitry may be further configured to receive, from the second computing device, a second session key, the second session key being a function of the first number and a fourth number, the fourth number having been provided to the second computing device in response to a measurement initiation control signal comprising the second electronic identification of the second subset of a first set of entangled quantum particles. In some embodiments, the classical communications circuitry may be further configured to authenticate a session between the first computing device and the second computing device in an instance in which a first session key, generated at the first computing device based on the second number and the third number, corresponds (e.g., is complimentary), or is identical to the second session key.

In another example embodiment, an apparatus is provided for QEA. The apparatus may comprise a classical communications device configured to receive a request to authenticate a session between the first computing device and the second computing device. The system may further comprise a quantum cryptographic device configured to receive, by a first computing device, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles; and receive, from the second computing device, a first number and a fourth number. In some embodiments, the session authentication circuitry may be configured to generate a third number based on the first subset of the first set of entangled quantum particles and authenticate, in an instance in which the third number corresponds to the first number and the fourth number corresponds to the second number, a session between the first computing device and the second computing device. In some embodiments, the classical communications circuitry may be further configured to receive, from the second computing device, a second session key, the second session key being a function of the first number and a fourth number, the fourth number having been provided to the second computing device in response to a measurement initiation control signal comprising the second electronic identification of the second subset of a first set of entangled quantum particles. In some embodiments, the classical communications circuitry may be further configured to authenticate a session between the first computing device and the second computing device in an instance in which a first session key, generated at the first computing device based on the second number and the third number, corresponds (e.g., is complimentary), or is identical to the second session key.

In another example embodiment, a method is provided for quantum entanglement authentication. The method may comprise receiving a request to authenticate a session between the first computing device and the second computing device, receiving, by a first computing device, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles; and receiving, from the second computing device, a first number and a fourth number. In some embodiments, the method may further comprise generating a third number based on the first subset of the first set of entangled quantum particles and authenticating, in an instance in which the third number corresponds to the first number and the fourth number corresponds to the second number, a session between the first computing device and the second computing device. In some embodiments, the method may further comprising receiving, from the second computing device, a second session key, the second session key being a function of the first number and a fourth number, the fourth number having been provided to the second computing device in response to a measurement initiation control signal comprising the second electronic identification of the second subset of a first set of entangled quantum particles. In some embodiments, the method may further comprise authenticating a session between the first computing device and the second computing device in an instance in which a first session key, generated at the first computing device based on the second number and the third number, corresponds (e.g., is complimentary), or is identical to the second session key.

In another example embodiment, a computer program product is provided for quantum entanglement authentication. The computer program product comprises at least one non-transitory computer-readable storage medium storing program instructions that, when executed, may cause a system to receive, by classical communications circuitry, a request to authenticate a session between the first computing device and the second computing device, in response to receipt of the request, receive, by a first computing device, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles; and receive, from the second computing device, a first number and a fourth number. In some embodiments, the computer program product may further comprise a computer-readable storage medium storing program instructions that, when executed, may cause the system to generate a third number based on the first subset of the first set of entangled quantum particles and authenticate, in an instance in which the third number corresponds to the first number and the fourth number corresponds to the second number, a session between the first computing device and the second computing device. In some embodiments, the computer program product may further comprise a computer-readable storage medium storing program instructions that, when executed, may cause the system to receive, from the second computing device, a second session key, the second session key being a function of the first number and a fourth number, the fourth number having been provided to the second computing device in response to a measurement initiation control signal comprising the second electronic identification of the second subset of a first set of entangled quantum particles. In some embodiments, the computer program product may further comprise a computer-readable storage medium storing program instructions that, when executed, may cause the system to authenticate a session between the first computing device and the second computing device in an instance in which a first session key, generated at the first computing device based on the second number and the third number, corresponds (e.g., is complimentary), or is identical to the second session key.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
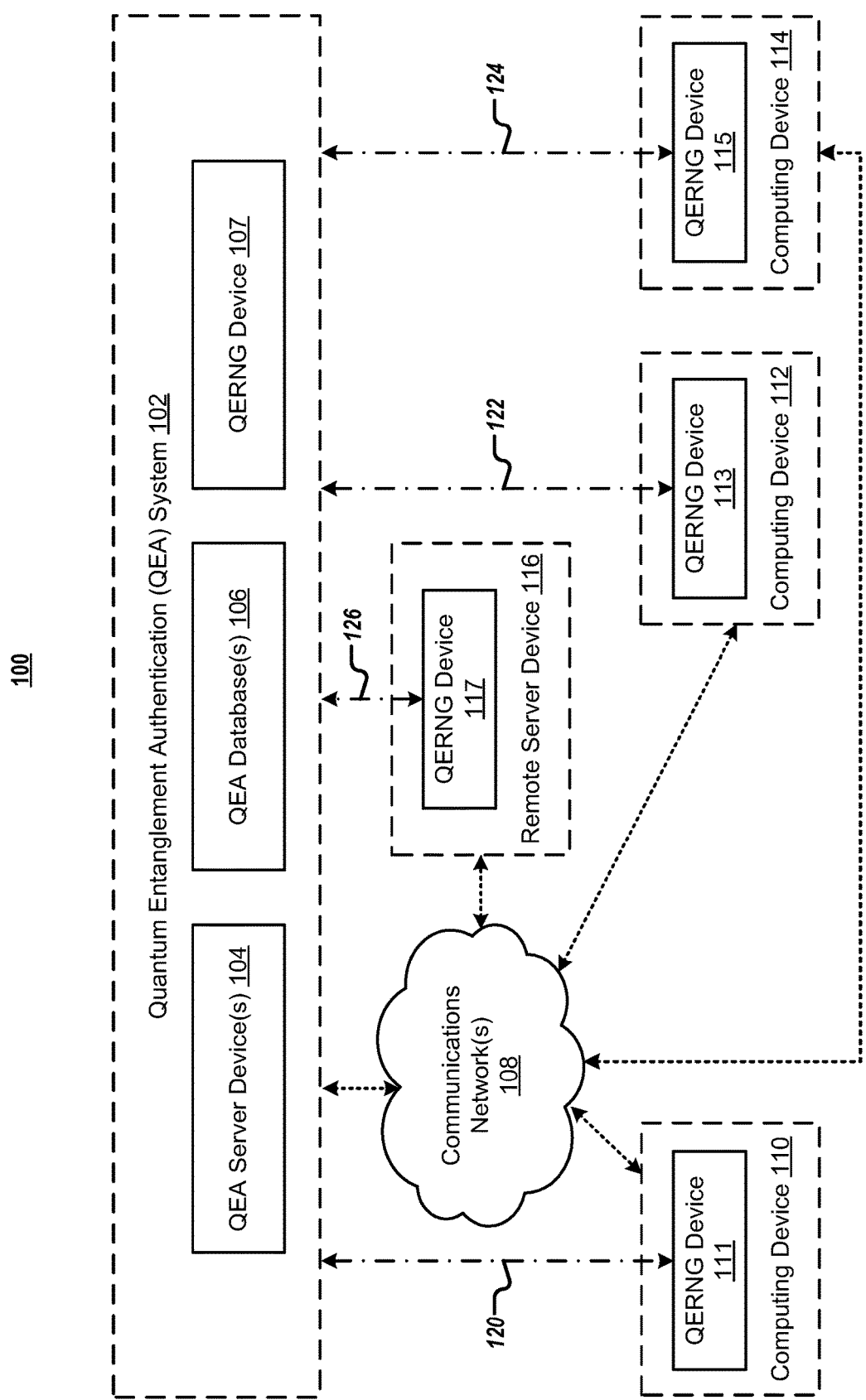
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for facilitating various combinations of quantum entanglement random number generation (QERNG), quantum entanglement authentication (QEA), and post-quantum cryptography (PQC) to secure communications channels between computing devices. Traditionally, it has been very difficult to select or generate a robust session key (e.g., a unique number that is unlikely to be guessed or deciphered by a third party). In addition, there is typically no way to prove that the session key is unattainable by a third-party perpetrator. In an attempt to transmit session keys that are unattainable by a perpetrator, quantum key distribution (QKD) systems have been developed. In general terms, QKD systems exchange keys between two parties in a secure way that cannot be guessed. For instance, a one-time pad quantum key exchange is impenetrable because a potential perpetrator eavesdropping on the transmission of a set of qubits representing a key will necessarily induce errors in the set of qubits due to quantum uncertainty, alerting the two parties to the attempted eavesdropping.

As further noted above, methods, apparatuses, systems, and computer program products are described herein that provide for migrating classical information systems to quantum-resistant information systems using one or more of the PQC cryptographic techniques described herein. Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities. However, this heightened interest and investment has yet to produce an enduring and functional quantum computer outside of a laboratory environment.

Nonetheless, there is widespread agreement among experts that quantum computers will disrupt current security protocols that protect global financial markets and governmental institutions. For example, most common public-key cryptography schemes, such as the widely-used Rivest-Shamir-Adleman (RSA) and Diffie-Hellman (DH) schemes, rely on the inability of classical computers to complete certain types of complex mathematical calculations, such as integer factorization and discrete logarithm computation, respectively, within a reasonable amount of time. A quantum computer implementing Shor's algorithm potentially could complete these complex calculations in a relatively short time and thereby determine the private keys used for current public-key systems from the corresponding public keys. Accordingly, there is an urgent need for data owners and hosting services to begin migrating their data and upgrading their systems to use quantum-resistant algorithms before quantum computing capabilities are realized. However, the sheer volume of this data and complexity of these systems presents myriad challenges to any such migration plan.

Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern hybrid cryptosystem is the Transport Layer Security (TLS) protocol, which relies on asymmetric cryptography for authentication and key management to establish session keys, and symmetric cryptography for session encryption and integrity validation. For example, a traditional cryptosystem may encrypt a symmetric session key using an asymmetric cryptographic algorithm.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support a doubled key length (e.g., AES supports doubling a 128-bit key to 256 bits), doubling the key length of the symmetric cryptographic key may provide sufficient protection against Grover's algorithm because a brute-force attack on a 2N-bit symmetric cryptographic key would require about 2 iterations. For example, a 256-bit symmetric cryptographic key (e.g., AES-256) may only provide 128 bits of security in a quantum computing environment. However, any migration plan that involves doubling the key length of the symmetric cryptographic key must also evaluate the impact of the doubled key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data.

These risks are amplified by the lengthy data retention requirements (e.g., security shelf-life) mandated by government agencies, such as the U.S. Federal Deposit Insurance Corporation (FDIC). Example data retention requirements for various classes of data records listed in the FDIC's Records Retention Schedule are shown below in Table 1.

TABLE 1

Example data retention requirements for various classes of data records listed in the FDIC's Records Retention Schedule.

| Record Class | Data Retention Requirement (also referred to as "security shelf-life") |
|---|---|
| Tax Information | 7 years |
| Mortgages | 30 Years |
| Auto Loans | 6 years |
| Equal Credit Opportunity Act | 25 months |
| Truth in Lending Act | 2 years |
| Bank Secrecy Act | 5 years |
| FDIC Activities | Permanent |
| Personnel Management (PER4100) | 56 years |
| Non-Judicial Matters (LAW1330) Judicial Matters (LAW1400) | Close of Matter + 10 years Entry of Criminal Restitution + 20 years |

Given that data is a highly valuable asset, especially in the financial industry, there is an urgent need for data owners and hosting services to initiate the process of protecting their valuable customer information and digital assets even before quantum computing capabilities are realized. This process primarily involves migrating data and systems to algorithms that are thought to be quantum-resistant. In an attempt to promulgate quantum-resistant algorithms, the National Institute of Standards and Technology (NIST), a federal agency within the U.S. Department of Commerce, has initiated the NIST Post-quantum Cryptography Standardization Process to solicit, evaluate, and standardize one or more quantum-resistant public-key cryptographic algorithms. At present, there are many different candidate cryptographic algorithms believed to be quantum-resistant. However, because the standardization process is not yet complete, migration of classical systems to any one of NIST's candidate cryptographic algorithms could later compound the computational and resource burden on data owners and hosting services if NIST does not select that particular cryptographic algorithm as the standard or makes changes to the proposed cryptographic algorithms.

Although some quantum-resistant cryptographic algorithms are available today, those algorithms may not be the algorithm, or a variant of the algorithm, that eventually is approved as part of the NIST Post-quantum Cryptography Standardization Process. Moreover, the adoption of these algorithms will, in some instances, be an overly complex and time-consuming process. First, this migration process is challenging due to the sheer volume of data consumed by these systems, as well as the general complexity of the systems. For example, financial services providers and their partners each may have data for millions of customers and trillions of transactions stored in various databases. In addition, these providers are processing millions of transactions on a daily basis and adding new customer data to their systems. Second, data is stored in more places than ever before and must be encrypted using different cryptographic keys depending upon whether the data is going to be protected while in transit, while at rest in-cloud, or while at rest on-premises. Governmental regulations, NIST recommendations, and industry standards and best practices will, in some instances, drive the cryptographic techniques that are used to encrypt the data. Third, many organizations use several types of encryption, hashing, and other cryptographic algorithms with varying security architecture depending on the needs of the data owner or hosting service. Fourth, as shown in Table 1 above, there is the need to protect data for varying durations to manage legal and regulatory risk, sometimes as long as twenty to thirty years, and even in some cases for over fifty years. Fifth, the deployment of fundamental changes to infrastructure might take a decade or more, and there is very little tolerance for incurring risk while deploying changes. All of these considerations introduce additional levels of complexity, and thus data owners and hosting services must methodically migrate their cryptographic infrastructure to quantum-resistant cryptography. In addition, the cryptography transition is challenging because it is not restricted only to algorithms and key lengths. Rather, the cryptography transition is impacted by several other details of security infrastructure, such as interoperability, integration with existing systems and security architectures, scalability, compliance and regulatory requirements, maintenance, and backward compatibility requirements.

In contrast to these conventional QKD systems for transmitting secret keys securely, the present disclosure relates to a mechanism for generating duplicate, unique keys at physically separate computing devices in the first place based on quantum entanglement random numbers. To do this, in some embodiments, a QEA system generates two sets of entangled quantum particles, transmits the first set of entangled quantum particles to a first computing device, and transmits the second set of entangled quantum particles to a second computing device. In some instances, each set of entangled quantum particles may be referred to herein as a "quantum one-time pad."

In some embodiments, a first quantum authentication device may comprise a first quantum one-time pad comprising the first set of entangled quantum particles, and a second quantum authentication device may comprise a second quantum one-time pad comprising the second set of entangled quantum particles. For example, the QEA system may transmit the first set of entangled quantum particles to a first quantum authentication device configured to communicatively couple to the first computing device, and transmit the second set of entangled quantum particles to a second quantum authentication device configured to communicatively couple to the second computing device. In another example, the QEA system may store the first set of entangled quantum particles in a first quantum storage device accessible to the first computing device, and store the second set of entangled quantum particles in a second quantum storage device accessible to the second computing device.

In some embodiments, the QEA system may store each set of entangled quantum particles in a set of quantum storage cells disposed in a portable quantum authentication device. Each quantum authentication device then may be transported to a respective computing device and communicatively coupled (e.g., through a quantum communications interface, a classical communications interface, an application programming interface (API), or a combination thereof) to the computing device for use in quantum one-time pad generation, QERNG, QEA, PQC, or a combination thereof. Accordingly, each entangled quantum particle in the first set of entangled quantum particles associated with (e.g., stored in, maintained by) the first computing device is entangled with a respective entangled quantum particle in a second set of entangled quantum particles associated with the second computing device. In some embodiments, each quantum authentication device may have a height:width:length dimension ratio of about 3:2:1. For example, each quantum authentication device may have dimensions of about 57 mm by 21 mm by 11 mm (e.g., similar to the dimensions of a universal serial bus (USB) memory stick).

In some embodiments, the present disclosure relates to a QEA system configured to provide QERNG by generating a quantum entanglement random number at a first computing device and a duplicate of the quantum entanglement random number at a second computing device without the quantum entanglement random number having been transmitted to, or otherwise shared with, the second computing device. For example, the QEA system may be configured to generate a quantum entanglement random number based on a subset of a first set of entangled quantum particles associated with a first computing device. Each entangled quantum particle in the first set of entangled quantum particles may be entangled with a respective entangled quantum particle in a second set of entangled quantum particles associated with a second computing device. In some embodiments, the QEA system may further be configured to generate a cryptographic key based on the quantum entanglement random number, encrypt an electronic communication based on the cryptographic key, and transmit the encrypted electronic communication to the second computing device. Subsequently, the second computing device may decrypt the electronic communication based on a duplicate of the cryptographic key generated based on the duplicate of the quantum entanglement random number without the cryptographic key having been transmitted to, or otherwise shared with, the second computing device.

In some embodiments, when the first computing device requests to authenticate a session with the second computing device, the first computing device may generate a first quantum entanglement random number (e.g., a cryptovalue) based on a subset of the first set of entangled quantum particles and transmit an electronic identification of the subset of the first set of entangled quantum particles to the second computing device. For example, the first computing device may measure the subset of the first set of entangled quantum particles based on a set of quantum bases, thereby destroying their quantum entanglement with a respective subset of the second set of entangled quantum particles and causing the states of all of those quantum particles to collapse onto identical, or correlated, values. The first computing device then may generate the first quantum entanglement random number based on the measured subset of the first set of entangled quantum particles. The electronic identification of the subset of the first set of entangled quantum particles may comprises the set of quantum bases.

The second computing device may receive the electronic identification of the subset of the first set of entangled quantum particles and the set of quantum bases. In response, the second computing device may generate a second quantum entanglement random number, wherein the second quantum entanglement random number is a duplicate of the first quantum entanglement random number, based on a subset of the second set of entangled quantum particles that corresponds to the subset of the first set of entangled quantum particles identified by the electronic identification received from the first computing device. For example, the second computing device may measure the subset of the second set of entangled quantum particles based on the set of quantum bases that corresponds to the set of quantum bases identified by the electronic identification received from the first computing device. Because quantum entanglement was destroyed when the first computing device measured the subset of the first set of entangled quantum particles, the states of the corresponding subset of the second set of entangled quantum particles collapsed onto values that are identical, or correlated, to the values of the subset of the first set of entangled quantum particles. The second computing device then may generate the second quantum entanglement random number based on the measured subset of the second set of entangled quantum particles. The second computing device then may transmit the second quantum entanglement random number to the first computing device.

The first computing device may receive the second quantum entanglement random number from the second computing device, and, in an instance in which the second quantum entanglement random number corresponds (e.g., is complimentary), or is identical, to the first quantum entanglement random number, authenticate a session between the first computing device and the second computing device.

In some instances, the first quantum entanglement random number and the second quantum entanglement random number may be an identical true random number that may be used to generate a session key or a random seed (e.g., a set of bits that is randomized due to quantum effects such as the principle of quantum uncertainty) for pseudorandom number generation used to establish a secure session. The nature of quantum uncertainty and the indeterminacy of quantum states establishes that measuring entangled quantum particles using different quantum bases, or even the same quantum basis, will generate bits that have some probability of being different than each other. As such, by ensuring that different quantum bases are used when measuring at least some of the entangled quantum particles in a measured subset of entangled quantum particles, the QEA system disclosed herein introduces randomness in the measured quantum particles based on quantum uncertainty and the indeterminacy of quantum states. This randomness can then prevent the reproduction of session keys by malicious attackers. However, quantum entanglement and wave function collapse will ensure that the session keys measured by the first computing device are accurately reproduced at the second computing device at speeds that are, in effect, faster than the speed of light.

Further, in contrast to conventional cryptographic systems, the present disclosure relates to a QEA system that mitigates the vulnerability of traditional cryptographic algorithms by providing techniques for migrating enormous volumes of data and complex IT systems to PQC technologies and platforms that are not vulnerable to attack by a quantum computer. The term "PQC" refers to cryptosystems which are, or are considered to be, resistant to attacks that use a quantum computer for cryptanalysis, wherein the PQC cryptosystems use QEA to generate duplicate cryptographic values at physically distant computing devices.

In some embodiments, the present disclosure relates to a QEA system configured to provide for, among other features disclosed herein, QERNG, QEA, PQC, or a combination thereof based on quantum entanglement random numbers. In some embodiments, two synchronized computing devices may receive pairs of entangled quantum particles, such as entangled quantum bits (qubits), measure those entangled quantum particles and then generate identical true random numbers at a predetermined frequency, such as once per minute, based on the measured quantum particles.

In some embodiments, the present disclosure relates to a QEA system configured to provide for QERNG based on various techniques described herein. In some embodiments, the QEA system disclosed herein provides for (i) measuring entangled quantum particles at a first computing device to generate true random numbers and (ii) measuring the corresponding entangled quantum particles at a second computing device to generate identical true random numbers based on the principle of quantum entanglement. In some embodiments, the QEA system disclosed herein provides for measuring corresponding entangled quantum particles at a second computing device to generate a duplicate of a true random number that was generated by measuring entangled quantum particles at a first computing device. In some embodiments, the QEA system disclosed herein provides for using the true random number and its duplicate, which was generated by independent measurement at a second computing device, as symmetric cryptographic keys for encrypting and decrypting electronic communications transmitted between the first computing device and the second computing device.

In one illustrative example, the QEA system may provide an example method for QERNG by generating pairs of entangled quantum particles, transmitting the first entangled quantum particle in each pair of entangled quantum particles to a first computing device, and transmitting the second entangled quantum particle in each pair of entangled quantum particles to a second computing device. The example method then involves measuring, by the first computing device, one or more quantum particles in the first set of entangled quantum particles using one or more measurement bases (e.g., one or more quantum bases) to generate a first set of measured quantum particles. The example method then involves generating a first quantum entanglement random number based on the first set of measured quantum particles.

The measurement of the one or more quantum particles in the first set of entangled quantum particles breaks the entanglement between each pair of entangled quantum particles, causing the corresponding quantum particles in the second set of entangled quantum particles to become perfectly correlated (or anti-correlated, depending on the type of quantum particle used) with the measured quantum particles in the first set of quantum particles when measured using the same measurement basis for each of those quantum particles. Accordingly, the example method then involves measuring, by the second computing device, the one or more corresponding entangled quantum particles in the second set of entangled quantum particles using the same one or more measurement bases to generate a second set of measured quantum particles that is correlated (or anti-correlated) to the first set of measured quantum particles. The example method then involves generating a second quantum entanglement random number based on the second set of measured quantum particles. The second quantum entanglement random number will be identical to the first quantum entanglement random number without the quantum entanglement random number having been transmitted to, or otherwise shared with, the second computing device. Thus, the QEA system disclosed herein may utilize the true random number and its duplicate, which was generated by independent measurement at a second computing device, as symmetric cryptographic keys for encrypting and decrypting electronic communications transmitted between the first computing device and the second computing device Succinctly, the example method, in some instances, utilizes the properties of quantum entanglement to generate a true random number at a first computing device and a duplicate of the true random number at a second computing device. Subsequently, the example method provides for QEA, PQC, or combination thereof by using the true random number and its duplicate as cryptographic keys to encrypt and decrypt communications transmitted between the first computing device and the second computing device, or other computing devices communicatively coupled thereto without exchanging the cryptographic key. In some embodiments, the true random number and its duplicate are referred to herein as "quantum entanglement random numbers."

In some embodiments, the present disclosure relates to a QEA system configured to provide for QEA based on various techniques described herein. In one illustrative example, Alice and Bob, two synchronized computing devices, may measure random numbers from the two QERNGs on a synchronized time basis and record the measured random numbers in their local logs of random numbers in order to authenticate their transactions. For example, Alice may measure random numbers from the first QERNG at a predetermined frequency (e.g., every second) and record those random numbers in her local log of random numbers. Bob may measure random numbers from the second QERNG at the same predetermined frequency and record those random numbers in his local log of random numbers, which will be identical to Alice's log of random numbers. Alice and Bob may be synchronized, for example, by calibrating their respective time clocks (e.g., cesium clocks configured to calibrate within milliseconds).

Subsequently, Alice and Bob may exchange encrypted communications using their logs of random numbers and a timestamp included in, or associated with, each encrypted communication. For example, Alice may encrypt a message using the random number measured at time T1 (e.g., the random number may be, or be used to generate, a symmetric cryptographic key), timestamp the encrypted message as having been encrypted using the random number measured at time T1, and transmit that encrypted message to Bob. When Bob receives the encrypted message from Alice at time T2, he will be able to read the timestamp and determine that the message was encrypted using the random number measured at time T1. Bob can search his log of random numbers to identify the random number that he measured at time T1, which will be identical to the random number that Alice measured at time T1. Subsequently, Bob may use the identified random number to decrypt the encrypted message. In some instances, Alice and Bob also may use their logs of random numbers to validate their identities, such as by comparing the random numbers that they each measured at a set of predetermined times (e.g., T2, T4, and T7).

In one illustrative example, the present disclosure thus provides for, among other features, two synchronized computing devices that measure random numbers from the two QERNGs on a synchronized time basis and record the measured random numbers in their local logs of random numbers in order to authenticate their transactions. In another illustrative example, the present disclosure thus provides for, among other features, two synchronized computing devices that exchange encrypted communications using their logs of random numbers and a timestamp included in, or associated with, each encrypted communication.

In some instances, Alice may include one of the two QERNGs, and Bob may include the other of the two QERNGs. In other instances, the QERNGs may be peripheral devices, where one QERNG is attached to Alice and the other QERNG is attached to Bob. In still other instances, the two QERNGs may be included in a central service, where one QERNG is in communication with Alice and the other QERNG is in communication with Bob.

In some embodiments, the present disclosure relates to a QEA system configured to provide for, among other features disclosed herein, QEA based on secure keys generated based on duplicate numbers that are generated simultaneously using quantum entanglement on Alice's side and Bob's side, respectively. The duplicate numbers line up, match, or are related to each other in such a way that the secure keys may be created without having to actually transmit those keys in any way, shape, or form. In some embodiments, whereas QKD is a real-time quantum cryptographic technique, QEA may, in some instances, be a non-real-time quantum cryptographic technique that facilitates portable, non-real-time usage of entangled quantum particles. In some embodiments, the QEA system described herein may provide for QERNG, QEA, PQC, or a combination thereof in instances in which real-time quantum distribution channels are not available.

In some embodiments, the present disclosure relates to a QEA system configured to provide for, among other features disclosed herein, QEA between the QEA system and a client device based on synchronized tokens comprising entangled quantum particles, where the host system and the client device generate new numbers (e.g., session keys) according to a predetermined cycle (e.g., every 60 seconds, every 5 minutes) based on their respective token (e.g., by measuring quantum particles stored or maintained in corresponding quantum storage cells) and authenticate each other in circumstances in which those numbers are identical.

In some embodiments, the present disclosure relates to a QEA system configured to provide for PQC based on various techniques described herein. In some embodiments, the QEA system may be configured to provide PQC migration for classical systems (e.g., non-PQC systems) to utilize PQC cryptographic techniques for session authentication and symmetric cryptography (e.g., secret key cryptography) at two computing devices without, in some instances, transmitting the session key or shared symmetric key between those two computing devices. The QEA system is thereby configured to mitigate vulnerabilities from quantum computers using Shor's algorithm, provide identification of techniques to reduce the attack surface of cryptographic operations, and provide solutions to other cascading opportunities and challenges identified herein that stem from the vulnerability of today's common public-key encryption techniques to quantum computing.

In one example embodiment implementing a PQC communications channel-based cryptographic technique, the QEA system may transmit a first portion of an electronic communication (e.g., overhead data, such as an electronic identification of a subset of a set of entangled quantum particles and a set of quantum bases for use in quantum one-time pad generation, QERNG, QEA, header information, routing information, session information, or a combination thereof) to a client device over a non-PQC communications channel. The QEA system may further transmit a second portion of the electronic communication (e.g., payload data, such as a random number, session key, secret key, or other shared secret generated using QEA) to the client device over a PQC communications channel.

In yet another example embodiment implementing a PQC communications channel-based cryptographic technique, the QEA system may transmit a first portion of an electronic communication to a client device over a non-PQC communications channel. The QEA system may further generate a random number at the QEA system and a duplicate of the random number at the client device for use in session authentication, symmetric cryptography, or both, based on the principles of quantum entanglement, quantum uncertainty, and the indeterminacy of quantum states, by (i) measuring one or more entangled quantum particles stored at the QEA system, where each entangled quantum particle is entangled with a respective entangled quantum particle stored at the client device, (ii) causing the corresponding one or more entangled quantum particles stored at the client device to collapse such that the quantum particles measured at the client device are identical, or correlated, to the quantum particles measured at the QEA system, (iii) generating a random number, session key, or secret key at the QEA system based on the quantum particles measured at the QEA system, and (iv) generating a duplicate of the random number, session key, or secret key at the client device based on the quantum particles measured at the client device. The QEA system may further authenticate a session with the client device over the non-PQC communications channel based on the random number, session key, or secret key. In response to authentication of the session with the client device, the QEA system may transmit a second portion of the electronic communication to the client device over a PQC communications channel, where QEA system has encrypted the second portion of the electronic communication based on (a) the generated random number, session key, or secret key, or (b) a second random number, session key, secret key, or other shared secret generated using QEA.

In some embodiments, the QEA system provided herein may provide for generating and storing a pair of quantum one-time pads comprising entangled quantum particles in order to inject true randomness into the process for generating uncompromisable, duplicate session keys or seeds for a pseudorandom number generation process used to establish a secure session between two physically distant computing devices. In one example embodiment, the QEA system provides for quantum one-time pad generation. The QEA system may comprise quantum one-time pad generation circuitry configured to generate a first quantum one-time pad comprising a first set of entangled quantum particles. The QEA system may further comprise quantum storage circuitry configured to store the first set of entangled quantum particles in a first set of quantum storage cells. Each entangled quantum particle in the first set of entangled quantum particles may be entangled with a respective entangled quantum particle in a second set of entangled quantum particles comprised by a second quantum one-time pad and stored in a second set of quantum storage cells.

In some embodiments, the QEA system provided herein may provide for authenticating a session between a first computing device and a second computing device. In one example embodiment, QEA system 102 (specifically, QERNG 107 or a quantum authentication device attached thereto) comprises the first set of entangled quantum particles. Remote QEA Server 116 (specifically, QERNG 117 or a quantum authentication device attached thereto) comprises the second set of entangled quantum particles. Each entangled quantum particle is stored in a quantum storage cell ("cell"). Upon receiving a request to authenticate a session, QEA system 102 may generate a first number (associated with, for example, Alice/computing device 110) by measuring a first subset of the first set of entangled quantum particles. QEA system 102 may also generate a second number (associated with, for example, Bob/computing device 112) by measuring a second subset of the first set of entangled quantum particles. QEA system 102 may then transmit an electronic identification of the first subset of entangled quantum particles to computing device 110 (e.g., says to Alice, go get cell 23 from remote server device 116). QEA system 102 further transmits the second number (assoc. w/Bob) to Alice/computing device 110.

Later, Alice/computing device 110 may transmit a measurement initiation request to server device 116 that includes the electronic identification of the first subset of the first set of entangled quantum particles (e.g., a request to generate a number based on cell 23). Server device 116 may then generate a duplicate of the first number by measuring a first subset of the second set of entangled quantum particles (e.g., stored in 117) that corresponds to the first subset of the first set of entangled quantum particles (e.g., stored in 107). Server device 116 then transmits the duplicate of the first number to computing device 110.

Bob/computing device 112 may transmit a measurement initiation request to server device 116 that includes the electronic identification of the second subset of the first set of entangled quantum particles (e.g., a request to generate a number based on cell 27). Server device 116 may then generate a duplicate of the second number by measuring a second subset of the second set of entangled quantum particles (e.g., stored in 117) that corresponds to the second subset of the first set of entangled quantum particles (e.g., stored in 107). Server device 116 then transmits the duplicate of the second number to computing device 112.

Initially, with only Alice and Bob, the shared secret=(first number)*(second number). Alice (e.g., computing device 110) generates the shared secret based on (e.g., by multiplying) the second number (e.g., received from QEA system 102) and the duplicate of the first number (e.g., received from remote server 116). Bob (e.g., computing device 112) generates the identical shared secret based on (e.g., by multiplying) the first number (e.g., received from QEA system 102) and the duplicate of the second number (e.g., received from remote server 116). Alice and Bob are then able to exchange communications encrypted based on the shared secret, for example, by utilizing the shared secret for authentication (e.g., using challenge-response type methods, to generate one or more keys to use for encryption, or the like).

Though, as described below, the system also may provide for a third computing device to join and authenticate the session that then includes Alice, Bob, and for example, Charlie. And further, in some embodiments, the system may also provide for N computing devices. For example, QEA system 102 generates a first number (associated with Alice/computing device 110) by measuring a first subset of the first set of entangled quantum particles, QEA system 102 generates a second number (associated with Bob/computing device 112) by measuring a second subset of the first set of entangled quantum particles, and QEA system 102 may generate a third number (e.g., associated with Charlie/computing device 114) by measuring a third subset of the first set of entangled quantum particles.

QEA system 102 then transmits an electronic identification of the first subset of entangled quantum particles to computing device 110 (e.g., transmits signal instructing Alice to go get cell 23 from remote server device 116). QEA system 102 further transmits the second number (assoc. w/Bob) and the third number (assoc. w/Charlie) to Alice/computing device 110.

QEA system 102 transmits an electronic identification of the second subset of entangled quantum particles to computing device 112 (e.g., transmits signal instructing Bob to go get cell 27 from remote server device 116). QEA system 102 further transmits the first number (assoc. w/Alice) and the third number (assoc. w/Charlie) to Bob/computing device 112.

QEA system 102 transmits an electronic identification of the third subset of entangled quantum particles to computing device 114 (e.g., transmits signal instructing Charlie to go get cell 32 from remote server device 116). QEA system 102 further transmits the first number (assoc. w/Alice) and the second number (assoc. w/Bob) to Charlie/computing device 114.

Later, Charlie/computing device 114 may transmit a measurement initiation request to server device 116 that includes the electronic identification of the third subset of the first set of entangled quantum particles (e.g., a request to generate a number based on cell 32). Server device 116 generates a duplicate of the third number by measuring a third subset of the second set of entangled quantum particles (e.g., stored in 117) that corresponds to the third subset of the first set of entangled quantum particles (e.g., stored in 107). Server device 116 then transmits the duplicate of the third number to computing device 114. When Charlie joins Alice and Bob, the shared secret=(first number)*(second number)*(third number). When the Nth computing device joins, the shared secret=(first number)*(second number)*(third number) . . . *(Nth number).

In a first example, including only Alice & Bob, for example, where a first number (Alice)=7 and a second number (Bob)=3, QEA system 102 transmits first number "7" to Bob and transmits the second number "3" to Alice. Alice obtains a duplicate of first number "7" from remote server 116 and Bob obtains duplicate of second number "3" from remote server 116. The shared secret may then be 7*3=21.

Alice and Bob exchange communications, via an authenticated session and/or encrypted based on the shared secret "21". Subsequently, Charlie joins. Let the third number (Charlie)=22. QEA system 102 sends third number "22" to Alice and Bob and sends old shared secret "21", or in some embodiments, just the first and second numbers "7" and "3" to Charlie. Charlie obtains duplicate of third number "22" from remote server 116, Alice obtains the duplicate of first "7", and Bob obtains duplicate of second number "3" from remote server 116. The new shared secret=21*22=462. Alice, Bob, and Charlie exchange communications encrypted based on the new shared secret "462". Alice/computing device 110 generates the shared secret based on (e.g., by multiplying) the second number (received from 102), the third number (received from 102), and the duplicate of the first number received from 116). Bob/computing device 112 generates the identical shared secret based on (e.g., by multiplying) the first number (received from 102), the third number (received from 102), and the duplicate of the second number received from 116). Charlie/computing device 114 generates the identical shared secret based on (e.g., by multiplying) the first number (received from 102), the second number (received from 102), and the duplicate of the third number received from 116). Alice, Bob, and Charlie are then able to exchange communications encrypted based on the shared secret.

There are many advantages of these and other embodiments described herein, such as: providing a session key that has truly random elements, and, as a result, facilitating the generation of a session key that cannot be reproduced by a third party; facilitating migration to quantum-resistant information systems that utilize PQC cryptographic techniques that cannot be compromised by a quantum computer; facilitating faster, cheaper, more secure, and less computing resource and data intensive processes for quantum-resistant session authentication and symmetric cryptography (e.g., secret key cryptography) to reduce the attack surface of cryptographic operations by a quantum computer; and providing new ways to solve the cascading opportunities and challenges identified herein that stem from a sudden vulnerability to today's common public-key encryption techniques arising from the realization of quantum computing.

Further, by measuring entangled quantum particles at a first computing device to generate true random numbers, measuring the corresponding entangled quantum particles at a second computing device will generate duplicate (e.g., identical) random numbers based on the principles of quantum entanglement, uncertainty, and indeterminacy of quantum states. In some instances, because the random numbers are true random numbers, as opposed to quasi-random numbers, perpetrators will be much less likely to successfully regenerate those numbers. Accordingly, in some instances, a session key or seed generated according to the embodiments disclosed herein is inherently random and is unattainable to any perpetrator due to quantum entanglement and quantum uncertainty.

Among other features, these and other embodiments described herein at least: reflect improvements in the functioning of computing systems or devices, such as information systems (including but not limited to QEA server devices and databases), server devices, client devices, and combinations thereof; reflect improvements to other technologies or technical fields as described herein (e.g., QEA, PQC); and effect transformations or reductions of particular articles to different states or things, such as unencrypted data and data structures, encrypted data and data structures, electronic signals, quantum signals, other articles described herein, and combinations thereof.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable program instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

The term "quantum entanglement random number generation (QERNG)" refers to a mechanism for generating a true random number (referred to herein as a first quantum entanglement random number) at a first computing device and a duplicate of the true random number (referred to herein as a second quantum entanglement random number) at a second computing device based on the properties of quantum entanglement, indeterminacy of quantum states, and wave function collapse. In some embodiments, the QEA system may utilize true random numbers generated using the QERNG techniques disclosed herein for QEA, PQC, or combination thereof by, for example, using a true random number and its duplicate as symmetric cryptographic keys to encrypt and decrypt communications transmitted between computing devices.

The term "quantum entanglement authentication (QEA)" refers to a mechanism for securing electronic communications channels between computing devices by generating duplicate, unique keys at physically distant computing devices. In some embodiments, QEA refers to a mechanism for generating two sets of entangled quantum particles, transmitting the first set of entangled quantum particles to a first computing device, and transmitting the second set of entangled quantum particles to a second computing device. Each set of entangled quantum particles may be referred to herein as a "quantum one-time pad" and, in some instances, may be stored in a set of quantum storage cells disposed in a portable quantum authentication device that is communicatively coupled to a respective computing device and communicatively coupled (e.g., through an application programming interface (API)) to the computing device for use in quantum one-time pad generation, QERNG, QEA, PQC, or a combination thereof. Accordingly, before measurement, each entangled quantum particle in the first set of entangled quantum particles associated with (e.g., stored in, maintained by) the QEA system or a first computing device is entangled with a respective entangled quantum particle in a second set of entangled quantum particles associated with a client device or a second computing device. Upon measurement, QEA introduces randomness in the measured quantum particles based on the principles of quantum uncertainty and the indeterminacy of quantum states. Subsequently, the randomness measured by the first computing device is accurately reproduced at the second computing device at speeds that are, in effect, faster than the speed of light due to the principles of quantum entanglement and wave function collapse.

The term "quantum one-time pad" refers to an inventory or battery of entangled quantum particles, such as a set of entangled quantum particles that comprises one half of an overarching set of pairs of entangled quantum particles. Each entangled quantum particle in a first quantum one-time pad is entangled with a respective entangled quantum particle in a second quantum one-time pad. Measurement of an entangled quantum particle in the first quantum one-time pad will cause the respective entangled quantum particle in the second quantum one-time pad to collapse onto a correlated (e.g., complimentary), or identical, quantum state. For example, in circumstances in which measurement of an entangled quantum particle in the first quantum one-time pad causes the respective entangled quantum particle in the second quantum one-time pad to collapse onto a correlated (e.g., complimentary) quantum state, (i) if the measurement of the entangled quantum particle in the first quantum one-time pad is a $|0\rangle$, the measurement of the respective entangled quantum particle in the second quantum one-time pad will collapse onto a $|1\rangle$, and (ii) if the measurement of the entangled quantum particle in the first quantum one-time pad is a $|1\rangle$, the measurement of the respective entangled quantum particle in the second quantum one-time pad will collapse onto a $|0\rangle$. In another example, in circumstances in which measurement of an entangled quantum particle in the first quantum one-time pad causes the respective entangled quantum particle in the second quantum one-time pad to collapse onto an identical quantum state, (i) if the measurement of the entangled quantum particle in the first quantum one-time pad is a $|0\rangle$, the measurement of the respective entangled quantum particle in the second quantum one-time pad will collapse onto a $|0\rangle$; and (ii) if the measurement of the entangled quantum particle in the first quantum one-time pad is a $|1\rangle$, the measurement of the respective entangled quantum particle in the second quantum one-time pad will collapse onto a $|1\rangle$. In some embodiments, a quantum one-time pad may have a lifetime that ends when all of its entangled quantum particles have been measured or have collapsed due to measurement of all of the quantum particles to which they were entangled.

In some embodiments, a quantum one-time pad may comprise entangled quantum particles stored or maintained in an M×N matrix of quantum storage cells (e.g., fabricated into a single chip or die), where each of M and N is an integer greater than or equal to one, and where M may or may not be equal to N. For example, a first quantum one-time pad may comprise the first set of entangled quantum particles stored or maintained in a first set of quantum storage cells, and a second quantum one-time pad may comprise the second set of entangled quantum particles stored or maintained in a second set of quantum storage cells. In some embodiments, a quantum one-time pad may comprise a matrix of over 1,000 quantum storage cells, such as 4,096 quantum storage cells (e.g., M=N=64; M=32, N=128). In some embodiments, a quantum one-time pad may comprise a matrix of over 1,000,000 quantum storage cells, such as 1,048,576 quantum storage cells (e.g., M=N=1,024) or even 16,777,216 quantum storage cells (e.g., M=N=4,096).

In some embodiments, a quantum one-time pad may comprise set of quantum storage cells disposed in a portable quantum authentication device that is communicatively coupled to a computing device for use in quantum one-time pad generation, QERNG, QEA, PQC, or a combination thereof. In some embodiments, the quantum authentication device may be described by the adjective "single-use" because measurement destroys entanglement and thus provides a "one-time read" once all of the entangled quantum particles are measured. The quantum authentication device may be, for example, a hand-held token device comprising millions of quantum storage cells respectively comprising millions of entangled quantum particles. Eventually, when all of the tokens run out (e.g., once the lifetime of the quantum one-time pad has been reached), the quantum authentication device may be turned in to the QEA system, which may reload the quantum authentication device with entangled quantum particles for further use in QERNG, QEA, PQC, or a combination thereof.

In some embodiments, the QEA system described herein may create a pair of quantum one-time pads by splitting the output of a quantum particle source (e.g., a beam of entangled photons) and (i) transmitting each quantum one-time pad to a respective computing device (e.g., a respective QERNG device); (ii) loading each quantum one-time pad onto a respective quantum authentication device to be communicatively coupled to a respective computing device; or (iii) storing or maintaining each quantum one-time pad for access by a respective computing device.

The term "post-quantum cryptography (PQC)" refers to cryptosystems which are, or are considered to be, resistant to quantum attacks. In some instances, the term PQC refers to cryptography that may or will be secure even after the development of large-scale error tolerant quantum computing devices. The related term "PQC migration" refers to the migration of data encrypted using classical systems to be encrypted using quantum-resistant algorithms and includes, but is not limited to, the updating of system software stacks and security infrastructure. In some embodiments, PQC migration includes migration of classical systems to QEA systems or hybrid systems (e.g., a combination of classical and QEA, PQC, or both). In some embodiments, PQC migration includes translations of networks. For example, today networks A, B, and C may only be able to utilize classic cryptography, but tomorrow network C may be able to utilize PQC so the QEA system may drop in a PQC gateway to translate back and forth such that eventually network B is PQC enabled, but network A may never become PQC enabled so the QEA system may determine that transactions to or from network A are a higher risk and implement the PQC cryptographic techniques described herein according to that higher risk.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state |1> and the spin down state |0>); the energy level of a single atom (e.g., a superconducting qubit, such as a superconducting charge qubit, superconducting flux qubit, or superconducting phase qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The terms "qubit encoder" and "qubit decoder" are used herein to refer to any devices that respectively encode (e.g., generate) or decode (e.g., measure) a qubit of information on a quantum particle. In this regard, the qubit encoder and qubit decoder may comprise optoelectronic devices as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof.

In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length.

The terms "security shelf-live," "migration time," and "collapse time" refer to the parameters shown below in Table 2:

TABLE 2

Example parameters that may be used by the QEA system described herein to generate quantum computing threat assessments and electronic recommendations associated therewith.

| Parameter | Description | Definition |
|---|---|---|
| x | Security shelf-life (e.g., data retention requirement) | Duration (e.g., in years) to keep the cryptographic keys secure (e.g., "How long do you need your cryptographic keys to remain secure?") |
| y | PQC migration time | Estimated duration (e.g., in years) to migrate existing infrastructure to a QEA system (e.g., "How long will it take to deploy a set of cryptography tools that are quantum-resistant?") |
| z | Collapse time (e.g., time to quantum computing threat) | Estimated duration (e.g., in years) to build a large-scale quantum computer (e.g., "How long will it be before a quantum computeror some other method, compromises the currently deployed public-key cryptography tools?") |

The term "security shelf-life" includes, but is not limited to, data retention requirements. For example, in some instances the security shelf life x of a piece of data may be based on governmental risk and regulatory requirements, such as the FDIC's data retention requirements shown in Table 1.

The term "collapse time" includes, but is not limited to, time to quantum computing threat. The phrases "time to quantum computing threat" and "a time to a quantum computing threat" refer to an approximate time to a quantum computing threat. In some instances, the collapse time z may decrease when the QEA system identifies, or receives, technological advancements relating to quantum computing; increased vulnerabilities to cryptographic techniques (e.g., one or more non-PQC cryptographic techniques, PQC cryptographic techniques, or hybrid PQC cryptographic techniques); or a quantum computing (QC) detection alert control signal indicating that a particular cryptographic technique (e.g., a non-PQC cryptographic technique, a PQC cryptographic technique, a hybrid PQC cryptographic technique) has been compromised by quantum computing. In one illustrative, non-limiting example, the collapse time z may indicate an estimated 15% chance of compromising RSA-2048 by 2026 and an estimated 50% chance of compromising RSA-2048 by 2031.

The term "control signal" refers to an electronic alert, notification, flag, or control signal configured to instruct, or cause, the QEA system, or a QC detection system comprised by or in communication with the QEA system, to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC cryptographic technique, a PQC cryptographic technique, a hybrid PQC cryptographic technique) used to encrypt or otherwise generate encrypted QC detection data has been compromised by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the QEA system to initiate automated analyses and processes to mitigate the quantum computing threat within a duration of time. In some instances, the QEA system may generate a control signal in accordance with the criteria discussed below with reference to Table 3.

The term "quantum computing (QC) detection data" refers to data configured to be used by the QEA system, or a QC detection system comprised by or in communication with the QEA system, to detect the existence and capabilities of quantum computing and, in some instances, the strength of that quantum computing. In some instances, the QEA system may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, card verification value (CVV) security code, credit card network (e.g., Visa, MasterCard, American Express), EMV (originally Europay, Mastercard, and Visa) chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, content delivery networks (CDNs), cloud service platforms, social media platforms, dark websites, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, or any combination thereof.

The term "non-PQC cryptographic technique" refers to a cryptographic technique that is not quantum-resistant. Non-PQC cryptographic techniques may comprise, for example, RSA, DH, and other such non-PQC cryptographic algorithms. In some instances, a non-PQC cryptographic technique may be a variant of a non-PQC cryptographic algorithm. For example, a first non-PQC cryptographic technique may be RSA-2048, a second non-PQC cryptographic technique may be RSA-3072, and a third non-PQC cryptographic technique may be RSA-4096, each of which is a different variant of the same non-PQC cryptographic algorithm (e.g., RSA). In another example, a first non-PQC cryptographic technique may be AES-128, and a second non-PQC cryptographic technique may be DH-2048, each of which is a variant of a different non-PQC cryptographic algorithm (e.g., AES, DH). In yet another example, a first non-PQC cryptographic technique may encrypt overhead data based on RSA-2048 and transmit the encrypted data over a non-PQC communications channel (e.g., an in-band communications channel), and a second non-PQC cryptographic technique may transmit overhead data over a non-PQC communications channel as clear text, each of which is a different variant of a non-PQC communications channel-based cryptographic technique.

The term "PQC cryptographic technique" refers to a quantum-resistant cryptographic technique that, as defined herein, uses QEA to generate duplicate cryptographic values at physically distant computing devices. Generally, the families of PQC cryptographic techniques include key management and signature. PQC cryptographic techniques may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, other suitable techniques, and combinations thereof (e.g., combinations of PQC communications channel-based cryptographic techniques with hash-based, lattice-based, isogeny-based, code-based, multivariate-based, or zero-knowledge proof PQC cryptographic techniques).

Hash-based PQC cryptographic techniques (e.g., hash-based PQC cryptographic signatures) are suitable for one-time use, wherein a tuning parameter provides a trade-off between signature size and key generation, signing, and verification speed, and can be can be used with any secure hashing function. Hash-based PQC cryptographic techniques may be used to provide digital signatures, such as Leighton-Micali Signature (LMS), eXtended Merkle Signature Scheme (XMSS), and SPHINCS+.

Lattice-based PQC cryptographic techniques are based on the shortest vector problem, the leading replacement for prime factorization and discrete logarithm, and typically are less computationally resource intensive in relation to isogeny-based and other PQC cryptographic techniques. In some instances, lattice-based PQC cryptographic techniques may be used to provide digital signatures, such as Dilithium and qTESLA. In some instances, lattice-based PQC cryptographic techniques may be used to provide key exchange by key encapsulation, such as NewHope, Frodo Key-Encapsulation Mechanisms (FrodoKEM), Nth degree-Truncated polynomial Ring Units (NTRU) Prime, and Kyber. In some instances, lattice-based PQC cryptographic techniques may be used to provide key exchange by key agreement, such as NewHope Classic, Frodo Diffie-Hellman (FrodoDH), and Ring Learning With Errors Key EXchange (RLWE-KEX).

Isogeny-based PQC cryptographic techniques use very small keys and typically are more computationally resource intensive in relation to lattice-based and other PQC cryptographic techniques. In some instances, isogeny-based PQC cryptographic techniques may be used to provide key exchange by key encapsulation, such as Supersingular Isogeny Key Encapsulation (SIKE). In some instances, isogeny-based PQC cryptographic techniques may be used to provide key exchange by key agreement, such as Supersingular isogeny Diffie-Hellman (SIDH) key exchange.

Code-based PQC cryptographic techniques use very large key sizes yet are typically the fastest PQC cryptographic techniques at the comparable security level (e.g., extremely fast in encryption and reasonably fast in decryption). In some instances, code-based PQC cryptographic techniques may be used to provide key exchange by key encapsulation, such as Classic McEliece, McEliece Quasi-Cyclic Moderate Density Parity Check (QC-MDPC), and Bit Flipping Key Encapsulation (BIKE).

Multivariate-based PQC cryptographic techniques use small public keys and fast verification yet, in some instances, are less efficient than other PQC cryptographic techniques. Multivariate-based PQC cryptographic techniques may be used to provide digital signatures, such as Rainbow.

Zero-knowledge proof PQC cryptographic techniques use very small key pairs and derive their security entirely from the security of symmetric-key primitives and are believed to be quantum-secure. In some instances, zero-knowledge proof PQC cryptographic techniques may be used to provide digital signatures, such as Picnic.

In some embodiments, the QEA system may retrieve one or more of the hash-based PQC cryptographic techniques, lattice-based PQC cryptographic techniques, isogeny-based PQC cryptographic techniques, code-based PQC cryptographic techniques, multivariate-based PQC cryptographic techniques, and zero-knowledge proof PQC cryptographic techniques from a remote server or data storage device, such as the ISARA toolkit, the libOQS library, the libpqcrypto library, or a combination thereof, and implement the retrieved technique using QEA or modify the retrieved technique to use QEA.

PQC communications channel-based cryptographic techniques use PQC communications channels to secure transmission of sensitive or confidential message data, such as Society for Worldwide Interbank Financial Telecommunication (SWIFT) messages, International Organization for Standardization (ISO) 8583 messages, ISO 20022 messages, Internet of Things (IoT) data, Health Insurance Portability and Accountability Act (HIPAA) data (e.g., electronic medical records, protected health information), copyrighted content (e.g., electronic media, digital rights management (DRM)-protected data files), and other suitable messages. For example, the QEA system may be configured to implement a PQC communications protocol that transmits a first portion of an electronic communication (e.g., message overhead data such as protocol overhead, header data, metadata, an electronic identification of a subset of a set of entangled quantum particles and a set of quantum bases for use in quantum one-time pad generation, QERNG, QEA, PQC, or a combination thereof) to a client device over a first classical communications channel (e.g. non-PQC communications channel) and transmits a second portion of the electronic communication (e.g., message payload data, such as a random number, session key, secret key, or other shared secret generated using QEA) to the client device over a second classical communications channel (e.g., a PQC back channel such as an out-of-band communications channel). In some embodiments, the first classical communications channel and the second classical communications channel may utilize different classical communications channels (e.g., different communications networks, communications lines, communications circuitry, or a combination thereof). In some embodiments, the first classical communications channel and the second classical communications channel may utilize the same classical communications circuitry (e.g., the same communications network, lines, hardware, infrastructure) but a different protocol, communications mechanism, network connector, or combination thereof. For example, the QEA system may implement the non-PQC communications channel as an in-band communications channel and the PQC communications channel as an out-of-band communications channel using the same communications infrastructure.

In one illustrative example, the electronic communication may be a SWIFT message, the first portion of an electronic communication may comprise SWIFT message overhead data, and the second portion of an electronic communication may comprise SWIFT message payload data. In another illustrative example, the first portion of the electronic communication may comprise a cryptographic data attribute indicative of a symmetric cryptographic technique, and the second portion of the electronic communication may comprise a symmetric cryptographic key, such as an AES cryptographic key. The QEA system may be configured to authenticate a session (e.g., perform a cryptographic handshake) with the client device over the non-PQC communications channel based on the symmetric cryptographic key that was transmitted to the client device over the PQC communications channel.

In yet another illustrative example, the first portion of the electronic communication may comprise a PQC indicator data structure that identifies the PQC communications channel and indicates that a second portion of the electronic communication is to be transmitted over a PQC communications channel. The PQC indicator data structure may comprise a link or pointer to the PQC communications channel, a header that identifies the PQC communications channel as being out-of-band, other identification and routing information, or a combination thereof. In some embodiments, the PQC indicator data structure may comprise a link to the second portion of the electronic communication. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a PQC flag value. In another example, the PQC indicator data structure may comprise a link to a PQC electronic agreement (e.g., a bilateral agreement between the QEA system and the client device to exchange confidential or sensitive data over a PQC communications channel) comprising the PQC indicator data structure.

In some embodiments, the PQC indicator data structure may comprise a link to a PQC shim configured to allow communication with the QEA system (e.g., via PQC callback circuitry comprised by the QEA system) over the PQC communications channel. For example, the PQC indicator data structure may further comprise a PQC shim automatic installation control signal indicative of an electronic instruction for the client device to automatically install the PQC shim based on the link. In another example, the PQC indicator data structure may further comprise a PQC shim manual installation control signal indicative of an electronic instruction for the client device to manually install the PQC shim based on the link. In another example, the first portion of the electronic communication may comprise a PQC smart contract comprising the PQC indicator data structure.

In some embodiments, the first portion of the electronic communication may comprise a PQC request data structure (e.g., a request for an acknowledgment or confirmation that the client device is configured to communicate over a PQC communications channel). The QEA system may be configured to receive, in response to transmission of the PQC request data structure, a PQC acknowledgement data structure (e.g., an acknowledgment or confirmation that the client device is configured to communicate over a PQC communications channel) from the client device over the non-PQC communications channel. In response to receipt of the PQC acknowledgement data structure, to transmit the second portion of the electronic communication to the client device over the PQC communications channel.

In some embodiments, PQC indicator data structure may further identify a quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the QEA system and the client device to exchange quantum information over the quantum communications channel) comprising the PQC indicator data structure.

In some embodiments, the first portion of the electronic communication may comprise a quantum request data structure (e.g., a request for an acknowledgment or confirmation that the client device is configured to communicate over a quantum communications channel). The QEA system may be configured to receive, in response to transmission of the quantum request data structure, a quantum acknowledgement data structure (e.g., an acknowledgment or confirmation that the client device is configured to communicate over a quantum communications channel) from the client device over the non-PQC communications channel. In response to receipt of the quantum acknowledgement data structure, the QEA system may be configured to transmit the quantum cryptographic key to the client device over the quantum communications channel. Subsequently, the QEA system may be configured to authenticate a session (e.g., perform a cryptographic handshake) with the client device over the non-PQC communications channel based on the quantum cryptographic key that was transmitted to the client device over the quantum communications channel.

In some instances, a PQC cryptographic technique may be a variant of a PQC cryptographic algorithm. For example, a first PQC cryptographic technique may be Dilithium II, a second PQC cryptographic technique may be Dilithium II, and a third PQC cryptographic technique may be Dilithium 128, each of which is a different variant of the same PQC cryptographic algorithm (e.g., Dilithium, wherein the random secret key vectors $s_1$ and $s_2$ in each of the Dilithium algorithms are generated using QEA). In another example, a first PQC cryptographic technique may encrypt payload data based on Dilithium II, wherein the random secret key vectors $s_1$ and $s_2$ are generated using QEA, and transmit the encrypted data over a PQC communications channel (e.g., a PQC back channel), and a second PQC cryptographic technique may use QEA to generate a secret key that is used to encrypt payload data based on AES-256 and transmit the encrypted data over a PQC communications channel, each of which is a different variant of a PQC communications channel-based cryptographic technique.

Accordingly, each PQC cryptographic technique may be implemented as a variant of a PQC cryptographic algorithm (e.g., based on NIST security level). For example, the libOQS implementation of Dilithium includes the variants Dilithium II (e.g., Dilithium II Medium), Dilithium III (e.g., Dilithium III Recommended), and Dilithium IV (e.g., Dilithium IV VeryHigh); and the ISARA Radiate Toolkit implementation of Dilithium includes the variants Dilithium 128 and Dilithium 160. Accordingly, the PQC cryptographic technique for the PQC cryptographic algorithm "Dilithium" may be Dilithium II, Dilithium III, Dilithium IV, Dilithium 128, or Dilithium 160. In yet another example, the ISARA Radiate Toolkit implementation of FrodoKEM includes the variants FrodoKEM-976-AES and FrodoKEM-976-CSHAKE. In yet another example, the ISARA Radiate Toolkit speed-optimized implementation of NewHope includes the variant Lattice-based Unique Key Exchange (LUKE).

The term "hybrid PQC cryptographic technique" refers to a cryptographic technique that comprises a non-PQC cryptographic technique and a PQC cryptographic technique. For example, a hybrid PQC cryptographic technique may comprise a PQC cryptographic technique and non-PQC cryptographic technique coexisting in a data envelope, as defined by the statement "hybrid PQC cryptographic technique={PQC cryptographic technique, Non-PQC cryptographic technique}." In some embodiments, a hybrid PQC cryptographic technique may comprise a hybrid PQC cryptographic mode, such as a signature-based hybrid PQC cryptographic mode consisting of a non-PQC cryptographic signature and a PQC cryptographic signature. In some embodiments, the hybrid PQC cryptographic mode is valid only if both the non-PQC cryptographic signature and the PQC cryptographic signature are valid. For example, the QEA system may (i) validate the non-PQC cryptographic signature according to the Federal Information Processing Standard (FIPS) publication 140 (e.g., 140-1, 140-2, 140-3); and (ii) validate the PQC cryptographic signature using multiple public-key algorithms for X.509 certificates, such as quantum-resistant X.509 Multiple Public Key Algorithm Certificates.

The term "hybrid QEA cryptographic technique" refers to a cryptographic technique that comprises a QEA cryptographic technique and a non-PQC cryptographic technique, a PQC cryptographic technique, or both. For example, a hybrid QEA cryptographic technique may comprise a QEA cryptographic technique and non-PQC cryptographic technique coexisting in a data envelope, as defined by the statement "hybrid QEA cryptographic technique={QEA cryptographic technique, Non-PQC cryptographic technique}." In another example, a hybrid QEA cryptographic technique may comprise a QEA cryptographic technique and PQC cryptographic technique coexisting in a data envelope, as defined by the statement "hybrid QEA cryptographic technique={QEA cryptographic technique, PQC cryptographic technique}." In some embodiments, a hybrid QEA cryptographic technique may comprise a hybrid QEA cryptographic mode, such as a PQC cryptographic technique that has been modified by the QEA system to use QEA (e.g., a QEA variant of the PQC cryptographic algorithm "Dilithium," wherein the random secret key vectors $s_1$ and $s_2$ in the Dilithium algorithm has been generated using QEA).

The term "quantum cryptographic technique" refers to a quantum particle-based cryptographic technique. Quantum cryptographic techniques may comprise, for example, QEA techniques, quantum key distribution (QKD) techniques, quantum coin flipping protocols, quantum commitment protocols, quantum oblivious transfer protocols, and other suitable techniques. In some instances, a quantum cryptographic technique may be a variant of a quantum cryptographic algorithm. For example, a first quantum cryptographic technique may be a QEA cryptographic technique for authenticating a session between a server device and a client device, a second quantum cryptographic technique may be QEA cryptographic technique for encrypting and decrypting electronic communications exchanged between two computing devices, and a third quantum cryptographic technique may be a QEA cryptographic technique that utilizes a PQC communications channel, each of which is a different variant of QEA. In another example, a first quantum cryptographic technique may be a BB84-based QKD technique, a second quantum cryptographic technique may be an E91-based QKD technique, and a third quantum cryptographic technique may be a KMB09-based QKD technique, each of which is a different variant of the same quantum cryptographic algorithm (e.g., QKD).

The term "non-PQC communications channel" refers to a communications channel (e.g., a wired or wireless communications channel) over which non-quantum data and signals are exchanged using one or more non-PQC cryptographic techniques that do not themselves directly rely on quantum properties. For example, the QEA system described herein may implement a non-PQC communications channel by encrypting data based on a non-PQC cryptographic technique (e.g., RSA) and then transmitting the encrypted data over a non-PQC communications channel (e.g., an "in-band" communications channel) or, in some instances, by transmitting unencrypted, clear text data over the non-PQC communications channel. In some embodiments, a non-PQC communications channel may be a classical communications channel derived from a shared secret that is derived using a non-PQC cryptographic technique, such as a shared secret generated using DH.

The term "PQC communications channel" refers to a communications channel (e.g., a wired or wireless communications channel) over which non-quantum data and signals are exchanged using one or more PQC cryptographic techniques (e.g., for authentication, encryption, or both) that do not themselves directly rely on quantum properties. For example, the QEA system described herein may implement a PQC communications channel by encrypting data based on a PQC cryptographic technique (e.g., Dilithium II) and then transmitting the encrypted data over a classical back channel (e.g., an "out-of-band" communications channel). In some embodiments, a PQC Communications channel may be based on an underlying Key Encapsulation Mechanism or Key Agreement Scheme. In some embodiments, a PQC Communications channel may use a Key Encapsulation Mechanism (e.g., SIKE, NTRUPrime, Kyber) to encapsulate a shared secret and ensure its safe transmission between Alice and Bob. This shared secret subsequently will either (i) be used as a Symmetric Key (e.g., for Symmetric Key encryption) or (ii) be handed over to a Key Derivation Function to generate a shared encryption key. In some embodiments, a PQC Communications channel may use a Key Agreement Scheme (e.g., SIDH, NewHopeDH) may allow both Alice and Bob to calculate the shared secret based on public parameters and public key that they exchange. Unlike Key Encapsulation Mechanisms, Key Agreement Schemes do not encapsulate the calculated shared secret with cipher text. Key Agreement Schemes may be extended to generate Ephemeral keys. In some instances, after the shared secret is calculated, the keys are destroyed to preserve perfect forward secrecy. In some embodiments, a PQC communications channel may be a classical communications channel derived from a shared secret that is derived using a Key Encapsulation Mechanism or a Key Agreement Scheme.

The term "quantum communications channel" refers to a quantum communications channel (e.g., an optical line, a quantum line) over which quantum data and particles, such as qubits, are exchanged using one or more quantum cryptographic techniques (e.g., QKD) that directly rely on quantum properties, such as quantum uncertainty, quantum entanglement, or both.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, session servers, remote servers, cloud-based servers (e.g., cloud utilities), quantum entanglement random number generation (QERNG) devices, qubit encoders, qubit decoders, optoelectronic devices, pseudo-random number generation (PRNG) devices, or other network entities, and configured to communicate with one or more computing devices, such as one or more server devices, client devices, database server devices, remote server devices, other suitable devices, or a combination thereof.

In some instances, the method, system, apparatus, and computer program product of an example embodiment may be embodied by one or more quantum communications circuitries, quantum storage circuitries, quantum cryptographic circuitries, or a combination thereof, such as one or more quantum particle encoders, quantum particle decoders, laser devices, quantum lines, quantum particle storage devices, other suitable quantum-based devices or components, or a combination thereof.

Example embodiments of the client devices include any of a variety of stationary or mobile devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide QEA, PQC, and monitoring (including, but not limited to, QC detection, data leakage detection, and data tampering detection). In some embodiments, embodiments of the present disclosure may operate within the example environment 100 to facilitate on-demand delivery of, or access to, entangled quantum particles and, in some instances, authenticate sessions between computing devices.

As illustrated, a QEA system 102 may be connected to one or more QEA server devices 104 in communication with one or more QEA databases 106 and one or more QERNG devices 107. The QEA system 102 may be connected to one or more server devices (e.g., remote server device 116), one or more client devices (e.g., computing device 110, computing device 112, computing device 114), and one or more QERNG devices (e.g., QERNG device 111, QERNG device 113, QENRG device 115, QERNG device 117) through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the QEA system 102 may be configured to provide QEA and PQC as described in further detail below.

The QEA system 102 may be embodied as one or more specialized circuitries, computers, or computing systems and may comprise one or more QEA server devices 104, one or more QEA databases 106, and one or more QERNG devices 107. The one or more QEA server devices 104 may be embodied as one or more servers, remote servers, cloud-based servers (e.g., cloud utilities), processors, any other suitable server devices, or any combination thereof. The one or more QEA server devices 104 may be configured to receive, process, generate, and transmit data, signals, and electronic information to facilitate the operations of the QEA system 102 (e.g., to facilitate on-demand delivery of, or access to, entangled quantum particles; to facilitate session authentication, or both). The one or more QEA databases 106 may be embodied as one or more data storage devices, such as Network Attached Storage (NAS) devices or separate databases or servers.

In some embodiments, the QEA server device 104 may be configured to receive a request for entangled quantum particles and generate and transmit a set of entangled quantum particles (e.g., a quantum one-time pad) based on the request. For example, the QEA server device 104 may be configured to receive a request for entangled quantum particles from the computing device 110, the QERNG device 111, the computing device 112, the QERNG device 113, the computing device 114, the QERNG device 115, the remote server device 116, the QERNG device 117, or any other suitable device. In another example, the QEA server device 104 may be configured to generate and receive the request from internal memory or circuitry. In response to receiving the request, the QEA server device 104 may be configured to generate entangled quantum particles, transmit one set of entangled quantum particles (e.g., a first quantum one-time pad) to the QERNG device 111 over the quantum line 120, and transmit the other set of entangled quantum particles (e.g., a second quantum one-time pad) to the QERNG device 113 over the quantum line 122, such that each of the entangled quantum particles received by the QERNG device 111 is entangled with a respective one of the entangled quantum particles received by the QERNG device 113. In another example, in response to receiving the request, the QEA server device 104 may be configured to generate entangled quantum particles, store one set of entangled quantum particles in a first quantum authentication device as a first quantum one-time pad, store the other set of entangled quantum particles in a second quantum authentication device as a second quantum one-time pad, cause the first quantum authentication device to be physically transported to the QERNG device 111, and cause the second quantum authentication device to be physically transported to the QERNG device 113, such that each of the entangled quantum particles received by the QERNG device 111 (e.g., upon connection or docking of the first quantum authentication device) is entangled with a respective one of the entangled quantum particles received by the QERNG device 113 (e.g., upon connection or docking of the first quantum authentication device).

In some embodiments, the request for entangled quantum particles may comprise, for example, a control signal indicative of an instruction to initiate quantum particle transfer. In another example, the qubit request may comprise an electronic message providing a quantum particle transfer schedule. The QEA server device 104 may be further configured to interpret the quantum particle transfer schedule and generate and transmit the set of entangled quantum particles based on the quantum particle transfer schedule. In yet another example, the request may comprise a payment confirmation message that indicates payment of a price required for transfer of the set of entangled quantum particles. The QEA server device 104 may be further configured to generate and transmit the set of entangled quantum particles in response to receiving the payment confirmation message.

The one or more QEA databases 106 may be configured to store and provide access to data and information received, retrieved, accessed, or generated by the QEA system 102 to facilitate the operations of the QEA system 102. For example, the one or more QEA databases 106 may store device characteristics and user account credentials for users of one or more computing devices 110, 112, and 114 (including, but not limited to, one or more respective QERNG devices 111, 113, and 115), and one or more server devices 116 (including, but not limited to, one or more respective QERNG devices 117), or a combination thereof. In another example, the one or more QEA databases 106 may store data regarding device characteristics for the computing device 110, QERNG device 111, computing device 112, QERNG device 113, computing device 114, QERNG device 115, or a combination thereof. In some embodiments, the one or more QEA server devices 104, the one or more QEA databases 106, or both may include or store various data and electronic information associated with one or more quantum particles (e.g., entangled quantum particles, measured quantum particles), quantum one-time pads, quantum bases, requests, messages, control signals (e.g., measurement initiation control signals, QC detection alert control signals, leakage alert control signals, tampering alert control signals), quantum particle measurement schedules and related information (e.g., time-dependent quantum measurement schedules, measurement time values, sequence-dependent quantum measurement schedules, measurement sequence values), electronic information (e.g., electronic identifications of entangled quantum particles, such as electronic identifications of their respective quantum storage cells; electronic identifications of quantum bases), numbers (e.g., random numbers, pseudo-random numbers), cryptographic keys (e.g., session keys, symmetric cryptographic keys), cryptographic techniques, machine learning techniques, graphical user interface (GUI) data, QC detection techniques (including, but not limited to, detection of quantum computing capabilities; data leakage detection techniques; and data tampering detection techniques), any other suitable data or electronic information, any links or pointers thereto, or combinations thereof. In some embodiments, the one or more QEA server devices 104, the one or more QEA databases 106, or both may include or store various quantum information, such as one or more quantum particles (e.g., pairs of entangled quantum particles; sets of entangled quantum particles comprising one entangled quantum particle in each pair of entangled quantum particles; measured quantum particles), quantum one-time pads, quantum cryptographic keys, any other suitable quantum information, any links or pointers thereto, or combinations thereof.

The computing device 110 may be embodied by one or more computing devices. In some embodiments, the computing device 110 may be embodied as one or more servers, remote servers, cloud-based servers (e.g., cloud utilities), processors, or any other suitable devices, or any combination thereof. In some embodiments, the computing device 110 may be implemented as a session server. In some embodiments, the computing device 110 may receive, process, generate, and transmit data, signals, and electronic information to facilitate the operations of the QEA system 102. Information received by the QEA system 102 from the computing device 110 may be provided in various forms and via various methods. In some embodiments, the computing device 110 may include or store various data and electronic information associated with one or more quantum particles, quantum one-time pads, quantum bases, requests, messages, control signals, quantum particle measurement schedules and related information, electronic information, numbers, cryptographic keys, cryptographic techniques, machine learning techniques, GUI data, QC detection techniques, any other suitable data or electronic information, any links or pointers thereto, or combinations thereof. In some embodiments, the computing device 110 may include or store various quantum information, such as one or more quantum particles, quantum one-time pads, quantum cryptographic keys, any other suitable quantum information, any other suitable quantum information, any links or pointers thereto, or combinations thereof.

In some embodiments, the computing device 110 may comprise, or be communicatively coupled to, a QERNG device 111. The QERNG device 111 may be embodied by any suitable QERNG device, such as an optoelectronic device (e.g., a PLM; a laser device). In some embodiments, the QERNG device 111 may include or store various data and electronic information. For example, the QERNG device 111 may include or store one or more control signals, electronic information indicative of one or more quantum bases (including, but not limited to, one or more private (e.g., confidential, secure, encrypted) sets of quantum bases), time-dependent quantum encoding schedules, unit-dependent quantum encoding schedules, pseudo-random quantum basis selection techniques, or any combination thereof. Alternatively, some or all of this information may be stored in a quantum authentication device communicatively coupled to the QERNG device 111, in the QEA system 102, or in a combination of the quantum authentication device and the QEA system 102. In some embodiments, the QERNG device 111 may include programmable firmware for receiving control signals and electronic instructions. In some embodiments, the QERNG device 111 may be communicatively coupled to the QEA system 102 by the quantum line 120 and is configured to receive, for example, a second number, generated based on a second subset of the first set of entangled quantum particles associated with a second computing device (e.g., computer device 112), and a first electronic identification of a first subset of a first set of entangled quantum particles from the QEA system 102 over the quantum line 120. In some embodiments, the QERNG device 111 may comprise bit manipulator circuitry configured to convert quantum particle measurements into streams of classical bits.

Computing devices 112 and 114 may be embodied by one or more computing devices. Information received by the QEA system 102 from the computing device 112 or computing device 114 may be provided in various forms and via various methods. For example, computing devices 112 and 114 may be a smartphone, laptop computer, netbook, tablet computer, wearable device, desktop computer, ATM, PoS device, electronic workstation, or the like, and the information may be provided through various modes of data transmission provided by these client devices. In some embodiments, computing devices 112 and 114 may include or store various data and electronic information associated with one or more users. For example, computing devices 112 and 114 may include or store user information (including, but not limited to, user profile information), any other suitable data, or any combination thereof. In some embodiments, computing devices 112 and 114 may include or store various data and electronic information associated with one or more quantum particles, quantum one-time pads, quantum bases, requests, messages, control signals, quantum particle measurement schedules and related information, electronic information, numbers, cryptographic keys, cryptographic techniques, machine learning techniques, GUI data, QC detection techniques, any other suitable data or electronic information, any links or pointers thereto, or combinations thereof. In some embodiments, the computing devices 112 and 114 may include or store various quantum information, such as one or more quantum particles, quantum one-time pads, quantum cryptographic keys, any other suitable quantum information, any other suitable quantum information, any links or pointers thereto, or combinations thereof.

In some embodiments, computing devices 112 and 114 may comprise, or be communicatively coupled to, a QERNG device, such as for example, QERNG 113 and QERNG 115, respectively. QERNG devices 113 and 115 may be embodied by any suitable QERNG device, such as an optoelectronic device (e.g., a PLM; a laser device). In some embodiments, QERNG devices 113 and 115 may include or store various data and electronic information. For example, QERNG devices 113 and 115 may include or store one or more control signals, electronic information indicative of one or more quantum bases (including, but not limited to, one or more private sets of quantum bases), time-dependent quantum encoding schedules, unit-dependent quantum encoding schedules, pseudo-random quantum basis selection techniques, or any combination thereof. Alternatively, some or all of this information may be stored in a quantum authentication device communicatively coupled to either of QERNG devices 113 and 115, in the QEA system 102, or in a combination of the quantum authentication device and the QEA system 102. In some embodiments, QERNG devices 113 and 115 may include programmable firmware for receiving control signals and electronic instructions. In some embodiments, QERNG devices 113 and 115 may be communicatively coupled to the QEA system 102 by the quantum lines 122 and 124, respectively. QERNG device 113 may be configured to receive, for example, the first number, generated based on a first subset of the first set of entangled quantum particles associated with a first computing device (e.g., computing device 110) and a second electronic identification of the second subset of the first set of entangled quantum particles from the QEA system 102 over the quantum line 122. In some embodiments, the QERNG devices 113 and 115 may comprise bit manipulator circuitry configured to convert quantum particle measurements into streams of classical bits.

In embodiments where a computing device, such as one of computing devices 112 and 114, is a mobile device, such as a smartphone or tablet, the mobile device may execute an "app" (e.g., a thin-client application) to interact with the QERNG device, such as, for example, QERNG 113, QERNG 115, the QEA system 102, the computing device 110, the QERNG device 111, another computing device or client device, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The remote server device 116 may be embodied by one or more computing devices. In some embodiments, the computing device 116 may be embodied as one or more servers, remote servers, cloud-based servers (e.g., cloud utilities), processors, or any other suitable devices, or any combination thereof. In some embodiments, remote server device 116 may be implemented as a session server. In some embodiments, the remote server device 116 may receive, process, generate, and transmit data, signals, and electronic information to facilitate the operations of the QEA system 102. Information received by the QEA system 102 from remote server device 116 may be provided in various forms and via various methods. In some embodiments, remote server device 116 may include or store various data and electronic information associated with one or more quantum particles, quantum one-time pads, quantum bases, requests, messages, control signals, quantum particle measurement schedules and related information, electronic information, numbers, cryptographic keys, cryptographic techniques, machine learning techniques, GUI data, QC detection techniques, any other suitable data or electronic information, any links or pointers thereto, or combinations thereof. In some embodiments, remote server device 116 may include or store various quantum information, such as one or more quantum particles, quantum one-time pads, quantum cryptographic keys, any other suitable quantum information, any other suitable quantum information, any links or pointers thereto, or combinations thereof.

In some embodiments, remote server device 116 may comprise, or be communicatively coupled to, a QERNG device 117. The QERNG device 117 may be embodied by any suitable QERNG device, such as an optoelectronic device (e.g., a PLM; a laser device). In some embodiments, the QERNG device 117 may include or store various data and electronic information. For example, the QERNG device 117 may include or store one or more control signals, electronic information indicative of one or more quantum bases (including, but not limited to, one or more private (e.g., confidential, secure, encrypted) sets of quantum bases), time-dependent quantum encoding schedules, unit-dependent quantum encoding schedules, pseudo-random quantum basis selection techniques, or any combination thereof. Alternatively, some or all of this information may be stored in a quantum authentication device communicatively coupled to the QERNG device 117, in the QEA system 102, or in a combination of the quantum authentication device and the QEA system 102. In some embodiments, the QERNG device 117 may include programmable firmware for receiving control signals and electronic instructions. In some embodiments, the QERNG device 117 may be communicatively coupled to the QEA system 102 by the quantum line 126 and is configured to receive a first set of entangled quantum particles and, in some embodiments, a second set of entangled quantum particles, from the QEA system 102 over the quantum line 126. In some embodiments, the QERNG device 117 may comprise bit manipulator circuitry configured to convert quantum particle measurements into streams of classical bits.

In some embodiments, the computing device 110, the QERNG device 111, the computing device 112, the QERNG device 113, the computing device 114, the QERNG device 115, the remote server device 116, the QERNG device 117, or any combination thereof may interact with the QEA system 102 over one or more communications networks 108. In some embodiments, the QEA system 102 may comprise the QERNG device 111, which may be communicatively coupled to the QEA server device 104 over the quantum line 120, and which may be further communicatively coupled to the server device 110 via the one or more communications networks 108. In some embodiments, the QEA system 102 may comprise the QERNG device 113, which may be communicatively coupled to the QEA server device 104 over the quantum line 122, and which may be further communicatively coupled to the client device 112 via the one or more communications networks 108. In some embodiments, the QEA system 102 may comprise each of the QERNG device 111, the QERNG device 113, and the QERNG device 117, which may be communicatively coupled to the QEA server device 104 over the quantum line 120 and the quantum line 122, respectively, and which may be further communicatively coupled to the server device 110 and the client device 112, respectively, via the one or more communications networks 108.

In some embodiments, the computing device 110, the QERNG device 111, the computing device 112, the QERNG device 113, the computing device 114, the QERNG device 115, the remote server device 116, the QERNG device 117, or a combination thereof may include various hardware or firmware designed to interface with the QEA system 102. For example, an example computing device 110 may be a session authentication server modified to communicate with the QEA system 102, and another example computing device 110 may be a purpose-built session authentication server offered for the primary purpose of communicating with the QEA system 102. As another example, an example computing device 112 may be a user's smartphone and may have an application stored thereon facilitating communication with the QEA system 102, whereas another example computing device 112 may be a purpose-built device offered for the primary purpose of communicating with the QEA system 102.

In some embodiments, the computing device 110, the QERNG device 111, the computing device 112, the QERNG device 113, the computing device 114, the QERNG device 115, the remote server device 116, the QERNG device 117, or any combination thereof may interact with the QEA system 102 over one or more PQC communications channels. The PQC communications channel may be, for example, a communications channel over which data is transmitted and received using a PQC cryptographic technique, such as a PQC back channel (e.g., a PQC out-of-band communications channel). In some embodiments, the QEA system 102 may upgrade the application software in a computing device 110 or a computing device 112 so that the upgraded application software is configured to recognize a PQC communications channel and allow communication with the QEA system 102 over the PQC communications channel. In some embodiments, where a computing device 110 or a computing device 112 is a non-PQC device (e.g., a computing device that is not configured to interact with, or capable of interacting with, the QEA system 102 over a PQC communications channel), that non-PQC device may interact with the QEA system 102 over a PQC communications channel using a PQC shim or PQC add-on device configured to allow communication with the QEA system 102 over the PQC communications channel. In one example, the QEA system 102 may determine that a computing device 110 or a computing device 112 is a non-PQC device and transmit a PQC shim to that non-PQC device for installation (e.g., automatic installation, manual installation) in the protocol stack of that device. The PQC shim may be embodied as, for example, computer program instructions (e.g., software, firmware). In another example where the computing device 110 or the computing device 112 is a non-PQC device, a PQC add-on device may be communicatively coupled to the non-PQC device. The PQC add-on device may be embodied as, for example, a PQC peripheral device communicatively coupled (e.g., via a wired communications path, wireless communications path, or both) to the non-PQC device. Additionally, or alternatively, the PQC add-on device may be embodied as, for example, a PQC application specific integrated circuit (ASIC) installed within a housing of the non-PQC device, or any other suitable device or circuitry. In some embodiments, the PQC shim may comprise a set of routines with network capability and a PQC endpoint.

In some embodiments, the QEA system 102 may communicate with one or more of the computing device 110, the QERNG device 111, the computing device 112, the QERNG device 113, the computing device 114, the QERNG device 115, the remote server device 116, the QERNG device 117, any other suitable device, or any combination thereof using a PQC communications channel-based cryptographic technique. In one example embodiment implementing a PQC communications channel-based cryptographic technique, the QEA system 102 may transmit a first portion of an electronic communication (e.g., overhead data) over a non-PQC communications channel (e.g., a communications channel through one or more communications networks 108) to one or more of the computing device 110, the QERNG device 111, the computing device 112, the QERNG device 113, the computing device 114, the QERNG device 115, the remote server device 116, the QERNG device 117, any other suitable device, or any combination thereof. The QEA system 102 may further transmit a second portion of the electronic communication (e.g., payload data) over a PQC communications channel (e.g., a back channel or out-of-band communications channel through one or more communications networks 108) to the computing device 110, the QERNG device 111, computing device 112, the QERNG device 113, the computing device 114, the QERNG device 115, the remote server device 116, the QERNG device 117, any other suitable device, or any combination thereof.

QEA system 102 may provide for encrypted communication between computing devices via QEA, and specifically, for enabling multiple (e.g., 2 to N) devices to exchange communications encrypted based on the shared secret. In particular, QEA system 102 may be configured for generating, by quantum cryptographic circuitry, a first number based on a first subset of a first set of entangled quantum particles associated with a first computing device, and a second number based on a second subset of the first set of entangled quantum particles associated with a second computing device, wherein each entangled quantum particle in the first set of entangled quantum particles is entangled with a respective entangled quantum particle in a second set of entangled quantum particles. The second number and a first electronic identification of the first subset of the first set of entangled quantum particles are then transmitted to the first computing device and the first number and a second electronic identification of the second subset of the first set of entangled quantum particles are transmitted to the second computing device. QEA system 102 may be configured for then authenticating a session between the first computing device and the second computing device.

In some embodiments, computing device 110 or computing device 112 may be configured to authenticate a session between the two computing devices. QEA server device 104 (or, in some instances, the QEA system 102) may be configured to receive, for example, at QERNG device 107 and/or QERNG 117 a measurement initiation control signal indicative of an instruction to initiate measurement and in response to receipt of the measurement initiation control signal, measure entangled quantum particles (e.g., the first subset of the first set of entangled quantum particles and separately, the second subset of the first set of entangled quantum particles. In particular, in response to receipt of the measurement initiation control signal, QERNG device 107 and/or QERNG 117 may be configured to measure the first subset of the first set of entangled quantum particles based on a first set of quantum bases (e.g., that are stored locally by the QERNG device 107, or that are received from QEA server device 104 or the QEA system 102) and the second subset of the first set of entangled quantum particles based on a second set of quantum bases. The measurement of the first set of entangled quantum particles will cause the second set of entangled quantum particles to collapse onto correlated (e.g., complimentary), or identical, quantum states.

In some embodiments, a set of quantum bases (e.g., the first and/or second set of quantum bases) may comprise a plurality of quantum bases. In some embodiments, the set of quantum bases may comprise a pair of orthogonal photonic polarization states. In some embodiments, the pair of orthogonal photonic polarization states may be selected (e.g., by the QERNG device 107, QERNG device 117, QEA server device 104, or the QEA system 102) at least partially from the group consisting of a pair of rectilinear photonic polarization states, a pair of diagonal photonic polarization states, and a pair of circular photonic polarization states. In some embodiments, the QEA system 102 may be configured to determine the set of quantum bases using a pseudo-random quantum basis selection technique.

In some embodiments, a subset of the first set of entangled quantum particles (e.g., the first subset and/or the second subset of the first set of entangled quantum particles), the set of quantum bases (e.g., as described above as, for example, one or both of the first set of quantum bases and second set of quantum bases), or both may be determined (e.g., by the QERNG device 107, QEA server device 104, or the QEA system 102) based on a time-dependent quantum measurement schedule. The time-dependent quantum measurement schedule may comprise a plurality of subsets of the first set of entangled quantum particles respectively corresponding to a plurality of time periods and a plurality of sets of quantum bases. In some embodiments, the QEA system 102 may generate the time-dependent quantum measurement schedule based on one or more time periods of the day (e.g., Coordinated Universal Time (UTC) ranges, International Atomic Time (TAI) ranges, Global Positioning System (GPS) time ranges, Greenwich Mean Time (GMT) ranges, United States Naval Observatory (USNO) time ranges, Zulu time ranges), time periods or frequencies agreed upon by the server device 110 and the client device 112, any other suitable information, or any combination thereof.

In some embodiments, the subset of the first set of entangled quantum particles may be determined (e.g., by the QERNG device 107, QEA server device 104, or the QEA system 102) based on the time-dependent quantum measurement schedule and a measurement time value. For example, the time-dependent quantum measurement schedule may indicate that a number (e.g., a random number) is to be generated based on: (i) a first subset of the first set of entangled quantum particles (e.g., quantum storage cells 1 through 128) and a first set of quantum bases (e.g., the pair of rectilinear photonic polarization states for each odd-numbered quantum storage cell, the pair of diagonal photonic polarization states for each even-numbered quantum storage cell) during a first time window (e.g., 00:00:00 to 01:00:00 UTC); and (ii) a second subset of the first set of entangled quantum particles (e.g., quantum storage cells 129 through 248) and a second set of quantum bases (e.g., the pair of rectilinear photonic polarization states for quantum storage cells 129 through 152, the pair of diagonal photonic polarization states for quantum storage cells 153 through 170, the pair of circular photonic polarization states for quantum storage cells 171 through 212, and the pair of rectilinear photonic polarization states for quantum storage cells 213 through 248) during a second time window (e.g., 01:00:00 to 02:00:00 UTC). In one illustrative example, if the QERNG device 107 determines that the measurement time value is 00:11:30 UTC, the QERNG device 107 may generate the number based on the first subset of the first set of entangled quantum particles and the first set of quantum bases because the measurement time value is within the first time window. Alternatively, if the QERNG device 107 determines that the measurement time value is 01:01:45 UTC, the QERNG device 107 may generate the number based on the second subset of the first set of entangled quantum particles and the second set of quantum bases because the measurement time value is within the second time window.

In some embodiments, a subset of the first set of entangled quantum particles (e.g., as described above as, for example, the first subset and/or the second subset of the first set of entangled quantum particles), the set of quantum bases (e.g., as described above as, for example, one or both of the first set of quantum bases and second set of quantum bases), or both may be determined (e.g., by the QERNG device 107, QEA server device 104, or the QEA system 102) based on a sequence-dependent quantum measurement schedule. In some embodiments, the sequence-dependent quantum measurement schedule may comprise a predetermined sequence for each of the QERNG device 107 and the QERNG device 117 to measure their respective set of entangled quantum particles, such that subsets of entangled quantum particles are measured in a predetermined order so that correlated random numbers may be generated at both the QERNG device 107 and the QERNG device 117 throughout the lifetimes of the respective sets of entangled quantum particles (e.g., when all of the entangled quantum particles have been measured). In some embodiments, the QEA system 102 may generate the sequence-dependent quantum measurement schedule based on one or more random numbers; times of day (e.g., UTC values, International Atomic Time (TAI) values, Global Positioning System (GPS) time values, Greenwich Mean Time (GMT) values, United States Naval Observatory (USNO) time values, Zulu time values); Fibonacci number series; numbers, values, sequences, or frequencies agreed upon by QEA server device 104 and the computing device 110, QERNG device 111 computing device 112, QERNG device 113, computing device 114, or QERNG device 115; any other suitable information; or any combination thereof.

In some embodiments, the sequence-dependent quantum measurement schedule may comprise a plurality of subsets of the first set of entangled quantum particles respectively corresponding to a plurality of sequence identifiers and a plurality of sets of quantum bases. In some embodiments, the subset of the first set of entangled quantum particles may be determined (e.g., by the QERNG device 107, QEA server device 104, or the QEA system 102) based on the sequence-dependent quantum measurement schedule and a measurement sequence value. For example, the sequence-dependent quantum measurement schedule may indicate that (i) the first quantum entanglement random number is to be generated based on a first subset of the first set of entangled quantum particles and a first set of quantum bases; (ii) the second quantum entanglement random number is to be generated based on a second subset of the first set of entangled quantum particles and a second set of quantum bases; and so on, such that the i-th number is to be generated based on an i-th subset of the first set of entangled quantum particles and an i-th set of quantum bases, where i represents the current measurement sequence value and is an integer greater than or equal to one and less than or equal to N, where N represents the total number of measurement sequence values and is an integer greater than or equal to one. In one illustrative example, if the QERNG device 107 determines that the measurement sequence value is "i" (e.g., "1"; the first quantum entanglement random number to be generated), the QERNG device 107 may generate the number based on the first subset of the first set of entangled quantum particles and the first set of quantum bases because the measurement time value is within the first time window. Alternatively, if the QERNG device 107 determines that the measurement sequence value is "i+1" (e.g., "2"; the second quantum entanglement random number to be generated), and N is greater than or equal to two, the QERNG device 107 may generate the number based on the second subset of the first set of entangled quantum particles and the second set of quantum bases because the measurement time value is within the second time window.

In some embodiments, the QERNG device 107 may be configured to generate a first quantum entanglement random number based on the measured first subset of the first set of entangled quantum particles and a second quantum entanglement random number based on the measured second subset of the first set of entangled quantum particles. In some embodiments, QERNG device 107, QEA server device 104, remote server device 116, and/or QERNG device 117 may be configured to generate a session key (e.g., a first or initial session key, as new session keys may be generated based on embodiments provided herein wherein authentication of sessions including, for example, one or more additional parties are requested) based on the first quantum entanglement random number and the second quantum entanglement random number. For example, the QERNG device 107, QEA server device 104, or both may be configured to generate the session key by setting the session key equal to a product of the first quantum entanglement random number and the second quantum entanglement random number. In some embodiments, QERNG device 107, QEA server device 104, remote server device 116, and/or QERNG device 117 may be configured to generate a random number based on the first quantum entanglement random number and use the generated random number as a seed in a pseudo-random number generation technique.

In some embodiments, QERNG device 107, QEA server device 104, remote server device 116, and/or QERNG device 117 may be configured to transmit, for example, the second quantum entanglement random number, a first electronic identification of the measured first subset of the first set of entangled quantum particles and a first set of quantum bases used to measure those quantum particles to, for example, the QERNG device 111, computing device 110, or the QEA system 102 over the one or more communications networks 108. For example, the first electronic identification of the subset of the first set of entangled quantum particles may comprise an electronic identification of the respective quantum storage cell (e.g., the quantum storage cell's coordinates of each entangled quantum particle in the first subset of the first set of entangled quantum particles. The first electronic identification of the respective quantum storage cell may be, for example, the quantum storage cell's coordinates (e.g., "[i,j]," where i is an integer between 1 and N, and j is an integer between 1 and M), cell number (e.g., "3" or "003 of 128"), or cell identification (ID) (e.g., "43191," "0749eb90," "f0327d609548d062"), any other suitable electronic identification, or any combination thereof. In some embodiments, the first electronic identification of the subset of the first set of entangled quantum particles may further comprise a first electronic indication of the measurement time value (e.g., a time window, a time bin, or an actual time, such as HH:MM:SS UTC). In some embodiments, the first electronic identification of the first subset of the first set of entangled quantum particles may further comprise a first electronic indication of the measurement sequence value (e.g., "i=3" and "N=35" to denote the third subset of a total of thirty-five subsets of entangled quantum particles).

In some embodiments, QERNG device 107, QEA server device 104, remote server device 116, and/or QERNG device 117 may be configured to transmit the second number, the first electronic identification of the measured first subset of the first set of entangled quantum particles, the first set of quantum bases used to measure those quantum particles to the QEA system 102 over the one or more communications networks 108 for transmission to computing device 110 or QERNG device 111. In some embodiments, QERNG device 107, QEA server device 104, remote server device 116, and/or QERNG device 117 may be configured to transmit the second number and the first electronic identification by digitally signing, for example, a first electronic message with the electronic identification of the first measured subset of the first set of entangled quantum particles and the set of quantum bases used to measure those quantum particles and transmitting the digitally-signed first electronic message to QERNG device 107, computing device 110, or QERNG device 111, or a combination thereof over the one or more communications networks 108. In some embodiments, the QERNG device 107, QEA server device 104, remote server device 116, and/or QERNG device 117 may be further configured to transmit at least a portion of the foregoing electronic information and data to QERNG device 107, computing device 110, or QERNG device 111, and/or the QEA system 102, or a combination thereof over a PQC communications channel via the one or more communications networks 108.

In some embodiments, QERNG device 107, QEA server device 104, remote server device 116, and/or QERNG device 117 may be configured to transmit, for example, the first quantum entanglement random number, a second electronic identification of the measured second subset of the first set of entangled quantum particles and a second set of quantum bases used to measure those quantum particles to, for example, the QERNG device 113, computing device 112, or the QEA system 102 over the one or more communications networks 108. For example, the second electronic identification of the second subset of the first set of entangled quantum particles may comprise an electronic identification of the respective quantum storage cell (e.g., the quantum storage cell's coordinates of each entangled quantum particle in the second subset of the first set of entangled quantum particles. The second electronic identification of the respective quantum storage cell may be, for example, the quantum storage cell's coordinates (e.g., "[i, j]," where i is an integer between 1 and N, and j is an integer between 1 and M), cell number, or cell ID, any other suitable electronic identification, or any combination thereof. In some embodiments, the second electronic identification of the second subset of the first set of entangled quantum particles may further comprise a second electronic indication of the measurement time value (e.g., a time window, a time bin, or an actual time, such as HH:MM:SS UTC). In some embodiments, the second electronic identification of the second subset of the first set of entangled quantum particles may further comprise a second electronic indication of the measurement sequence value (e.g., "i=3" and "N=35" to denote the third subset of a total of thirty-five subsets of entangled quantum particles).

In some embodiments, QERNG device 107, QEA server device 104, remote server device 116, and/or QERNG device 117 may be configured to transmit the first number, the second electronic identification of the measured second subset of the first set of entangled quantum particles, the second set of quantum bases used to measure those quantum particles to the QEA system 102 over the one or more communications networks 108 for transmission to QERNG device 113 and/or computing device 112. In some embodiments, QERNG device 107, QEA server device 104, remote server device 116, and/or QERNG device 117 may be configured to transmit the first number and the second electronic identification by digitally signing, for example, a second electronic message with the electronic identification of the second measured subset of the first set of entangled quantum particles and the second set of quantum bases used to measure those quantum particles and transmitting the digitally-signed first electronic message to QERNG device 107, QERNG device 113, computing device 112, or a combination thereof over the one or more communications networks 108. In some embodiments, the QERNG device 107, QEA server device 104, remote server device 116, and/or QERNG device 117 may be further configured to transmit at least a portion of the foregoing electronic information and data to QERNG device 107, QERNG device 113, computing device 112, and/or the QEA system 102, or a combination thereof over a PQC communications channel via the one or more communications networks 108.

In some embodiments, computing device 110 and/or QERNG 111 may be configured to receive the second number, the first electronic identification of the measured first subset of the first set of entangled quantum particles, the first set of quantum bases used to measure those quantum particles from the QERNG device 107, QEA server device 104, or the QEA system 102 over the one or more communications networks 108, directly or via remote server device 116 and/or QERNG device 117.

In some embodiments, computing device 112 and/or QERNG 113 may be configured to receive the first number, the second electronic identification of the measured second subset of the first set of entangled quantum particles, and the second set of quantum bases used to measure those quantum particles from, for example, the QERNG device 107, QEA server device 104, or the QEA system 102 over the one or more communications networks 108, directly or via remote server device 116 and/or QERNG device 117.

In some embodiments, QERNG device 117 may receive a measurement initiation request from, for example, computing device 110 that includes, again, for example, the electronic identification of the first subset of the first set of entangled quantum particles (e.g., a request to generate a number based on cell 23). In response to the request, from for example computing device 110, subsequent to computing device 110 having received the second number, the first electronic identification of the measured first subset of the first set of entangled quantum particles, the first set of quantum bases used to measure those quantum particles, the QERNG device 117 may be configured to measure, based on the first set of quantum bases (e.g., that are received from the QERNG device 107, QEA server device 104, or the QEA system 102, directly or indirectly via the computing device 110), a subset of the second set of entangled quantum particles that corresponds to the first subset of the first set of entangled quantum particles associated with the QERNG device 111.

QERNG device 117 may also receive a measurement initiation request from, for example, computing device 112 that includes, for example, the electronic identification of the second subset of the first set of entangled quantum particles. In response to the request, from for example computing device 112 subsequent to computing device 112 having received the first number, the second electronic identification of the measured second subset of the first set of entangled quantum particles, the second set of quantum bases used to measure those quantum particles, the QERNG device 117 may be configured to measure, based on the second set of quantum bases (e.g., that are received from the QERNG device 107, QEA server device 104, or the QEA system 102, directly or indirectly via the computing device 112), a subset of the second set of entangled quantum particles that corresponds to the second subset of the first set of entangled quantum particles associated with the QERNG device 113.

The prior measurement of the first subset of the first set of entangled quantum particles by the QERNG device 107 will have caused the corresponding subset of the second set of entangled quantum particles to collapse onto correlated (e.g., complimentary), or identical, quantum states and thus measurement of the corresponding subset of the second set of entangled quantum particles by the QERNG device 117 based on the same (e.g., first) set of quantum bases will be correlated, or identical, to the measured first subset of the first set of entangled quantum particles.

Similarly, the prior measurement of the second subset of the first set of entangled quantum particles by the QERNG device 107 will have caused it's corresponding subset of the second set of entangled quantum particles to collapse onto correlated (e.g., complimentary), or identical, quantum states and thus measurement of the corresponding subset of the second set of entangled quantum particles by the QERNG device 117 based on the same (e.g., second) set of quantum bases will be correlated, or identical, to the measured second subset of the first set of entangled quantum particles.

In some embodiments, the QERNG device 117 may be configured to receive, from QEA server device 104, the QERNG device 107, computing device 110, or the QEA system 102, a measurement initiation control signal indicative of an instruction to initiate measurement. In response to receipt of the measurement initiation control signal, the QERNG device 117 may be configured to measure, for example, a first subset of the second set of entangled quantum particles. For example, computing device 110 may be configured to receive the first electronic identification from QEA server device 104 over the one or more communications networks 108, directly or indirectly via the QEA system 102. In response to receipt of the first electronic identification, computing device 110 may be configured to generate a measurement initiation control signal indicative of an instruction to initiate measurement and transmit the measurement initiation control signal to the QERNG device 117. In response to receipt of the measurement initiation control signal, the QERNG device 117 may be configured to measure the corresponding subset of the second set of entangled quantum particles based on the first set of quantum bases. In some embodiments, the QERNG device 117 may be configured to receive the measurement initiation control signal from the QEA server device 104, the QERNG device 107, computing device 110, or the QEA system 102.

In some embodiments, the QERNG device 117 may be configured to receive, from QEA server device 104, the QERNG device 107, computing device 112, or the QEA system 102, a measurement initiation control signal indicative of an instruction to initiate measurement. In response to receipt of the measurement initiation control signal, the QERNG device 117 may be configured to measure, for example, a second subset of the second set of entangled quantum particles. For example, computing device 112 may be configured to receive the second electronic identification from QEA server device 104 over the one or more communications networks 108, directly or indirectly via the QEA system 102. In response to receipt of the second electronic identification, computing device 112 may be configured to generate a measurement initiation control signal indicative of an instruction to initiate measurement and transmit the measurement initiation control signal to the QERNG device 117. In response to receipt of the measurement initiation control signal, the QERNG device 117 may be configured to measure the corresponding subset of the second set of entangled quantum particles based on the second set of quantum bases. In some embodiments, the QERNG device 117 may be configured to receive the measurement initiation control signal from the QEA server device 104, the QERNG device 107, computing device 112, or the QEA system 102.

In some embodiments, the QERNG device 117 may be configured to generate a third quantum entanglement random number based on the measured corresponding subset (e.g., to the first subset of the first set of entangled quantum particles) of the second set of entangled quantum particles. When measured as described above, the measured corresponding subset of the second set of entangled quantum particles will be correlated, or identical, to the measured first subset of the first set of entangled quantum particles. For example, in circumstances in which measurement of the quantum particles causes the quantum particles to collapse onto correlated (e.g., complimentary) quantum states, the QERNG device 113 may be configured to generate the third quantum entanglement random number by modifying each measured |0> to be a |1> and each measured |1> to be a|0>. Alternatively, in circumstances in which measurement of the quantum particles causes the quantum particles to collapse onto identical quantum states, the QERNG device 117 may be configured to generate the third quantum entanglement random number without modification, such that each measured |0> is a|0> and each measured |1> is a|1>. Accordingly, the third quantum entanglement random number generated by the QERNG device 117 using this technique will be a duplicate of the first quantum entanglement random number generated by the QERNG device 107 without the first quantum entanglement random number having been transmitted to, or otherwise shared with, any device (e.g., other than the QERNG device 107 and QEA server device 104).

In some embodiments, QERNG device 117 may be configured to then transmit the third number, which is a duplicate of the first number, to computing device 110. Computing device 110 now possesses both the second number and the third number, which is the duplicate of the first number, without having ever received the first number.

In some embodiments, the QERNG device 117 may be configured to generate a fourth quantum entanglement random number based on the measured corresponding subset (e.g., to the second subset of the first set of entangled quantum particles) of the second set of entangled quantum particles. When measured as described above, the measured corresponding subset of the second set of entangled quantum particles will be correlated, or identical, to the measured second subset of the first set of entangled quantum particles. For example, in circumstances in which measurement of the quantum particles causes the quantum particles to collapse onto correlated (e.g., complimentary) quantum states, the QERNG device 113 may be configured to generate the fourth quantum entanglement random number by modifying each measured |0> to be a |1> and each measured |1> to be a|0>. Alternatively, in circumstances in which measurement of the quantum particles causes the quantum particles to collapse onto identical quantum states, the QERNG device 117 may be configured to generate the fourth quantum entanglement random number without modification, such that each measured |0> is a|0> and each measured |1> is a |1>. Accordingly, the fourth quantum entanglement random number generated by the QERNG device 117 using this technique will be a duplicate of the second quantum entanglement random number generated by the QERNG device 107 without the second quantum entanglement random number having been transmitted to, or otherwise shared with, any device (e.g., other than the QERNG device 107 and QEA server device 104).

In some embodiments, QERNG device 117 may be configured to then transmit the fourth number, which is a duplicate of the second number, to computing device 112. Computing device 112 now possesses both the first number and the fourth number, which is the duplicate of the second number, without having ever received the second number.

In some embodiments, computing device 110 may be configured to generate a session key based on the second number, which computing device 110 has been in possession of, and the third number, which computing device 110 received from remote server device 116 or QERNG device 117 in response to the measurement initiation request. In such a circumstance, the session key generated by computing device 110 (i.e., the first session key) will be a duplicate of the session key generated by the QERNG device 107 or QEA server device 104 without the session key having been transmitted to, or otherwise shared with, any device (e.g., other than the QERNG device 107 and QEA server device 104), and in particular, the first computing device 110.

In some embodiments, computing device 112 may be configured to generate a session key based on the first number, which computing device 112 has been in possession of, and the fourth number, which computing device 112 received from remote server device 116 or QERNG device 117 in response to the measurement initiation request. In such a circumstance, the session key generated by computing device 112 (i.e., a second session key) will also be a duplicate of the session key generated by the QERNG device 107 or QEA server device 104 without the session key having been transmitted to, or otherwise shared with, any device (e.g., other than the QERNG device 107 and QEA server device 104), and in particular, the second computing device 112.

In some embodiments, computing device 110 may be configured to receive, from the second computing device, a first number and a fourth number, or in some embodiments, the second session key. Subsequently, in some embodiments, computing device 110 may be configured to authenticate a session between the first computing device 110 and second computing device 112, for example, by session authentication circuitry of the first computing device, in an instance in which the third number corresponds to the first number and the fourth number corresponds to the second number, a session between the first computing device and the second computing device 112. Additionally or alternatively, in some embodiments, computing device 110 may be configured to authenticate a session between the first computing device 110 and second computing device 112, for example, by session authentication circuitry of the first computing device, in an instance in which the first session key matches the second session key.

Additionally or alternatively, in some embodiments, computing device 110 may be configured to transmit, over the one or more communications networks 108, directly or indirectly via the QEA system 102, the first session key (e.g., the session key that computing device 110 generated based on the second number and the third number), and additionally or alternatively, computing device 110 may be configured to transmit, over the one or more communications networks 108, directly or indirectly via the QEA system 102, the third number to QERNG device 107 and QEA server device 104. Computing device 112 may be configured to transmit, over the one or more communications networks 108, directly or indirectly via the QEA system 102, the second session key (e.g., the session key that computing device 112 generated based on the first number and the fourth number), and additionally or alternatively, computing device 110 may be configured to transmit, over the one or more communications networks 108, directly or indirectly via the QEA system 102, the fourth number to QERNG device 107 and QEA server device 104.

Accordingly, QEA system 102, QERNG device 107, QEA server device 104, or any combination thereof may be configured to then receive, from computing device 110, the first session key from computing device 110 generated based on the second number and the third number, the third number, or both over the one or more communications networks 108, directly or indirectly via the QEA system 102. Moreover, QEA system 102, QERNG device 107, QEA server device 104, or any combination thereof may be configured to then receive, from computing device 112, over the one or more communications networks 108, directly or indirectly via the QEA system 102, the second session key that computing device 112 generated based on the first number and the fourth number, the fourth number, or both.

In some embodiments, computing device 110 may be configured to transmit the third number, the session key generated based off the second number and the third number, or both to the QERNG device 107, the QEA server device 104, or both over the one or more communications networks 108, directly or indirectly via the QEA system 102. In some embodiments, computing device 110 may be configured to transmit the third number, the session key generated based off the second number and the third number, or both by digitally signing an electronic message with second number, the session key, or both and transmitting the digitally-signed electronic message to the QERNG device 107, QEA server device 104, the QEA system 102, or a combination thereof over the one or more communications networks 108. In some embodiments, computing device 110 may be further configured to transmit at least a portion of the foregoing electronic information and data to QERNG device 107, QEA server device 104, the QEA system 102, or a combination thereof over a PQC communications channel via the one or more communications networks 108.

In some embodiments, computing device 112 may be configured to transmit the fourth number, the session key generated based off the first number and the fourth number, or both to the QERNG device 107, the QEA server device 104, or both over the one or more communications networks 108, directly or indirectly via the QEA system 102. In some embodiments, computing device 112 may be configured to transmit the fourth number, the session key generated based off the first number and the fourth number, or both by digitally signing an electronic message with first number, the session key, or both and transmitting the digitally-signed electronic message to the QERNG device 107, QEA server device 104, the QEA system 102, or a combination thereof over the one or more communications networks 108. In some embodiments, computing device 112 may be further configured to transmit at least a portion of the foregoing electronic information and data to QERNG device 107, QEA server device 104, the QEA system 102, or a combination thereof over a PQC communications channel via the one or more communications networks 108.

In some embodiments, QERNG device 107, QEA server device 104, the QEA system 102, or a combination thereof may be configured to receive the third number, the session key generated based off the second number and the third number, or both from computing device 110 over the one or more communications networks 108, directly or via the QERNG device 111. In some embodiments, QERNG device 107, QEA server device 104, the QEA system 102 may be further configured to receive the fourth number, the session key generated based off the first number and the fourth number, or both from the computing device 112 or QERNG device 113 over a PQC communications channel via the one or more communications networks 108.

In some embodiments, in an instance in which the first session key received from computing device 110 (i.e., having been generated at computing device 110 based on the second number which was only sent computing device 110 and the third number) corresponds (e.g., is complimentary), or is identical to the second session key received from computing device 112 (i.e., having been generated at computing device 112 based on the first number which was only sent computing device 112 and the fourth number), QEA server device 104 may be configured to authenticate a session between computing device 110 and computing device 112. Additionally or alternatively, QEA server device 104 may be configured to compare the first session key, and separately, the second session key, to the previously generated session key (i.e., generated utilizing the first number and the second number, for example, before sending the first number to the second computing device 112 and the second number to the first computing device 110). In an instance in which the session keys match, correspond, (e.g., are complementary), or are identical, QEA server device 104 may be configured to authenticate a session between computing device 110 and computing device 112.

Example Implementing Apparatuses

The QEA system 102 described with reference to FIG. 1 may be embodied by one or more computing systems, such as apparatus 200 shown in FIG. 2A, apparatus 280 shown in FIG. 2B, and apparatus 290 shown in FIG. 2C. In some embodiments, apparatus 200 shown in FIG. 2A may represent an example QEA system 102, an example QEA server device 104, an example QEA database 106, or a combination thereof. In some embodiments, apparatus 280 shown in FIG. 2B may represent an example computing device 110, the QERNG device 111, the computing device 112, the QERNG device 113, the computing device 114, the QERNG device 115, the remote server device 116, the QERNG device 117, any other suitable device, or a combination thereof. In some embodiments, apparatus 290 shown in FIG. 2C may represent an example quantum authentication device configured to be communicatively coupled to a server device 110, QERNG device 111, client device 112, QERNG device 113, any other suitable device, or a combination thereof.

Figure 2A:
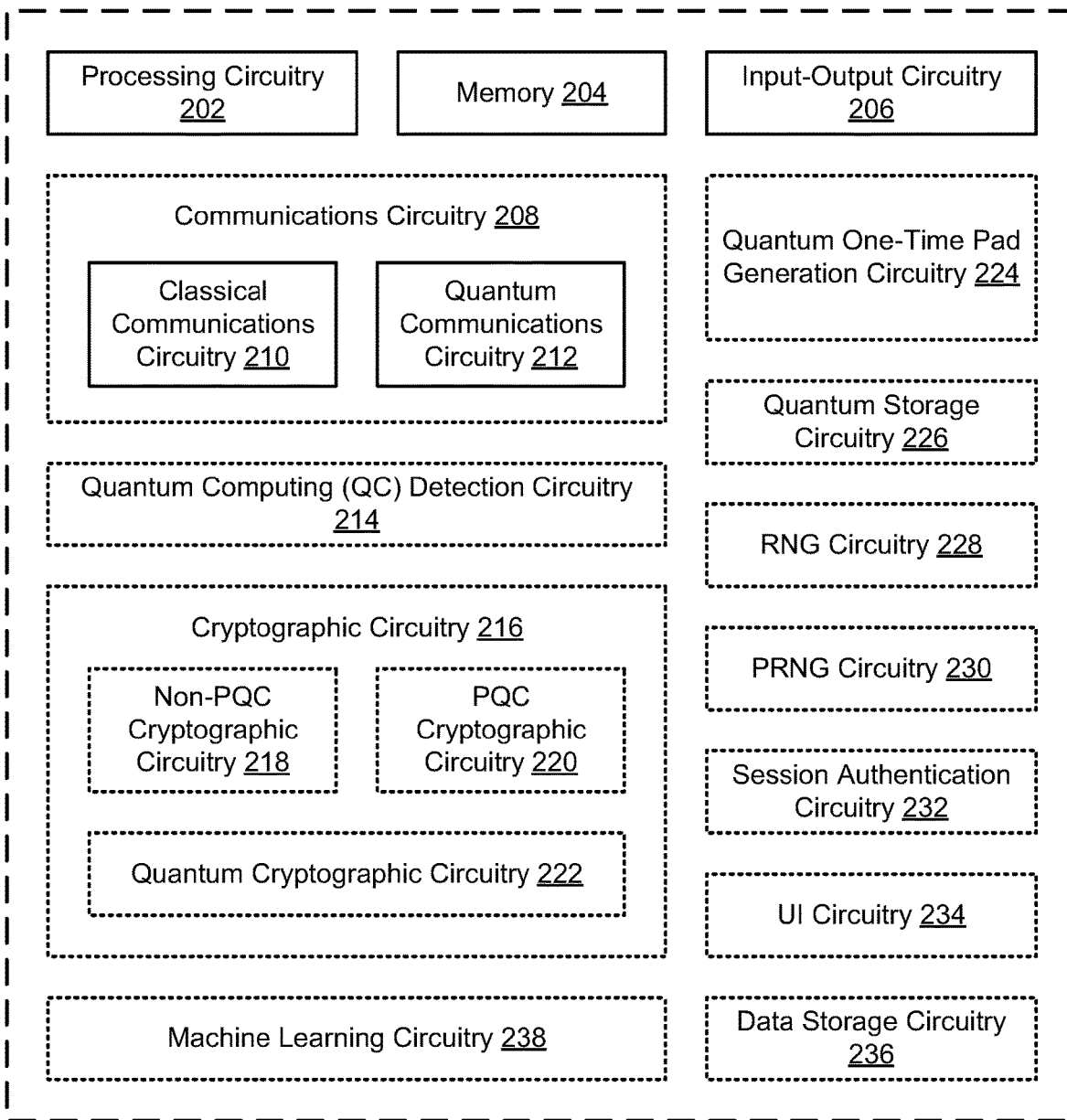
FIGS. 2A, 2B, and 2C illustrate schematic block diagrams of example circuitries that may perform various operations in accordance with some example embodiments described herein.

As illustrated in FIG. 2A, in some embodiments, the apparatus 200 may include one or more of processing circuitry 202, memory 204, input-output circuitry 206, communications circuitry 208 (including, but not limited to, classical communications circuitry 210 and, optionally, quantum communications circuitry 212), any other suitable circuitry, or any combination thereof. In some embodiments, the apparatus 200 may optionally include one or more of quantum computing (QC) detection circuitry 214, cryptographic circuitry 216 (including, but not limited to, non-PQC cryptographic circuitry 218, PQC cryptographic circuitry 220, and quantum cryptographic circuitry 222), quantum one-time pad generation circuitry 224, quantum storage circuitry 226, random number generation (RNG) circuitry 228, pseudo-random number generation (PRNG) circuitry 230, session authentication circuitry 232, user interface (UI) circuitry 234, data storage circuitry 236, machine learning circuitry 238, any other suitable circuitry, or any combination thereof. It will be understood, however, that additional components providing additional functionality may be included in the apparatus 200 without departing from the scope of the present disclosure. The apparatus 200 may be involved in execution of various operations described above with respect to FIGS. 1, 2A, and 2B and below with respect to FIGS. 3A, 3B, 3C, 4, 5, and 6.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store various data, data structures, data elements, and electronic information associated with one or more quantum particles (e.g., entangled quantum particles, measured quantum particles), quantum one-time pads, quantum bases, requests, messages, control signals (e.g., measurement initiation control signals, QC detection alert control signals, leakage alert control signals, tampering alert control signals), quantum particle measurement schedules and related information (e.g., time-dependent quantum measurement schedules, measurement time values, sequence-dependent quantum measurement schedules, measurement sequence values), electronic information (e.g., electronic identifications of entangled quantum particles, such as electronic identifications of their respective quantum storage cells; electronic identifications of quantum bases), numbers (e.g., random numbers, pseudo-random numbers), cryptographic keys (e.g., session keys, symmetric cryptographic keys), cryptographic techniques, machine learning techniques, GUI data, QC detection techniques (including, but not limited to, detection of quantum computing capabilities; data leakage detection techniques; and data tampering detection techniques), any other suitable data, data structures, data elements, or electronic information, any electronic identifications or indications thereof, and any combinations thereof. It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively, or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of software instructions, the instructions may specifically configure the processing circuitry 202 to perform the functionalities and operations described herein when the instructions are executed by the processing circuitry 202.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by UI circuitry 234) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 234) user interface data (e.g., QEA GUI data) for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit classical data, quantum information, or both from or to a network; any other device, circuitry, or module in communication with the apparatus 200; or any combination thereof. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network; any other device, circuitry, or module in communication with the apparatus 200; or any combination thereof. In this regard, the classical communications circuitry 210 may include, for example, a network interface for enabling electronic communications with a wired or wireless communications network. For example, the classical communications circuitry 210 may include one or more network interface cards, antennae, buses, switches, routers, modems, and supporting hardware and/or software, or any other device suitable for enabling electronic communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware (including, but not limited to, optoelectronic components) or a combination of hardware and software that is configured to receive and/or transmit quantum particles, such as photons, electrons, ions, or any other suitable quantum particle that are entangled with other quantum particles or not entangled with other quantum particles, from or to any other device or circuitry in communication with the apparatus 200.

The quantum communications circuitry 212 may be any device or circuitry embodied in either hardware or a combination of hardware and software that is configured to receive and/or transmit qubits from or to any other device or circuitry in communication with the apparatus 200. In this regard, the quantum communications circuitry 212 may include, for example, a quantum communications interface (including, but not limited to, one or more optoelectronic components) for enabling quantum communications over a quantum line. In some embodiments, the quantum communications circuitry 212 may be configured to receive (e.g., directly or indirectly, such as via switching circuitry) and transmit quantum particles, such as sets of entangled quantum particles. In some embodiments, the quantum communications circuitry 212 may be communicatively coupled to one or more quantum storage devices (e.g., quantum storage circuitry 226) configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC encryption attributes, a set of PQC encryption attributes, a set of QEA encryption attributes, or a combination thereof.

In some embodiments, the communications circuitry 208 may be configured to receive, retrieve, or obtain the data from a data storage device, such as memory 204, data storage circuitry 236, one or more of the one or more QEA databases 106, the one or more server devices 110, the one or more QERNG devices 111, the one or more client devices 112, the one or more QERNG devices 113, database server devices (including, but not limited to, one or more data storage devices communicatively coupled, either directly or indirectly, to the one or more database server devices), remote server devices, any other suitable device or circuitry, or a combination thereof.

In some embodiments, the communications circuitry 208 may be configured to transmit data to another circuitry or computing device. For example, the communications circuitry 208 may be configured to transmit: electronic identifications of entangled quantum particles, quantum bases; measurement initiation control signals; numbers (e.g., the first quantum entanglement random number, second quantum entanglement random number, third number, or fourth number described herein; any other suitable number or value; or any combination thereof); cryptographic keys (e.g., session keys, symmetric cryptographic keys); any other suitable information, or any combination thereof.

In some embodiments, the communications circuitry 208 may be configured to receive and/or transmit a time-dependent quantum measurement schedule comprising a plurality of subsets of the first set of entangled quantum particles respectively corresponding to a plurality of time periods and a plurality of sets of quantum bases. In some embodiments, the communications circuitry 208 may be configured to receive and/or transmit a measurement time value or an electronic indication of the measurement time value. In some embodiments, the communications circuitry 208 may be configured to receive and/or transmit a sequence-dependent quantum measurement schedule comprising a plurality of subsets of the first set of entangled quantum particles respectively corresponding to a plurality of sequence identifiers and a plurality of sets of quantum bases. In some embodiments, the communications circuitry 208 may be configured to receive and/or transmit a measurement sequence value or an electronic indication of the measurement sequence value.

The QC detection circuitry 214 includes hardware components designed or configured to request, receive, process, generate, and transmit data, data structures, control signals, and electronic information for use in quantum one-time pad generation, QERNG, QEA, PQC, or a combination thereof. In some embodiments, the QC detection circuitry 214 may be configured to monitor data, enveloped data structures, any other suitable data or electronic information, or any combination thereof.

In some embodiments, the QC detection circuitry 214 may be configured to generate QC detection data. In some embodiments, the QC detection data may comprise fictitious data, a fictitious code-signing certificate, any other suitable data, or any combination thereof. In some embodiments, the QC detection circuitry 214 may be configured to generate the QC detection data based on a machine learning technique, such as a machine learning technique provided or performed by the machine learning circuitry 238.

In some embodiments, the QC detection circuitry 214 may be configured to generate encrypted QC detection data for use in subsequent monitoring and QC detection. In some embodiments, the QC detection circuitry 214 may be configured to generate the encrypted QC detection data based on a digital signature-based QC detection technique configured to allow for detection, by the QC detection circuitry 214, of QC detection data (e.g., a fictitious electronic document) digitally signed using a destroyed RSA private key. In some embodiments, the QC detection circuitry 214 may be configured to generate the encrypted QC detection data based on an encryption-based QC detection technique configured to allow for detection, by the QC detection circuitry 214, of QC detection data (e.g., disclosed QC detection data that has been transmitted to a remote device) encrypted using a random AES key encrypted using a destroyed RSA private key. In some embodiments, the QC detection circuitry 214 may be configured to generate the encrypted QC detection data based on a code-sign-based QC detection technique configured to allow for detection, by the QC detection circuitry 214, of malware code-signed using a destroyed RSA private key. In some embodiments, the QC detection circuitry 214 may be configured to generate the encrypted QC detection data based on a certificate-based QC detection technique configured to allow for detection, by the QC detection circuitry 214, of QC detection data (e.g., a fictitious email certificate or legal sign certificate) signed by an issuer certificate authority using a destroyed RSA private key. In some embodiments, the QC detection circuitry 214 may be configured to generate the encrypted QC detection data based on a tamper seal-based QC detection technique configured to allow for detection, by the QC detection circuitry 214, of QC detection data (e.g., a fraudulent PDF document) with an embedded digital signed object.

In some embodiments, the QC detection circuitry 214 may be configured to monitor a set of data environments for electronic information related to the encrypted QC detection data. For example, the QC detection circuitry 214 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the QC detection circuitry 214 may be configured to monitor a set of external data environments (e.g., content delivery networks (CDNs), cloud service platforms, social media platforms, dark web sites) and, in some instances, flag uses of the unencrypted QC detection data or any other suitable data that made its way into the external data environment.

In some embodiments, the QC detection circuitry 214 may be configured to generate alerts and notifications, such as QC detection alert control signals, leakage alert control signals, and tampering alert control signals. In some embodiments, the QC detection circuitry 214 may be configured to generate a QC detection alert control signal in response to detection of the electronic information related to the encrypted QC detection data. For example, the QC detection circuitry 214 may be configured to generate a QC detection alert control signal when the detected electronic information related to the encrypted QC detection data comprises decrypted QC detection data that is the same as the QC detection data. In some embodiments, the QC detection alert control signal may indicate, for example, that the cryptographic technique used to encrypt the QC detection data has been compromised by quantum computing. In some embodiments, the QC detection alert control signal may be configured to instruct, or cause, the session authentication circuitry 232 to authenticate or re-authenticate sessions (e.g., sessions between server devices and client devices) using a QEA cryptographic technique having a cryptostrength that cannot be compromised by that particular quantum computer. In some embodiments, the QC detection alert control signal may be configured to instruct, or cause, the cryptographic circuitry 216 to encrypt or re-encrypt data (e.g., enveloped data structures stored in one or more internal or third-party data storage devices) using a PQC cryptographic technique having a cryptostrength that cannot be compromised by that particular quantum computer. In some embodiments, the QC detection alert control signal may be configured to instruct, or cause, the UI circuitry 234 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, wherein the QC detection circuitry 214 is configured to not transmit the encrypted QC detection data, the QC detection circuitry 214 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, who leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 234 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the QC detection circuitry 214 may be further configured to verify the detected digital signature based on the public cryptographic key. In some embodiments, the QC detection circuitry 214 may be further configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA-PSS; DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 234 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

In some embodiments, the QC detection circuitry 214 may be configured to generate a temporal PQC threat policy attribute indicative of an approximate time to a quantum computing threat (e.g., collapse time). In some embodiments, the QC detection circuitry 214 may be configured to generate the temporal PQC threat policy attribute based on a set of technological advancements included in the policy information. For example, the QC detection circuitry 214 may be configured to decrease the collapse time z described above with reference to Table 2 in accordance with the amount and significance of the technological advancements. In some embodiments, the QC detection circuitry 214 may be configured to generate the temporal PQC threat policy attribute based on the receipt of a QC detection alert control signal, a leakage alert control signal, a tampering alert control signal, any other suitable signal or data, or any combination thereof.

In some embodiments, the QC detection circuitry 214 may be configured to generate the temporal PQC threat policy attribute based on a quantum computing threat assessment data structure. The quantum computing threat assessment data structure may comprise, for example, a quantum computing threat assessment risk level and an electronic recommendation based on the quantum computing threat assessment risk level. In some embodiments, the QC detection circuitry 214 may be configured to generate the quantum computing threat assessment data structure based on security shelf-life, PQC migration time, collapse time, any other suitable parameter, or any combination thereof. For example, the QC detection circuitry 214 may be configured to generate a quantum computing threat assessment data structure in accordance with the quantum computing threat assessment inequalities shown below in Table 3:

TABLE 3

Example quantum computing threat assessment inequalities that may be used by the QEA system described herein to generate quantum computing threat assessment risk levels and electronic recommendations and control signals associated therewith.

| quantum Computing Threat Assessment Inequality | quantum Computing Threat Assessment Risk Level | Electronic Recommendation based on quantum Computing Threat Assessment |
|---|---|---|
| $(x + y) < z$ | Risk Level I: Low Risk | Generate electronic notification(s) indicative of quantum computing threat assessment risk level I and transmit to client device. |
| $(x + y) = z$ | Risk Level II: Medium Risk | Generate electronic notification(s) indicative of quantum computing threat assessment risk level II and transmit to client device. |
| $(x + y) > z$ | Risk Level III: High Risk | Initiate automated analysis and processes to mitigate the quantum computing threat because data protected by quantum vulnerable algorithms at the end of the next y years may be compromised by attacks using quantum computers in less than x years from that time. Generate electronic notification(s) indicative of quantum computing threat assessment risk level III and transmit to client device. |
| $x > z$ or $y > z$ | Risk Level IV: Immediate Remediation | Generate control signal(s) configured to instruct information security system to perform immediate remediation, such as: (i) disconnecting network connections; (ii) instructing, or causing, authentication of new sessions and re-authentication of existing sessions using QEA cryptographic techniques; (iii) instructing, or causing, encryption or re-encryption of data using PQC cryptographic techniques; or a combination thereof. Generate electronic notification(s) indicative of quantum computing threat assessment risk level IV and transmit to client device. | where x is the security shelf-life (e.g., data retention requirement); where y is the PQC migration time; and where z is the collapse time (e.g., time to quantum computing threat). For example, if the security shelf-life x is five years and the migration time y is seven years, while the collapse time z is nine years, the QC detection circuitry 214 may determine that the parameters x, y, and z satisfy the quantum computing threat assessment inequality $(x+y)>z$ and generate a quantum computing threat assessment risk level "Risk Level III: High Risk" indicating that the cryptographic keys (e.g., secret keys) will be compromised for a duration of three years. The QC detection circuitry 214 may be further configured to generate an electronic recommendation (e.g., comprising one or more control signals and electronic notifications) based on the quantum computing threat assessment risk level "Risk Level III: High Risk," wherein the electronic recommendation comprises one or more electronic alerts, notifications, or control signals configured to instruct the QEA system to initiate automated analysis and planning to mitigate the quantum computing threat now, since data protected by quantum vulnerable tools at the end of the next seven years may be compromised by quantum attacks in less than five years from that time.

In some embodiments, the QC detection circuitry 214 may be configured to update the threat in response to receipt of a quantum computing detection alert control signal (e.g., indicating that: a quantum computer has compromised RSA-512; a quantum computer has compromised RSA-1024; a quantum computer has compromised RSA-2048), a leakage alert control signal, a tampering alert control signal, any other suitable signal or data, or any combination thereof.

The cryptographic circuitry 216 includes hardware components designed or configured to request, receive, process, generate, and transmit data, data structures, control signals, and electronic information for use in quantum one-time pad generation, QERNG, QEA, PQC, or a combination thereof. In some embodiments, the cryptographic circuitry 216 may be configured to encrypt data based on a set of PQC encryption attributes, a set of PQC encryption attributes, a set of QEA encryption attributes, or a combination thereof. In this regard, the cryptographic circuitry 216 may include, for example, non-PQC cryptographic circuitry 218, PQC cryptographic circuitry 220, quantum cryptographic circuitry 222, or a combination thereof.

The non-PQC cryptographic circuitry 218 includes hardware components designed or configured to request, receive, process, generate, and transmit data, data structures, control signals, and electronic information for use in quantum one-time pad generation, QERNG, QEA, PQC, or a combination thereof. In some embodiments, the non-PQC cryptographic circuitry 218 may be configured to encrypt and decrypt data based on a set of non-PQC encryption attributes.

The PQC cryptographic circuitry 220 includes hardware components designed or configured to request, receive, process, generate, and transmit data, data structures, control signals, and electronic information for use in quantum one-time pad generation, QERNG, QEA, PQC, or a combination thereof. In some embodiments, the PQC cryptographic circuitry 220 may be configured to encrypt and decrypt data based on a set of PQC encryption attributes.

The quantum cryptographic circuitry 222 includes hardware components designed or configured to request, receive, process, generate, and transmit data, data structures, control signals, electronic information, and quantum information for use in quantum one-time pad generation, QERNG, QEA, PQC, or a combination thereof.

In some embodiments, the quantum cryptographic circuitry 222 may include decoding circuitry (e.g., a qubit decoder) configured to measure a set of entangled quantum particles based on a set of quantum bases. In some embodiments, the decoding circuitry may comprise hardware components designed or configured to measure received qubits. For example, the decoding circuitry may comprise one or more sensors such as photodetectors, photodiodes, cameras, or any other suitable devices or optoelectronic components.

In some embodiments, the quantum cryptographic circuitry 222 may further include quantum basis determination circuitry configured to determine the quantum bases, or sets of quantum bases, for encoding and decoding of a given set of quantum particles. In some embodiments, the quantum cryptographic circuitry 222 may be communicatively coupled to one or more quantum storage devices (e.g., quantum storage circuitry 226) configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

The quantum basis determination circuitry may include hardware components designed or configured to determine, select, choose, or identify: a quantum basis or set of quantum bases for measuring quantum particles. In some embodiments, the quantum basis determination circuitry includes hardware components designed or configured to determine the set of quantum bases by: receiving the set of quantum bases, or an electronic identification of the set of quantum bases, from another device, such as another server device, client device, QERNG device, or the QEA system (including, but not limited to, the QEA server, the QEA database, or both); retrieving the set of quantum bases, or an electronic identification of the set of quantum bases, from a memory; determining a fixed set of quantum bases; or determining the set of quantum bases using a pseudo-random quantum basis selection technique. It will be understood that the terms "determine," "determining," and "determining," as recited throughout this disclosure, broadly and respectively encompass the terms generate, generating, and generation.

In some embodiments, the quantum basis determination circuitry includes hardware components designed or configured to generate a control signal indicative of the determined set of quantum bases (or, in some instances, an instruction to measure quantum particles based on the determined set of quantum bases). In some embodiments, the control signal may comprise one or more links or pointers to the determined set of quantum bases contained in a database of quantum bases stored in memory (e.g., memory 204).

In some embodiments, the quantum basis determination circuitry includes hardware components designed or configured to generate a time-dependent quantum measurement schedule comprising a plurality of quantum bases respectively corresponding to a plurality of time periods. In some embodiments, the quantum basis determination circuitry includes hardware components designed or configured to generate a unit-dependent quantum measurement schedule comprising a plurality of quantum bases respectively corresponding to a plurality of numbers of bits. The set of quantum bases may be determined by the quantum basis determination circuitry using a pseudo-random quantum basis selection technique. Subsequently, the quantum basis determination circuitry may never thereafter transmit information about the determined set of quantum bases for instruction of corresponding computing device (e.g., the QERNG device 111, the computing device 112, the QERNG device 113, the computing device 114, the QERNG device 115, the remote server device 116, the QERNG device 117).

In some embodiments, the quantum basis determination circuitry includes hardware components designed or configured to determine the set of quantum bases based on electronic information indicative of previously used or scheduled sets of quantum bases. For instance, subsequent sets of quantum bases used to generate subsequent numbers may be different (e.g., include different quantum bases, different amounts of quantum bases, or both).

In some embodiments, the quantum basis determination circuitry includes hardware components designed or configured to determine the set of quantum bases using a pseudo-random quantum basis selection technique. In some embodiments, the pseudo-random quantum basis selection technique may comprise a frequency calculation procedure. By way of example, in some embodiments, the quantum basis determination circuitry includes hardware components designed or configured to select an appropriate set of quantum bases using a frequency calculation procedure in which a selection frequency for each quantum basis may be monitored such that the likelihood that an unselected quantum basis is selected during subsequent selections is increased until an unselected quantum basis is selected. Stated differently, in an instance in which a first quantum basis is initially selected, the remaining quantum bases may be weighted such that selection of these quantum bases on subsequent selections operations is more likely as compared to the first quantum basis. Once these remaining quantum bases are selected in the future, however, their corresponding weighting may decrease relative to still other unselected quantum bases. To duplicate this pseudo-random quantum basis selection technique, an intruder would need to have insight into multiple different iterations of the pseudo-random number generation process, and even then would need to deduce the weighting scheme. While a frequency calculation procedure is outlined above for selection of a set of quantum bases for computing device 110, the QERNG device 111, the computing device 112, the QERNG device 113, the computing device 114, the QERNG device 115, the remote server device 116, the QERNG device 117, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the set of quantum bases for the computing device 110, the QERNG device 111, the computing device 112, the QERNG device 113, the computing device 114, the QERNG device 115, the remote server device 116, the QERNG device 117, or both without departing from the scope of the disclosure.

In some embodiments, the QEA system 102 may comprise multiple quantum basis determination circuitries, such as: one embodied by QEA server device 104; one embodied by each QERNG device 111; one embodied by each QERNG device 113; one that controls quantum basis determination for QERNG device 111 and another that controls quantum basis determination for QERNG device 113; one embodied by each QERNG device 115; one that controls quantum basis determination for QERNG device 115; one embodied by each QERNG device 117; one that controls quantum basis determination for QERNG device 117; or multiple quantum basis determination circuitries corresponding to any other suitable arrangement.

In some embodiments, the quantum cryptographic circuitry 222 may be configured to generate a first quantum entanglement random number based on a subset of a first set of entangled quantum particles associated with a first computing device, wherein each entangled quantum particle in the first set of entangled quantum particles may be entangled with a respective entangled quantum particle in a second set of entangled quantum particles associated with a second computing device. In some embodiments, the first computing device (e.g., one of the computing device 110 and the computing device 112) may comprise a first quantum random number generation device (e.g., one of the QERNG device 111 and the QERNG device 113, respectively) comprising the quantum cryptographic circuitry 222. In some embodiments, the second computing device (e.g., the other of the computing device 110 and the computing device 112 or in some embodiments, any of the computing device 114, the QERNG device 115, the remote server device 116, the QERNG device 117) may comprise a second quantum random number generation device (e.g., the other of the QERNG device 111 and the QERNG device 113, respectively or in some embodiments, any of the computing device 114, the QERNG device 115, the remote server device 116, the QERNG device 117) comprising the quantum cryptographic circuitry 222.

In some embodiments, the quantum cryptographic circuitry 222 may be configured to determine the subset of the first set of entangled quantum particles based on the time-dependent quantum measurement schedule and a measurement time value as described herein. In some embodiments, the quantum cryptographic circuitry 222 may be configured determine the subset of the first set of entangled quantum particles based on the sequence-dependent quantum measurement schedule and a measurement sequence value as described herein. In some embodiments, the quantum cryptographic circuitry 222 may be configured to determine the set of quantum bases based on any suitable technique, data, or electronic information described herein.

In some embodiments, a first quantum one-time pad (e.g., the example first quantum one-time pad 302A shown in, and described with reference to, FIGS. 3A, 3B, and 3C) may comprise the first set of entangled quantum particles. In some embodiments, a second quantum one-time pad (e.g., the example second quantum one-time pad 302B shown in, and described with reference to, FIGS. 3A, 3B, and 3C) may comprise the second set of entangled quantum particles.

In some embodiments, the quantum cryptographic circuitry 222 may be configured to receive or access the first set of entangled quantum particles, the first set of entangled quantum particles, or both from one or more other devices or circuitries as described herein. In some embodiments, the quantum cryptographic circuitry 222 may be configured to receive or access the first set of entangled quantum particles, the first set of entangled quantum particles, or both from one or more of the quantum one-time pad generation circuitry 224 of the apparatus 200; the quantum storage circuitry 226 of the apparatus 200, the apparatus 200, or the apparatus 290; any other suitable device or circuitry; or any combination thereof. In some embodiments, a first quantum authentication device (e.g., a first apparatus 290) may comprise the first set of entangled quantum particles, wherein the first quantum authentication device is coupled to the first computing device. In some embodiments, a second quantum authentication device (e.g., a second apparatus 290) may comprise the second set of entangled quantum particles, and wherein the second quantum authentication device is coupled to the second computing device.

In some embodiments, the quantum cryptographic circuitry 222 may be configured to: measure the subset of the first set of entangled quantum particles based on a set of quantum bases, wherein the measurement of the subset of the first set of entangled quantum particles may cause a respective subset of the second set of entangled quantum particles to collapse onto a set of correlated (e.g., complimentary), or identical, quantum states; and generate the first quantum entanglement random number based on the measured subset of the first set of entangled quantum particles. In some embodiments, the quantum cryptographic circuitry 222 may be configured to: receive a first measurement initiation control signal indicative of an instruction to initiate measurement; and, in response to receipt of the first measurement initiation control signal, measure the subset of the first set of entangled quantum particles.

In some embodiments, the quantum cryptographic circuitry 222 may be configured to generate a second quantum entanglement random number based on the subset of a second set of entangled quantum particles associated with the second computing device. For example, the quantum cryptographic circuitry 222 may be configured to: measure the subset of the second set of entangled quantum particles based on the same set of quantum bases; and generate the second quantum entanglement random number, which may be a duplicate of the first quantum entanglement random number, based on the measured subset of the second set of entangled quantum particles. In some embodiments, the quantum cryptographic circuitry 222 may be configured to: receive a second measurement initiation control signal indicative of an instruction to initiate measurement; and, in response to receipt of the second measurement initiation control signal, measure the subset of the second set of entangled quantum particles.

In some embodiments, the quantum cryptographic circuitry 222 may be configured to generate a cryptographic key based on a second subset of the first set of entangled quantum particles. The cryptographic key may be, for example, a symmetric cryptographic key such as an AES cryptographic key. In some embodiments, the quantum cryptographic circuitry 222 may be configured to encrypt an electronic communication based on the cryptographic key.

In some embodiments, the cryptographic circuitry 216 may be configured to encrypt data using various recommended cryptographic techniques, such as non-PQC cryptographic techniques, PQC cryptographic techniques, hybrid PQC cryptographic techniques (e.g., hybrid PQC cryptographic technique={PQC cryptographic technique, Non-PQC cryptographic technique}), QEA cryptographic techniques, and hybrid QEA cryptographic techniques (e.g., hybrid QEA cryptographic technique={QEA cryptographic technique, PQC cryptographic technique}; alternatively, hybrid QEA cryptographic technique={QEA cryptographic technique, non-PQC cryptographic technique}). For example, the recommended cryptographic technique may comprise a hybrid PQC cryptographic mode, such as a signature-based hybrid PQC cryptographic mode consisting of a non-PQC cryptographic signature and a PQC cryptographic signature, where the hybrid PQC cryptographic mode is valid only if both the non-PQC cryptographic signature and the PQC cryptographic signature are valid (e.g., the QEA system may perform validation of the non-PQC cryptographic signature according to FIPS 140-3; the QEA system may perform validation of the PQC cryptographic signature using multiple public-key algorithms for X.509 certificates, such as quantum-resistant X.509 Multiple Public Key Algorithm Certificates). In another example, the recommended cryptographic technique may comprise a hybrid QEA cryptographic mode, such as a PQC cryptographic technique that has been modified by the QEA system to use QEA (e.g., a QEA variant of the PQC cryptographic algorithm "Dilithium," wherein the random secret key vectors $s_1$ and $s_2$ in the Dilithium algorithm has been generated using QEA).

In some embodiments, the cryptographic circuitry 216 may recommend different cryptographic techniques for encrypting data used by different lines of business (LOBs) or entities. For example, the cryptographic circuitry 216 may recommend a first PQC cryptographic technique for encrypting data used by a first LOB; a second PQC cryptographic technique for encrypting data used by a second LOB; a non-PQC cryptographic technique for encrypting data used by a third LOB; a hybrid PQC cryptographic technique for encrypting data used by a fourth LOB; a first QEA cryptographic technique for encrypting data used by a fifth LOB; a second QEA cryptographic technique for encrypting data used by a sixth LOB; and a hybrid QEA cryptographic technique for encrypting data used by a seventh LOB.

The quantum one-time pad generation circuitry 224 includes hardware components designed or configured to request, receive, process, generate, and transmit data, data structures, control signals, electronic information, and quantum information (e.g., quantum one-time pads, entangled quantum particles, qubits) for use in quantum one-time pad generation, QERNG, QEA, PQC, or a combination thereof. In some embodiments, the quantum one-time pad generation circuitry 224 may include encoding circuitry (e.g. a qubit encoder) configured to generate a quantum one-time pad comprising a set of entangled quantum particles (e.g., qubits, qutrits, qudits) and store (e.g., via the quantum storage circuitry 226) the set of entangled quantum particles in a set of quantum storage cells.

In some embodiments, the quantum one-time pad generation circuitry 224 may be configured to generate a first quantum one-time pad comprising a first set of entangled quantum particles. In some embodiments, the quantum one-time pad generation circuitry 224 may be configured to generate a second quantum one-time pad comprising a second set of entangled quantum particles. In some embodiments, each entangled quantum particle in the first set of entangled quantum particles may be entangled with a respective entangled quantum particle in the second set of entangled quantum particles comprised by the second quantum one-time pad. Likewise, each entangled quantum particle in the second set of entangled quantum particles may be entangled with a respective entangled quantum particle in the first set of entangled quantum particles comprised by the first quantum one-time pad.

In some embodiments, the quantum one-time pad generation circuitry 224 may be configured to generate the first quantum one-time pad and the second quantum one-time pad based on a splitting of an output of a quantum particle source. For example, the quantum one-time pad generation circuitry 224 may be configured to split the output of the quantum particle source into a first beam of entangled quantum particles and a second beam of entangled quantum particles, wherein each entangled quantum particle in the first beam of entangled quantum particles is entangled with a respective entangled quantum particle in the second beam of entangled quantum particles. Subsequently, the quantum one-time pad generation circuitry 224 may be configured to generate the first quantum one-time pad based on the first beam of entangled quantum particles and the second quantum one-time pad based on the second beam of entangled quantum particles.

In some embodiments, the quantum one-time pad generation circuitry 224 may be configured to transmit (e.g., via quantum communications circuitry 212, quantum storage circuitry 226, or both) the first quantum one-time pad to a first computing device, such as a first QERNG device configured to be communicatively coupled to a server device. In some embodiments, the apparatus 200 or 280 may be configured to transmit the second quantum one-time pad to a second computing device, such as a second QERNG device configured to be communicatively coupled to a client device.

The quantum storage circuitry 226 includes hardware components (including, but not limited to, optoelectronic components) designed or configured to request, receive, process, generate, and transmit data, data structures, control signals, electronic information, and quantum information (e.g., quantum one-time pads, entangled quantum particles, qubits) for use in quantum one-time pad generation, QERNG, QEA, PQC, or a combination thereof. In some embodiments, the quantum storage circuitry 226 may be configured to store various quantum information, such as one or more quantum particles (e.g., pairs of entangled quantum particles; sets of entangled quantum particles comprising one entangled quantum particle in each pair of entangled quantum particles; measured quantum particles), quantum one-time pads, quantum cryptographic keys, any other suitable quantum information, any links or pointers thereto, or combinations thereof. In some embodiments, the quantum storage circuitry 226 may be configured to store and maintain one or more quantum one-time pads as described herein.

In some embodiments, the quantum storage circuitry 226 may be configured to store the first set of entangled quantum particles in a first set of quantum storage cells. In some embodiments, the quantum storage circuitry 226 may be configured to store each entangled quantum particle in the first set of entangled quantum particles in a respective quantum storage cell in the first set of quantum storage cells. In some embodiments, the first set of quantum storage cells may comprise a matrix of quantum storage cells, such as an M×N matrix of quantum storage cells, where each of M and N is an integer greater than or equal to one, and where M may or may not be equal to N. In some embodiments, the electronic identification of the subset of the first set of entangled quantum particles comprises an electronic identification of the respective quantum storage cell of each entangled quantum particle in the subset of the first set of entangled quantum particles.

In some embodiments, the quantum storage circuitry 226 may be configured to store the second set of entangled quantum particles in a second set of quantum storage cells. In some embodiments, the quantum storage circuitry 226 may be configured to store each entangled quantum particle in the second set of entangled quantum particles in a respective quantum storage cell in the second set of quantum storage cells. In some embodiments, the second set of quantum storage cells may comprise a matrix of quantum storage cells, such as a P×S matrix of quantum storage cells, where each of P and S is an integer greater than or equal to one, where P may or may not be equal to S or M, and where S may or may not be equal to N. In some embodiments, the electronic identification of the subset of the second set of entangled quantum particles comprises an electronic identification of the respective quantum storage cell of each entangled quantum particle in the subset of the second set of entangled quantum particles.

In some embodiments, the quantum storage circuitry 226 may be configured to store a quantum one-time pad in a quantum authentication device (e.g., apparatus 290). For example, the quantum storage circuitry 226 may store each set of entangled quantum particles in a set of quantum storage cells disposed in a portable quantum authentication device. In some embodiments, the quantum storage circuitry 226 may be configured to store the first quantum one-time pad in a first quantum authentication device (e.g., a first apparatus 290) configured to be communicatively coupled to a first computing device, such as a first QERNG device configured to be communicatively coupled to a server device. In some embodiments, the quantum storage circuitry 226 may be configured to store the second quantum one-time pad in a second quantum authentication device (e.g., a second apparatus 290) configured to be communicatively coupled to a second computing device, such as a second QERNG device configured to be communicatively coupled to a client device.

In some embodiments, the quantum storage circuitry 226 may be configured to store or maintain the first quantum one-time pad in a centralized location (e.g., QEA system 102, one or more QEA server devices 104, one or more QEA databases 106) or another location (e.g., a first remote quantum storage device) for access by a first computing device, such as a server device or a first QERNG device configured to be communicatively coupled to the server device. In some embodiments, the first computing device may comprise a first QERNG device comprising the first set of quantum storage cells. In some embodiments, the first computing device may comprise a first QEA server device comprising the first set of quantum storage cells. In some embodiments, the first computing device may be communicatively coupled to a first quantum authentication device comprising the first set of quantum storage cells.

In some embodiments, the quantum storage circuitry 226 may be configured to store or maintain the second quantum one-time pad in the centralized location or another location (e.g., a second remote quantum storage device) for access by a second computing device, such as a client device or a second QERNG device configured to be communicatively coupled to the client device. In some embodiments, each entangled quantum particle in the second set of entangled quantum particles may be entangled with a respective entangled quantum particle in the first set of entangled quantum particles comprised by the first quantum one-time pad and stored in the first set of quantum storage cells. In some embodiments, the second computing device may comprise a second QERNG device comprising the second set of quantum storage cells. In some embodiments, the second computing device may comprise a second QEA server device comprising the second set of quantum storage cells. In some embodiments, the second computing device may be communicatively coupled to a second quantum authentication device comprising the second set of quantum storage cells.

The RNG circuitry 228 includes hardware components designed or configured to request, receive, process, generate, and transmit data, data structures, control signals, and electronic information for use in quantum one-time pad generation, QERNG, QEA, PQC, or a combination thereof. In some embodiments, the RNG circuitry 228 includes hardware components designed or configured to generate a number based on a set of measured quantum particles generated by quantum cryptographic circuitry 222. For example, the generated number may be an actual set of measured quantum particles generated by quantum cryptographic circuitry 222, a number that includes the set of measured quantum particles in its entirety, a number that includes a portion of the set of measured quantum particles (e.g., the first, third, sixth, and tenth measured quantum particles, but not the second, fourth, fifth, seventh, eighth, or ninth measured quantum particles in a set of ten measured quantum particles), or any other suitable number.

The PRNG circuitry 230 includes hardware components designed or configured to request, receive, process, generate, and transmit data, data structures, control signals, and electronic information for use in quantum one-time pad generation, QERNG, QEA, PQC, or a combination thereof. In some embodiments, the PRNG circuitry 230 includes hardware components designed or configured to receive a seed for pseudo-random number generation based on the number generated by the RNG circuitry 228 and then generate a pseudo-random number based on the seed.

The session authentication circuitry 232 includes hardware components designed or configured to request, receive, process, generate, and transmit data, data structures, control signals, and electronic information for use in quantum one-time pad generation, QERNG, QEA, PQC, or a combination thereof. In some embodiments, the session authentication circuitry 232 includes hardware components designed or configured to generate a session key (e.g., for use in TLS communications, among other applications) based on a number generated by the RNG circuitry 228, a pseudo-random number generated by the PRNG circuitry 230, or both. For example, the session authentication circuitry 232 may receive the pseudo-random number from the PRNG circuitry 230 and use the received pseudo-random number as the session key. In another example, the session authentication circuitry 232 may receive the generated number from the RNG circuitry 228 and use the generated number as the session key. In yet another example, the session authentication circuitry 232 may receive the generated number from the quantum cryptographic circuitry 222 and use the generated number as the session key. In still another example, the session authentication circuitry 232 may perform a further transformation on a number generated by the RNG circuitry 228 or the quantum cryptographic circuitry 222, or a pseudo-random number generated by the PRNG circuitry 230, and thereafter use the result of the further transformation as the session key. In some embodiments, the transformation may be a convolution of the generated number or pseudo-random number with an independent variable, such as an internal clock time measured by the apparatus 200, the apparatus 280, or the apparatus 290.

In some embodiments, the session authentication circuitry 232 may be further configured to generate the session key by (i) setting the session key equal to a generated number (e.g., a number generated by the quantum cryptographic circuitry 222, the RNG circuitry 228, or the PRNG circuitry 230 based on the set of measured quantum particles), or (ii) using the generated number as a seed in a pseudo-random number generation procedure, wherein an output of the pseudo-random number generation procedure comprises the session key. Following generation of the session key, the session authentication circuitry 232 may transmit the session key to a computing device 112 (and in one such embodiment, the session authentication circuitry 232 may cause PQC cryptographic circuitry 220 to implement a PQC communications channel-based cryptographic technique to securely transmit the session key over a PQC communications channel).

In some embodiments, the session authentication circuitry 232 includes hardware components designed or configured to subsequently authenticate a session between two or more devices. In some instances, the session authentication circuitry 232 may use the generated session key to authenticate a session on behalf of a server device (e.g., computing device 110) and at the request of a client device (e.g., computing device 112). For example, the session authentication circuitry 232 may use a generated first session key to authenticate a first session on behalf of a first server device and at the request of a first client device. In another example, the session authentication circuitry 232 may use a generated second session key to authenticate a second session between two other devices, such as a second server device and at the request of a second client device.

In some instances, the session authentication circuitry 232 may receive a key from the computing device 112, and then compare the received key to the generated session key to determine if a match is found. If so, the session authentication circuitry 232 may transmit a communication to the computing device 110 comprising a validation of the session key received from the computing device 112. If not, then the session authentication circuitry 232 may transmit a communication to the computing device 110 indicating a validation failure.

In some embodiments, the session authentication circuitry 232 may be configured to authenticate a session between the first computing device and the second computing device in an instance in which the second quantum entanglement random number corresponds, or is identical, to the first quantum entanglement random number. In some embodiments, the session authentication circuitry 232 may be configured to generate a session key based on the first quantum entanglement random number. For example, the session authentication circuitry 232 may be configured to generate the session key by setting the session key equal to the generated random number. In some embodiments, the session authentication circuitry 232 may be comprised by the computing device 110, the QEA system 102, or a combination thereof.

The UI circuitry 234 includes hardware components designed or configured to generate graphical user interface (GUI) data configured to be displayed by a display device. For instance, the UI circuitry 234 may include hardware components designed or configured to generate GUI data based on any embodiment or combination of embodiments described with reference to FIGS. 1, 2A, 2B, 2C, 3A, 3B, 3C, 4, 5, and 6. In some embodiments, the UI circuitry 234 may be configured to generate GUI data and transmit the generated GUI data to the input-output circuitry 206, and the input-output circuitry 206 may be configured to receive the GUI data and display the received GUI data on one or more display screens. In some embodiments, the UI circuitry 234 may include hardware components designed or configured to generate the GUI data based on various data, information, and techniques described herein.

In some embodiments, the UI circuitry 234 may be configured to generate QEA GUI data based on data and electronic information associated with one or more quantum particles (e.g., entangled quantum particles, measured quantum particles), quantum one-time pads, quantum bases, requests, messages, control signals (e.g., measurement initiation control signals, QC detection alert control signals, leakage alert control signals, tampering alert control signals), quantum particle measurement schedules and related information (e.g., time-dependent quantum measurement schedules, measurement time values, sequence-dependent quantum measurement schedules, measurement sequence values), electronic information (e.g., electronic identifications of entangled quantum particles, such as electronic identifications of their respective quantum storage cells; electronic identifications of quantum bases), numbers (e.g., random numbers, pseudo-random numbers), cryptographic keys (e.g., session keys, symmetric cryptographic keys), cryptographic techniques, machine learning techniques, graphical user interface (GUI) data, QC detection techniques (including, but not limited to, detection of quantum computing capabilities; data leakage detection techniques; and data tampering detection techniques), any other suitable data or electronic information, any links or pointers thereto, or combinations thereof. In some embodiments, the UI circuitry 234 may be further configured to generate the QEA GUI data based on quantum information, such as one or more quantum particles (e.g., pairs of entangled quantum particles; sets of entangled quantum particles comprising one entangled quantum particle in each pair of entangled quantum particles; measured quantum particles), quantum one-time pads, quantum cryptographic keys, any other suitable quantum information, any links or pointers thereto, or any combination thereof.

In some embodiments, the UI circuitry 234 may be configured to generate a QEA GUI based on the QEA GUI data, any other suitable quantum information, any links or pointers thereto, or any combination thereof. In some embodiments, the UI circuitry 234 may be configured to generate a QC detection GUI based on the QC detection data, the QC detection alert control signal, leakage alert control signal, tampering alert control signal, any other suitable data, or any combination thereof. In some embodiments, the communications circuitry 208 may be configured to transmit the QEA GUI, the QC detection GUI, or a combination thereof to a client device for display by the client device.

The data storage circuitry 236 includes hardware components designed or configured to request, receive, process, generate, store, and transmit data, data structures, control signals, and electronic information for use in quantum one-time pad generation, QERNG, QEA, PQC, or a combination thereof. In some embodiments, the data storage circuitry 236 may be configured to store data (e.g., unencrypted data, encrypted data, decrypted data, re-encrypted data, double encrypted data, data access control information, bitstreams of data, links or pointers thereto), non-PQC cryptographic techniques, PQC cryptographic techniques, QEA cryptographic techniques, hybrid PQC cryptographic techniques, hybrid QEA cryptographic techniques, quantum bases, requests, messages, control signals, quantum particle measurement schedules and related information, electronic information, numbers, cryptographic keys, cryptographic techniques, machine learning techniques, GUI data, QC detection techniques, any other suitable data or electronic information, or combinations thereof in a data storage device, a database management system, any other suitable storage device or system, or any combination thereof.

In some embodiments, the data storage device may comprise, or be implemented as, memory 204, one or more of the one or more QEA databases 106, one or more database server devices (including, but not limited to, one or more data storage devices communicatively coupled, either directly or indirectly, to the one or more database server devices), one or more remote server devices, one or more server devices 110, one or more QERNG devices 111, one or more client devices 112, one or more QERNG devices 113, any other suitable device or circuitry, or a combination thereof.

In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the data storage device, the database management system, or both may comprise, or be implemented as, one or more decentralized storage devices, such as a cloud storage device or system.

The machine learning circuitry 238 includes hardware components designed or configured to request, receive, process, generate, and transmit data, data structures, control signals, and electronic information for use in quantum one-time pad generation, QERNG, QEA, PQC, or a combination thereof. In some embodiments, the machine learning circuitry 238 may be configured to provide machine learning techniques, any other suitable functionality, or any combination thereof. For example, the machine learning circuitry 238 may be configured to provide a machine learning technique, machine learning functionality, or both to the QC detection circuitry 214, cryptographic circuitry 216, non-PQC cryptographic circuitry 218, PQC cryptographic circuitry 220, quantum cryptographic circuitry 222, quantum one-time pad generation circuitry 224, quantum storage circuitry 226, RNG circuitry 228, PRNG circuitry 230, session authentication circuitry 232, UI circuitry 234, data storage circuitry 236, any other circuitry, or any combination thereof. In some embodiments, the machine learning circuitry 238 may be configured to determine the machine learning technique from among a set of machine learning techniques. In some embodiments, the machine learning circuitry 238 may be configured to determine (e.g., predict) which cryptographic technique (e.g., non-PQC cryptographic technique, PQC cryptographic technique, hybrid PQC cryptographic technique, QEA cryptographic technique, or hybrid QEA cryptographic technique) to use for session authentication, data encryption, or both based on test data, production data, and any of the parameters described herein.

It should also be appreciated that, in some embodiments, each of the input-output circuitry 206, communications circuitry 208, classical communications circuitry 210, quantum communications circuitry 212, QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, and machine learning circuitry 238, may include a separate processor, specially configured field programmable gate array (FPGA), ASIC, or cloud utility to perform the above functions.

In some embodiments, the hardware components described above with reference to QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, and machine learning circuitry 238, may, for instance, utilize communications circuitry 208 (including, but not limited to, classical communications circuitry 210, quantum communications circuitry 212, or both) or any suitable wired or wireless communications path to communicate with a QERNG device (e.g., QERNG device 111, QERNG device 113, QERNG device 115, QERNG device 117), a server device (e.g., computing device 110), a client device (e.g., computing device 112), processing circuitry 202, memory 204, input-output circuitry 206, the communications circuitry of another apparatus (e.g., the communications circuitry 208 of a separate apparatus implementing one or more portions of apparatus 200, 280, or 290), each other, or any other suitable circuitry or device.

In some embodiments, one or more of the QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, and machine learning circuitry 238 may be hosted locally by the apparatus 200.

In some embodiments, one or more of the QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, and machine learning circuitry 238 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In another example, the apparatus 200 may access one or more third-party circuitries (e.g., quantum storage circuitries, quantum one-time pad generation circuitries) via one or more quantum lines and infrastructures configured to transmit and receive quantum particles, such as entangled quantum particles and quantum one-time pads, between the apparatus 200 and the third-party circuitries. In yet another example, the apparatus 200 may access a quantum authentication device (e.g., apparatus 290) to receive, access, or measure entangled quantum particles, such as entangled quantum particles and quantum one-time pads, stored in the quantum authentication device. In turn, the apparatus 200 may be in remote communication with one or more of the QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, and machine learning circuitry 238.

Figure 2B:
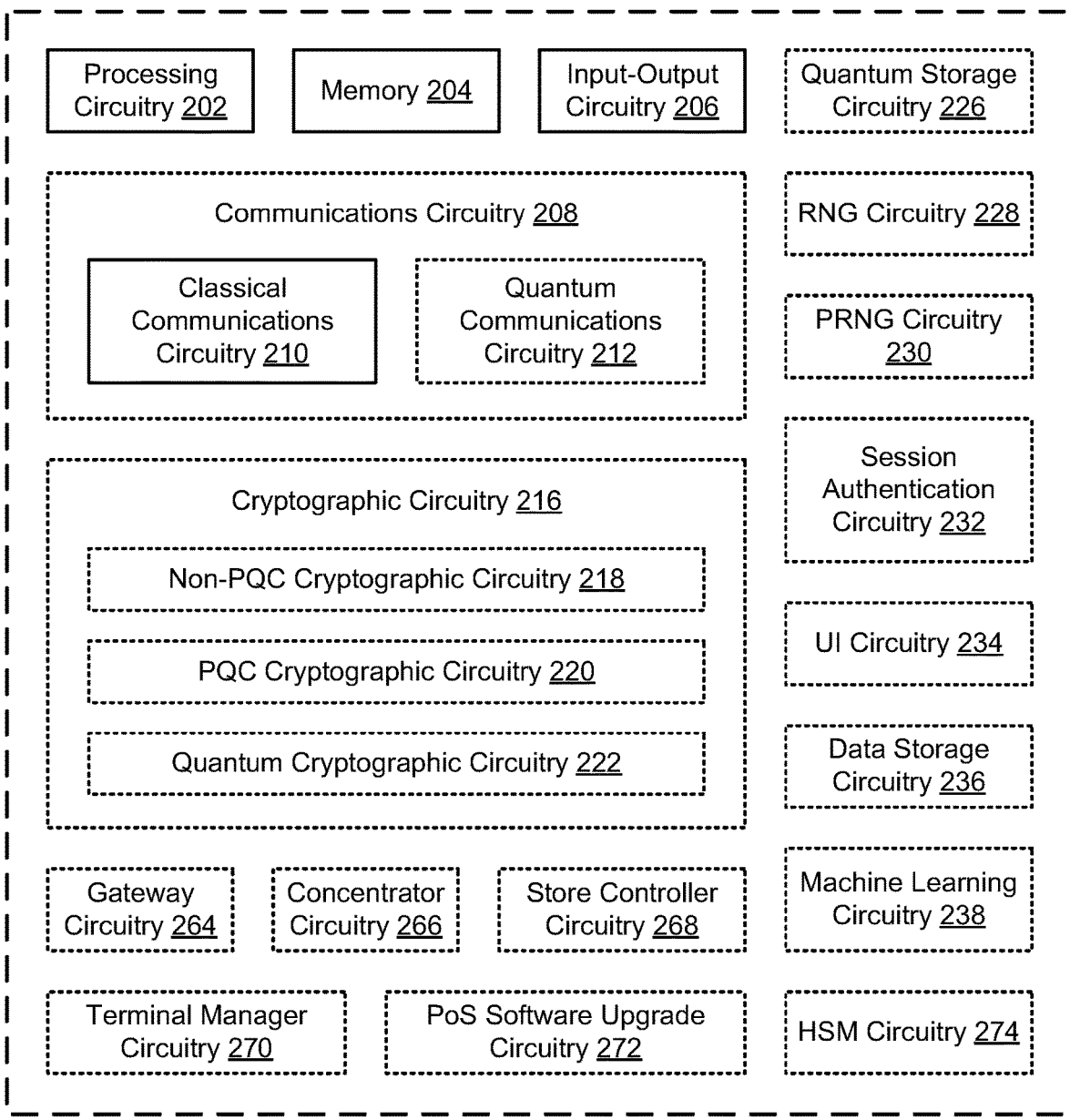

As illustrated in FIG. 2B, an apparatus 280 is shown that represents an example computing device 110, QERNG device 111, computing device 112, QERNG device 113, computing device 114, QERNG device 115, remote server device 116, QERNG device 117, any other suitable device, or a combination thereof. In some embodiments, the apparatus 280 may be configured to be communicatively coupled (e.g., connected via one or more wireless communications lines, wired communications lines, quantum lines, communications infrastructure (e.g., classical and quantum routers, splitters, repeaters, multiplexers, demultiplexers, other suitable infrastructure), or a combination thereof) to a quantum authentication device, such as apparatus 290 shown in FIG. 2C.

In some embodiments, the apparatus 280 may include one or more of processing circuitry 202, memory 204, input-output circuitry 206, communications circuitry 208 (including, but not limited to, classical communications circuitry 210 and, optionally, quantum communications circuitry 212), any other suitable circuitry, or any combination thereof. In some embodiments, the apparatus 280 may optionally include one or more of cryptographic circuitry 216 (including, but not limited to, non-PQC cryptographic circuitry 218, PQC cryptographic circuitry 220, and quantum cryptographic circuitry 222), quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, hardware security module (HSM) circuitry 274, any other suitable circuitry, or any combination thereof. It will be understood, however, that additional components providing additional functionality may be included in the apparatus 280 without departing from the scope of the present disclosure. The apparatus 280 may be involved in execution of various operations described above with respect to FIGS. 1 and 2A and below with respect to FIGS. 2C, 3A, 3B, 3C, 4, 5, and 6.

The gateway circuitry 264 includes hardware components designed or configured to request, receive, process, generate, and transmit data, data structures, control signals, and electronic information for use in quantum one-time pad generation, QERNG, QEA, PQC, or a combination thereof. In some embodiments, the gateway circuitry 264 may be configured to provide transactions management, payment processing, any other suitable functionality, and any combination thereof for one or more PoS devices or other devices communicatively coupled to the apparatus 280.

The concentrator circuitry 266 includes hardware components designed or configured to request, receive, process, generate, and transmit data, data structures, control signals, and electronic information for use in quantum one-time pad generation, QERNG, QEA, PQC, or a combination thereof. In some embodiments, the concentrator circuitry 266 may be configured to connect multiple PoS devices or other devices to the apparatus 280. For example, the concentrator circuitry 266 may be configured to provide communications management, connectivity, any other suitable functionality, and any combination thereof for one or more PoS devices or other devices communicatively coupled to the apparatus 280.

The store controller circuitry 268 includes hardware components designed or configured to request, receive, process, generate, and transmit data, data structures, control signals, and electronic information for use in quantum one-time pad generation, QERNG, QEA, PQC, or a combination thereof. In some embodiments, the store controller circuitry 268 may be configured to provide applications, services, any other suitable functionality, and any combination thereof for one or more PoS devices or other devices communicatively coupled to the apparatus 280.

The terminal manager circuitry 270 includes hardware components designed or configured to request, receive, process, generate, and transmit data, data structures, control signals, and electronic information for use in quantum one-time pad generation, QERNG, QEA, PQC, or a combination thereof. In some embodiments, the terminal manager circuitry 270 may be configured to provide terminal management, terminal monitoring, terminal control, terminal updating, any other suitable functionality, and any combination thereof for one or more PoS devices or other devices communicatively coupled to the apparatus 280.

The PoS software upgrade circuitry 272 includes hardware components designed or configured to request, receive, process, generate, and transmit data, data structures, control signals, and electronic information for use in quantum one-time pad generation, QERNG, QEA, PQC, or a combination thereof. In some embodiments, the PoS software upgrade circuitry 272 may be configured to provide software upgrading functionality, proxy upgrade functionality (e.g., upgrade to a QEA, QEQ-related, PQC, or PQC-related proxy), any other suitable functionality, and any combination thereof for one or more PoS devices or other devices communicatively coupled to the apparatus 280. In some embodiments, the PoS software upgrade circuitry 272 may be configured to upgrade the PoS proxy of connected PoS devices.

The HSM circuitry 274 includes hardened, tamper-resistant hardware components designed or configured to request, receive, process, generate, and transmit data, data structures, control signals, and electronic information for use in quantum one-time pad generation, QERNG, QEA, PQC, or both. In some embodiments, the HSM circuitry 274 may be configured to provide: protection for cryptographic keys (e.g., session keys, symmetric cryptographic keys), customer personal identification numbers (PINs), magnetic stripe data, EMV (originally Europay, Mastercard, and Visa) chip data, and mobile application counterparts thereof (e.g., virtual debit cards and credit cards stored in a user's mobile wallet (e.g., a digital wallet application executing on a mobile device such as the user's smartphone, smartwatch, activity tracker, smart clothing, or other wireless-enabled wearable technology)); native cryptographic support for card scheme payment applications; any other suitable functionality; and any combination thereof for one or more PoS devices or other devices communicatively coupled to the apparatus 280. In some embodiments, the HSM circuitry 274 may be configured to provide: personal identification number (PIN) generation, management and validation; PIN block translation during the network switching of ATM and PoS transactions; card, user, and cryptogram validation during payment transaction processing; payment credential issuing for payment cards and mobile applications; point-to-point encryption (P2PE) key management and secure data decryption; secure key sharing with third parties to facilitate secure communications; any other suitable functionality; and any combination thereof.

It should also be appreciated that, in some embodiments, each of the input-output circuitry 206, communications circuitry 208, classical communications circuitry 210, quantum communications circuitry 212, cryptographic circuitry 216, non-PQC cryptographic circuitry 218, PQC cryptographic circuitry 220, quantum cryptographic circuitry 222, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, and HSM circuitry 274 may include a separate processor, specially configured FPGA, ASIC, or cloud utility to perform the above functions.

In some embodiments, the hardware components described above with reference to cryptographic circuitry 216, non-PQC cryptographic circuitry 218, PQC cryptographic circuitry 220, quantum cryptographic circuitry 222, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, and HSM circuitry 274 may, for instance, utilize communications circuitry 208 (including, but not limited to, classical communications circuitry 210, quantum communications circuitry 212, or both) or any suitable wired or wireless communications path to communicate with a QERNG device (e.g., QERNG device 111, QERNG device 113), a server device (e.g., computing device 110), a client device (e.g., computing device 112), processing circuitry 202, memory 204, input-output circuitry 206, the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 216, non-PQC cryptographic circuitry 218, PQC cryptographic circuitry 220, quantum cryptographic circuitry 222, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, and HSM circuitry 274 may be hosted locally by the apparatus 280.

In some embodiments, one or more of the cryptographic circuitry 216, non-PQC cryptographic circuitry 218, PQC cryptographic circuitry 220, quantum cryptographic circuitry 222, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, and HSM circuitry 274 may be hosted remotely (e.g., by one or more cloud servers) and thus need not physically reside on the apparatus 280. Thus, some or all of the functionality described herein may be provided by a third-party circuitry. For example, the apparatus 280 may access one or more third-party circuitries via a networked connection configured to transmit and receive data and electronic information between the apparatus 280 and the third-party circuitries. In another example, the apparatus 280 may access one or more third-party circuitries (e.g., quantum storage circuitries, quantum one-time pad generation circuitries) via one or more quantum lines and infrastructures configured to transmit and receive quantum particles, such as entangled quantum particles and quantum one-time pads, between the apparatus 280 and the third-party circuitries. In yet another example, the apparatus 280 may access a quantum authentication device (e.g., apparatus 290) to receive, access, or measure entangled quantum particles, such as entangled quantum particles and quantum one-time pads, stored in the quantum authentication device. In turn, the apparatus 280 may be in remote communication with one or more of the cryptographic circuitry 216, non-PQC cryptographic circuitry 218, PQC cryptographic circuitry 220, quantum cryptographic circuitry 222, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, and HSM circuitry 274.

Figure 2C:
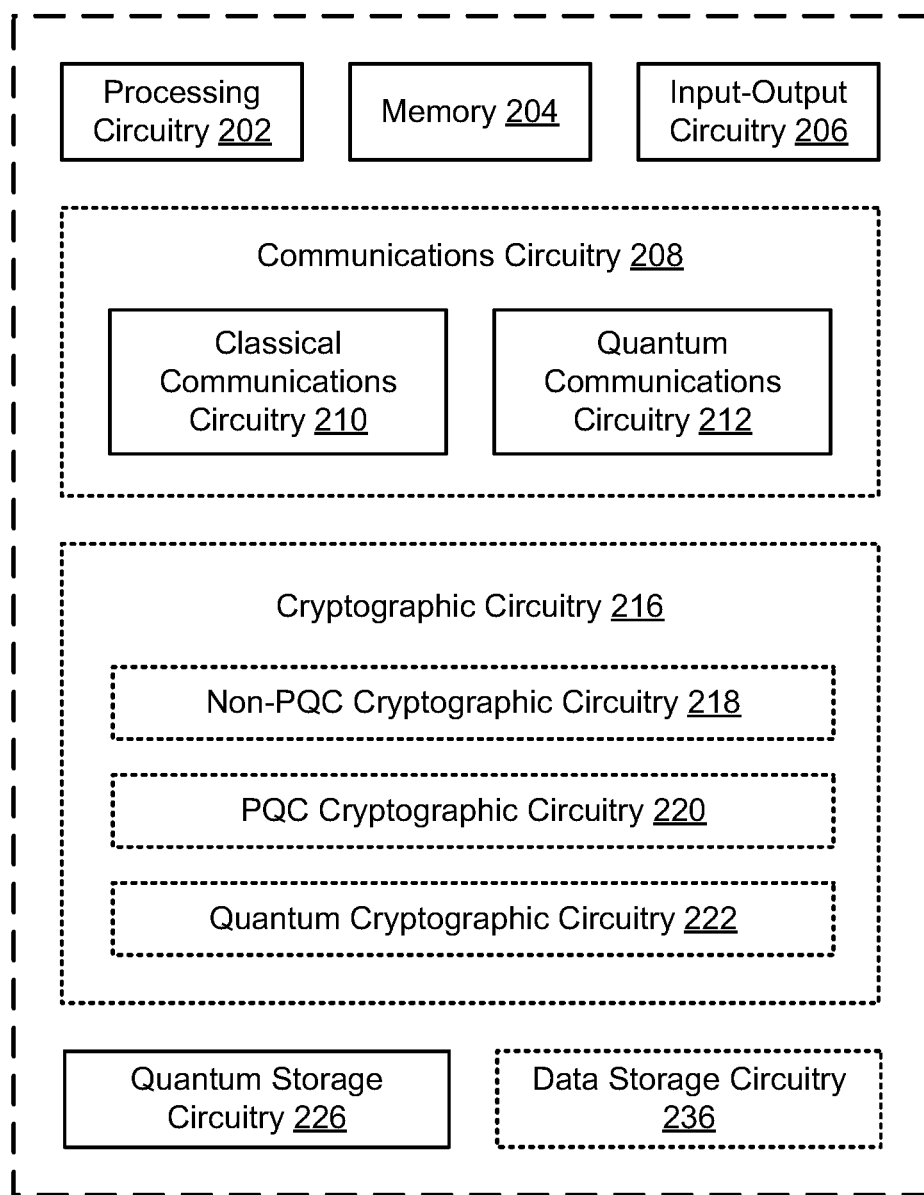

As illustrated in FIG. 2C, an apparatus 290 is shown that represents an example quantum authentication device configured to be communicatively coupled (e.g., connected via one or more wireless communications lines, wired communications lines, quantum lines, communications infrastructure (e.g., classical and quantum routers, splitters, repeaters, multiplexers, demultiplexers, other suitable infrastructure), or a combination thereof) to a client device, such as a computing device 110, QERNG device 111, computing device 112, QERNG device 113, computing device 114, QERNG device 115, remote server device 116, QERNG device 117, any other suitable device, or a combination thereof. In some embodiments, the apparatus 290 may be a QEA peripheral device communicatively coupled to the client device. In some embodiments, the apparatus 290 may be, or comprise, a QEA ASIC installed within a housing of the client device.

In some embodiments, the apparatus 290 may include one or more of processing circuitry 202, memory 204, input-output circuitry 206, communications circuitry 208 (including, but not limited to, classical communications circuitry 210 and quantum communications circuitry 212), quantum storage circuitry 226, any other suitable circuitry, or any combination thereof. In some embodiments, the apparatus 290 may optionally include one or more of cryptographic circuitry 216 (including, but not limited to, non-PQC cryptographic circuitry 218, PQC cryptographic circuitry 220, and quantum cryptographic circuitry 222), data storage circuitry 236, any other suitable circuitry, or any combination thereof. It will be understood, however, that additional components providing additional functionality may be included in the apparatus 290 without departing from the scope of the present disclosure. The apparatus 290 may be involved in execution of various operations described above with respect to FIGS. 1, 2A, and 2B and below with respect to FIGS. 3A, 3B, 3C, 4, 5, and 6.

It should also be appreciated that, in some embodiments, each of the input-output circuitry 206, communications circuitry 208, classical communications circuitry 210, quantum communications circuitry 212, cryptographic circuitry 216, non-PQC cryptographic circuitry 218, PQC cryptographic circuitry 220, quantum cryptographic circuitry 222, quantum storage circuitry 226, and data storage circuitry 236 may include a separate processor, specially configured FPGA, ASIC, or cloud utility to perform the above functions.

In some embodiments, the hardware components described above with reference to cryptographic circuitry 216, non-PQC cryptographic circuitry 218, PQC cryptographic circuitry 220, quantum cryptographic circuitry 222, quantum storage circuitry 226, and data storage circuitry 236 may, for instance, utilize communications circuitry 208 (including, but not limited to, classical communications circuitry 210, quantum communications circuitry 212, or both) or any suitable wired or wireless communications path to communicate with a QERNG device (e.g., QERNG device 111, QERNG device 113, QERNG device 115, QERNG device 117), a server device (e.g., computing device 110), a client device (e.g., computing device 112), processing circuitry 202, memory 204, input-output circuitry 206, the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 216, non-PQC cryptographic circuitry 218, PQC cryptographic circuitry 220, quantum cryptographic circuitry 222, quantum storage circuitry 226, and data storage circuitry 236 may be hosted locally by the apparatus 290.

In some embodiments, one or more of the cryptographic circuitry 216, non-PQC cryptographic circuitry 218, PQC cryptographic circuitry 220, quantum cryptographic circuitry 222, quantum storage circuitry 226, and data storage circuitry 236 may be hosted remotely (e.g., by one or more cloud servers) and thus need not physically reside on the apparatus 290. Thus, some or all of the functionality described herein may be provided by a third-party circuitry. For example, the apparatus 290 may access one or more third-party circuitries via a networked connection configured to transmit and receive data and electronic information between the apparatus 290 and the third-party circuitries. In another example, the apparatus 290 may access one or more third-party circuitries (e.g., quantum storage circuitries, quantum one-time pad generation circuitries) via one or more quantum lines and infrastructures configured to transmit and receive quantum particles, such as entangled quantum particles and quantum one-time pads, between the apparatus 290 and the third-party circuitries. In turn, the apparatus 290 may be in remote communication with one or more of the cryptographic circuitry 216, non-PQC cryptographic circuitry 218, PQC cryptographic circuitry 220, quantum cryptographic circuitry 222, quantum storage circuitry 226, and data storage circuitry 236.

Although some of these components of apparatuses 200, 280, and 290 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatuses 200, 280, and 290 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatuses 200, 280, and 290 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of one or more of the apparatuses 200, 280, or 290 may be hosted remotely (e.g., by one or more cloud servers) and thus need not physically reside on the corresponding apparatus 200, 280, or 290. Thus, some or all of the functionality described herein may be provided by third-party circuitry. For example, a given apparatus 200, 280, or 290 may access one or more third-party circuitries via any sort of networked connection that facilitates transmission of data and electronic information between the apparatus 200, 280, or 290 and the third-party circuitries. In another example, a given apparatus 200, 280, or 290 may access one or more third-party circuitries (e.g., quantum one-time pad generation circuitries) via one or more quantum lines and infrastructures configured to transmit and receive quantum particles, such as entangled quantum particles and quantum one-time pads, between the apparatus 200, 280, or 290 and the third-party circuitries. In turn, that apparatus 200, 280, or 290 may be in remote communication with one or more of the other components described above as being comprised by the apparatus 200, 280, or 290.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, QERNG devices, quantum authentication devices, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110, one or more QERNG devices 111, one or more client devices 112, one or more QERNG devices 113, described with reference to FIG. 1 may be embodied by one or more computing devices, servers, data storage devices, quantum devices, or systems that also may include processing circuitry, memory, input-output circuitry, and communications circuitry. For example, a computing device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a computing device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIGS. 2A, 2B, and 2C. Additional description of the mechanics of these components is omitted for the sake of brevity. These device elements, operating together, provide the respective computing systems with the functionality necessary to facilitate the communication of data with the QEA system described herein.

Figure 3A:
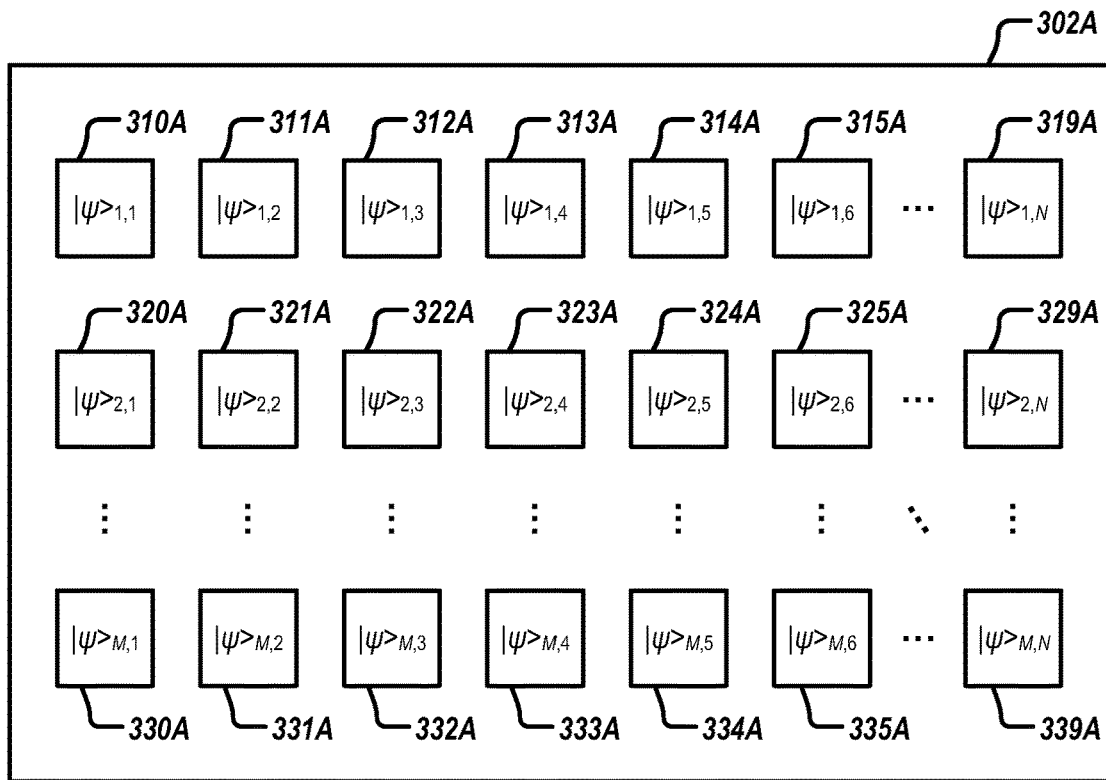
FIGS. 3A, 3B, and 3C illustrate example sets of quantum particles in accordance with some example embodiments described herein.
Figure 3A:
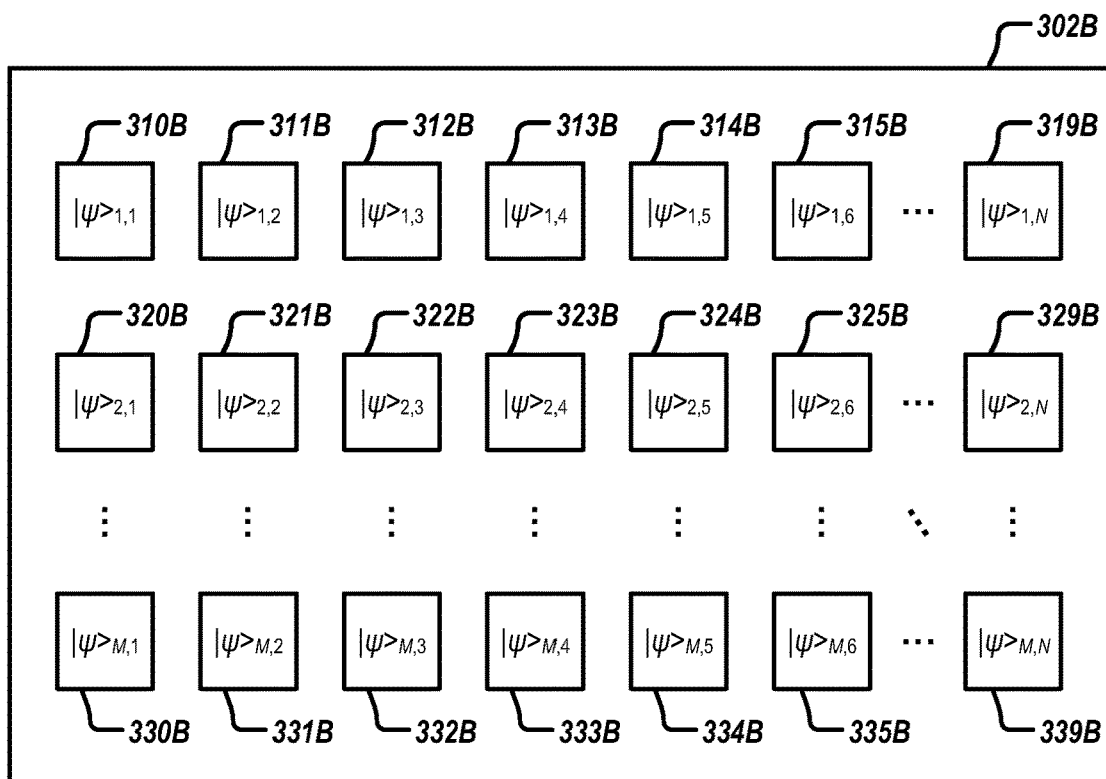
Figure 3B:
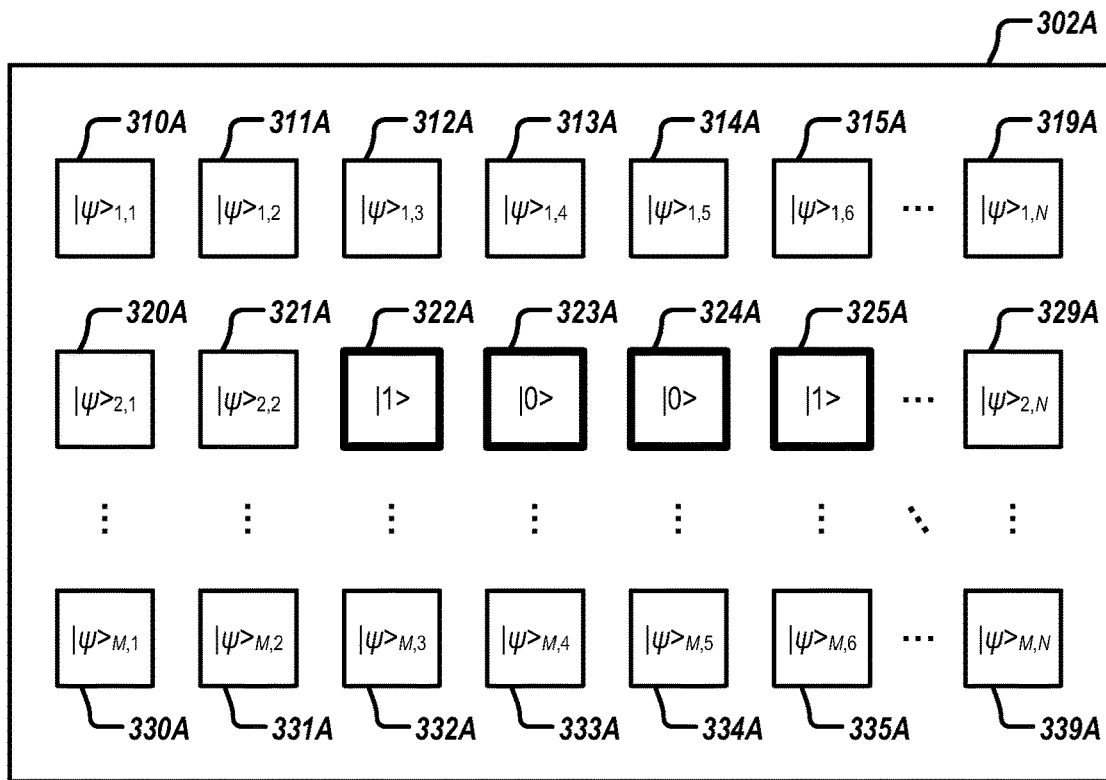
Figure 3B:
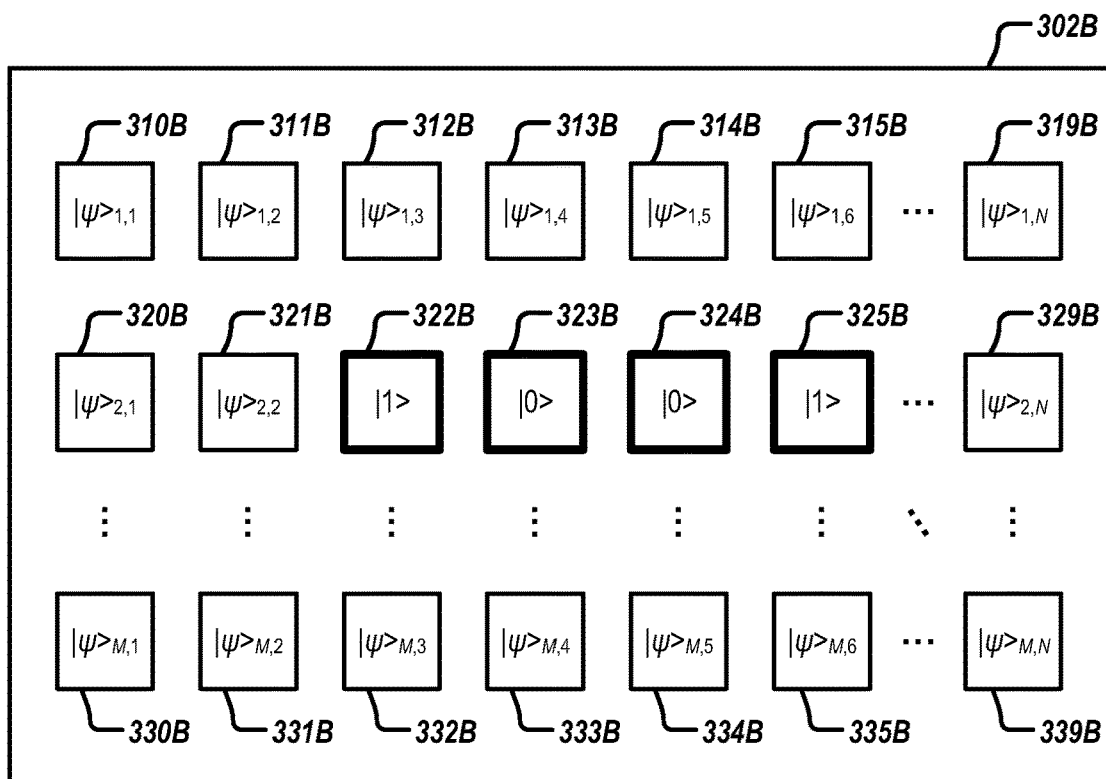
Figure 3C:
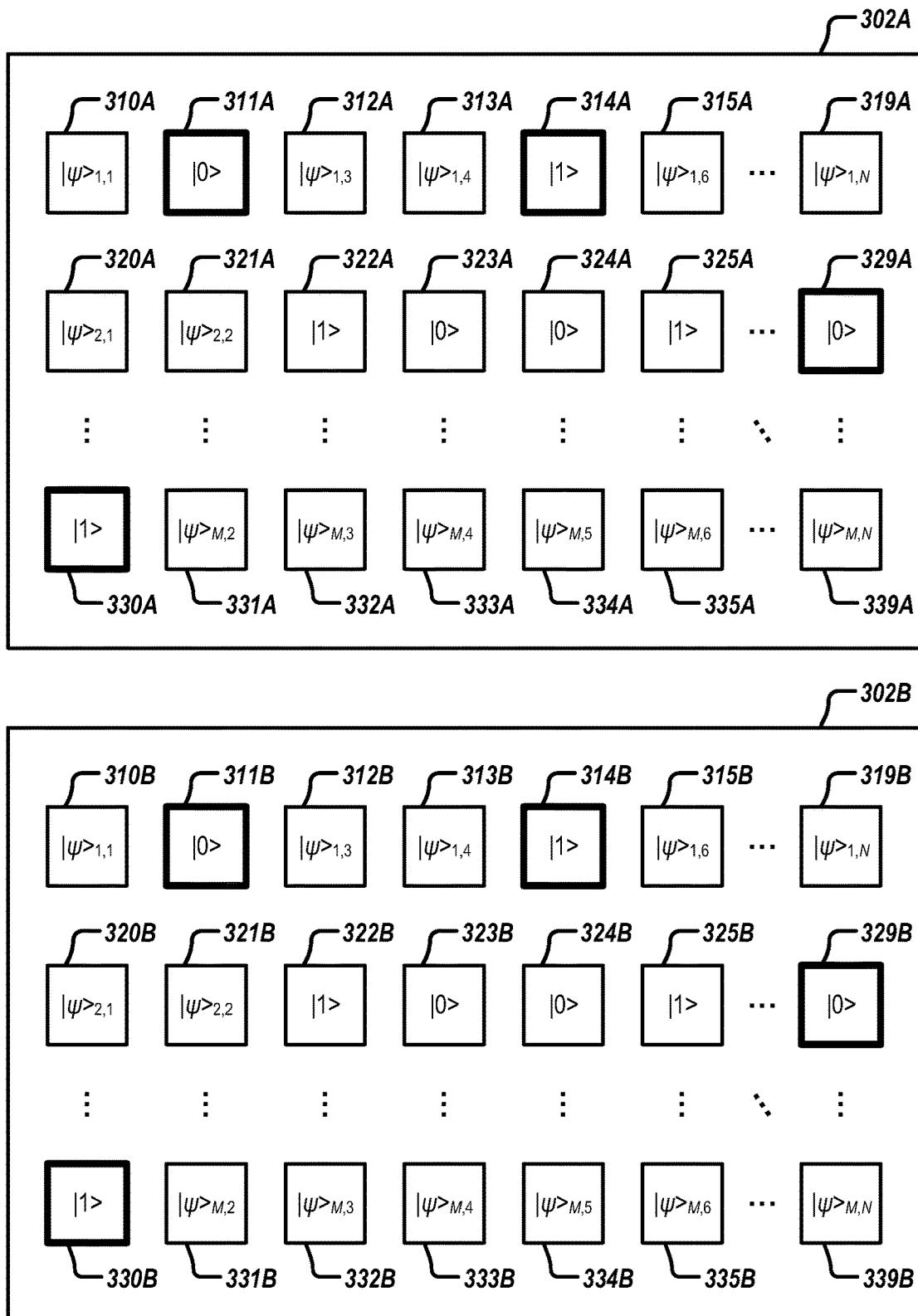

FIGS. 3A, 3B, and 3C illustrate example sets of quantum particles in accordance with some example embodiments described herein.

FIG. 3A illustrates an example environment 300 comprising an example first quantum one-time pad 302A and an example second quantum one-time pad 302B at a first time. The first time may correspond, for example, to a time prior to measurement of any entangled quantum particle, when each entangled quantum particle in the example first quantum one-time pad 302A is entangled with a respective entangled quantum particle in the example second quantum one-time pad 302B. In some embodiments, each of the example first quantum one-time pad 302A and the example second quantum one-time pad 302B may comprise a respective set of entangled quantum particles stored (e.g., maintained) in a respective M×N matrix of quantum storage cells, where M is an integer greater than or equal to one, where N is an integer greater than or equal to one, and where M may or may not be equal to N.

In some embodiments, the example first quantum one-time pad 302A may be associated with a first computing device (e.g., the computing device 110, the QERNG device 111, or both). In some embodiments, the example first quantum one-time pad 302A may comprise an example first set of entangled quantum particles $\{|\psi\rangle_{1,1}, \ldots, |\psi\rangle_{M,N}\}$ (e.g., where the symbol "$\psi$" denotes an indeterminate quantum state) stored in an example first set of quantum storage cells {310A, 311A, 312A, 313A, 314A, 315A, 319A, 320A, 321A, 322A, 323A, 324A, 325A, 329A, 330A, 331A, 332A, 333A, 334A, 335A, 339A} disposed within the first computing device, within a first quantum authentication device communicatively coupled to the first computing device, or within the QEA system (e.g., the QEA system 102). In some embodiments, each entangled quantum particle in the example first quantum one-time pad 302A may be stored in a respective quantum storage cell in the example first set of quantum storage cells.

In some embodiments, the example second quantum one-time pad 302B may be associated with a second computing device (e.g., the computing device 112, the QERNG device 113, or both). In some embodiments, the example second quantum one-time pad 302B may comprise an example second set of entangled quantum particles $\{|\psi\rangle_{1,1}, \ldots, |\psi\rangle_{M,N}\}$ stored in an example second set of quantum storage cells {310B, 311B, 312B, 313B, 314B, 315B, 319B, 320B, 321B, 322B, 323B, 324B, 325B, 329B, 330B, 331B, 332B, 333B, 334B, 335B, 339B} disposed within the second computing device, within a second quantum authentication device communicatively coupled to the second computing device, or within the QEA system. In some embodiments, each entangled quantum particle in the example second quantum one-time pad 302B may be stored in a respective quantum storage cell in the example second set of quantum storage cells.

In some embodiments, each entangled quantum particle in the example first set of entangled quantum particles comprised by the example first quantum one-time pad 302A may be entangled with a respective entangled quantum particle in the example second set of entangled quantum particles comprised by the example second quantum one-time pad 302B. For example, the entangled quantum particle $|\psi\rangle_{1,1}$ stored in the quantum storage cell 310A may be entangled with the entangled quantum particle $|\psi\rangle_{1,1}$ stored in the quantum storage cell 310B; the entangled quantum particle $|\psi\rangle_{1,1}$ stored in the quantum storage cell 310A may be entangled with the entangled quantum particle $|\psi\rangle_{1,1}$ stored in the quantum storage cell 310B; and so forth. Generally, each entangled quantum particle $|\psi\rangle_{i,j}$ comprised by the example first quantum one-time pad 302A is entangled with a respective entangled quantum particle $|\psi\rangle_{i,j}$ comprised by the example second quantum one-time pad 302B, where i is an integer greater than or equal to one and less than or equal to M and where j is an integer greater than or equal to one and less than or equal to N.

FIG. 3B illustrates an example environment 380 comprising the example first quantum one-time pad 302A and the example second quantum one-time pad 302B at a second later than the first time (e.g., the example environment 300 shown in FIG. 3A). The second time may correspond, for example, to a time after measurement of a first subset of entangled quantum particles and collapse of a respective first subset of entangled quantum particles onto correlated (e.g., complimentary), or identical, quantum states. The first subset of entangled quantum particles may comprise, for example, P entangled quantum particles, where P represents a key length (e.g., for a first session key, a first symmetric cryptographic key), and where P is an integer greater than or equal to one and less than or equal to the mathematical product of M and N. For example, P may equal 2,048 in a circumstance in which the number and duplicate number described with reference to FIG. 3B is used to generate a 2048-bit session key.

In some embodiments, the second time may correspond to a time after measurement, based on a first set of quantum bases, of an example first subset of the example first set of entangled quantum particles $\{|\psi>_{1,1}, \ldots, |\psi>_{M,N}\}$ comprised by the example first quantum one-time pad 302A. In some embodiments, an example first subset of the first set of entangled quantum particles comprised by the example first quantum one-time pad 302A may comprise, for example, the example first subset $\{\psi>_{2,3}, |\psi>_{2,4}, |\psi>_{2,5}, |\psi>_{2,6}\}$ of the example first set of entangled quantum particles $\{|\psi>_{1,1}, \ldots, |\psi>_{M,N}\}$ stored in the example first subset $\{322A, 323A, 324A, 325A\}$ of the example first set of quantum storage cells $\{310A, \ldots, 339A\}$. The measurement may cause the example first subset $\{|\psi>_{2,3}, |\psi>_{2,4}, |\psi>_{2,5}, |\psi>_{2,6}\}$ of the example first set of entangled quantum particles $\{|\psi>_{1,1}, \ldots, |\psi>_{M,N}\}$ to collapse onto an example first set of measured quantum states $\{|1>, |0>, |0>, |1>\}$ (e.g., an example first set of qubits) for use in generating a number as described herein. In some embodiments, the measurement further may cause a respective first subset $\{|\psi>_{2,3}, |\psi>_{2,4}, |\psi>_{2,5}, |\psi>_{2,6}\}$ of the example second set of entangled quantum particles $\{|\psi>_{1,1}, \ldots, |\psi>_{M,N}\}$ comprised by the example second quantum one-time pad 302B and stored in the example first subset $\{322B, 323B, 324B, 325B\}$ of the example second set of quantum storage cells $\{310B, \ldots, 339B\}$ to collapse onto correlated (e.g., complimentary), or identical, quantum states. Measurement of the collapsed quantum particles based on the first set of quantum bases, in combination with electronic knowledge of whether the measurement produced correlated or identical quantum states, may generate an example second set of measured quantum states $\{|1>, |0>, |0>, |1>\}$ (e.g., an example second set of qubits identical to the example first set of qubits) for use in generating a duplicate number as described herein.

In other embodiments, the second time may correspond to a time after measurement, based on a first set of quantum bases, of an example first subset of the example second set of entangled quantum particles $\{|\psi>_{1,1}, \ldots, |\psi>_{M,N}\}$ comprised by the example second quantum one-time pad 302B. In some embodiments, an example first subset of the second set of entangled quantum particles comprised by the example second quantum one-time pad 302B may comprise, for example, the example first subset $\{|\psi>_{2,3}, |\psi>_{2,4}, |\psi>_{2,5}, |\psi>_{2,6}\}$ of the example second set of entangled quantum particles $\{|\psi>_{1,1}, \ldots, |\psi>_{M,N}\}$ stored in the example first subset $\{322B, 323B, 324B, 325B\}$ of the example second set of quantum storage cells $\{310B, \ldots, 339B\}$. The measurement may cause the example first subset $\{|\psi>_{2,3}, |\psi>_{2,4}, |\psi>_{2,5}, |\psi>_{2,6}\}$ of the example second set of entangled quantum particles $\{|\psi>_{1,1}, \ldots, |\psi>_{M,N}\}$ to collapse onto an example first set of measured quantum states $\{|1>, |0>, |0>, |1>\}$ (e.g., an example first set of qubits) for use in generating a number as described herein. In some embodiments, the measurement further may cause a respective first subset $\{|\psi>_{2,4}, |\psi>_{2,5}, |\psi>_{2,6}\}$ of the example first set of entangled quantum particles $\{|\psi>_{1,1}, \ldots, |\psi>_{M,N}\}$ comprised by the example first quantum one-time pad 302A and stored in the example first subset $\{322A, 323A, 324A, 325A\}$ of the example first set of quantum storage cells $\{310A, \ldots, 339A\}$ to collapse onto correlated (e.g., complimentary), or identical, quantum states. Measurement of the collapsed quantum particles based on the first set of quantum bases, in combination with electronic knowledge of whether the measurement produced correlated or identical quantum states, may generate an example second set of measured quantum states $\{|1>, |0>, |0>, |1>\}$ (e.g., an example second set of qubits identical to the example first set of qubits) for use in generating a duplicate number as described herein.

FIG. 3C illustrates an example environment 382 comprising the example first quantum one-time pad 302A and the example second quantum one-time pad 302B at a third later than the second time (e.g., the example environment 380 shown in FIG. 3B). The third time may correspond, for example, to a time after measurement of a second subset of entangled quantum particles and collapse of a respective second subset of entangled quantum particles onto correlated (e.g., complimentary), or identical, quantum states. The second subset of entangled quantum particles may comprise, for example, S entangled quantum particles, where S represents a key length (e.g., for a second session key, a second symmetric cryptographic key), where S is an integer greater than or equal to one and less than or equal to the mathematical product of M and N, and where S may or may not be equal to P. For example, S may equal 256 in a circumstance in which the number and duplicate number described with reference to FIG. 3C is used to generate an AES-256 cryptographic key.

In some embodiments, the second time may correspond to a time after measurement, based on a second set of quantum bases, of an example second subset of the example first set of entangled quantum particles $\{|\psi>_{1,1}, \ldots, |\psi>_{M,N}\}$ comprised by the example first quantum one-time pad 302A. In some embodiments, an example second subset of the first set of entangled quantum particles comprised by the example first quantum one-time pad 302A may comprise, for example, the example second subset $\{|\psi>_{1,2}, |\psi>_{1,5}, |\psi>_{2,N}, |\psi>_{M,1}\}$ of the example first set of entangled quantum particles $\{|\psi>_{1,1}, \ldots, |\psi>_{M,N}\}$ stored in the example second subset $\{311A, 314A, 329A, 330A\}$ of the example first set of quantum storage cells $\{310A, \ldots, 339A\}$. The measurement may cause the example second subset $\{|\psi>^{1,5}, |\psi>_{2,N}, |\psi>_{M,1}\}$ of the example first set of entangled quantum particles $\{|\psi>_{1,1}, \ldots, |\psi>_{M,N}\}$ to collapse onto an example third set of measured quantum states $\{|0>, |1>, |0>, |1>\}$ (e.g., an example third set of qubits) for use in generating a number as described herein. In some embodiments, the measurement further may cause a respective second subset $\{|\psi>_{1,2}, |\psi>_{1,5}, |\psi>_{2,N}, |\psi>_{M,1}\}$ of the example second set of entangled quantum particles $\{|\psi>_{1,1}, \ldots, |\psi>_{M,N}\}$ comprised by the example second quantum one-time pad 302B and stored in the example second subset {311B, 314B, 329B, 330B} of the example second set of quantum storage cells {310B, . . . , 339B} to collapse onto correlated (e.g., complimentary), or identical, quantum states. Measurement of the collapsed quantum particles based on the second set of quantum bases, in combination with electronic knowledge of whether the measurement produced correlated or identical quantum states, may generate an example fourth set of measured quantum states {|0>, |1>, |0>, |1>} (e.g., an example fourth set of qubits identical to the example third set of qubits) for use in generating a duplicate number as described herein.

In other embodiments, the second time may correspond to a time after measurement, based on a second set of quantum bases, of an example second subset of the example second set of entangled quantum particles $\{|\psi>_{1,1}, \ldots, |\psi>_{M,N}\}$ comprised by the example second quantum one-time pad 302B. In some embodiments, an example second subset of the second set of entangled quantum particles comprised by the example second quantum one-time pad 302B may comprise, for example, the example second subset $\{|\psi>_{1,2}, |\psi>_{1,5}, |\psi>_{2,N}, |\psi>_{M,1}\}$ of the example second set of entangled quantum particles $\{|\psi>_{1,1}, \ldots, |\psi>_{M,N}\}$ stored in the example second subset {311B, 314B, 329B, 330B} of the example second set of quantum storage cells {310B, . . . , 339B}. The measurement may cause the example second subset $\{|\psi>_{1,2}, |\psi>_{1,5}, |\psi>_{2,N}, |\psi>_{M,1}\}$ of the example second set of entangled quantum particles $\{|\psi_{1,1}, \ldots, |\psi>_{M,N}\}$ to collapse onto an example third set of measured quantum states {|0>, |1>, |0>, |1>} (e.g., an example third set of qubits) for use in generating a number as described herein. In some embodiments, the measurement further may cause a respective second subset $\{|\psi>_{1,2}, |\psi>_{1,5}, |\psi>_{2,N}, |\psi>_{M,1}\}$ of the example first set of entangled quantum particles $\{|\psi>_{1,1}, \ldots, |\psi>_{M,N}\}$ comprised by the example first quantum one-time pad 302A and stored in the example second subset {311A, 314A, 329A, 330A} of the example first set of quantum storage cells {310A, . . . , 339A} to collapse onto correlated (e.g., complimentary), or identical, quantum states. Measurement of the collapsed quantum particles based on the second set of quantum bases, in combination with electronic knowledge of whether the measurement produced correlated or identical quantum states, may generate an example fourth set of measured quantum states {|0>, |1>, |0>, |1>} (e.g., an example fourth set of qubits identical to the example third set of qubits) for use in generating a duplicate number as described herein.

Having described specific components of example devices and circuitries involved in various embodiments contemplated herein, example procedures for quantum one-time pad generation, QERNG, and QEA are described below in connection with FIGS. 4, 5, and 6.

Example Operations for Quantum One-Time Pad Generation, QERNG, and QEA

Figure 4:
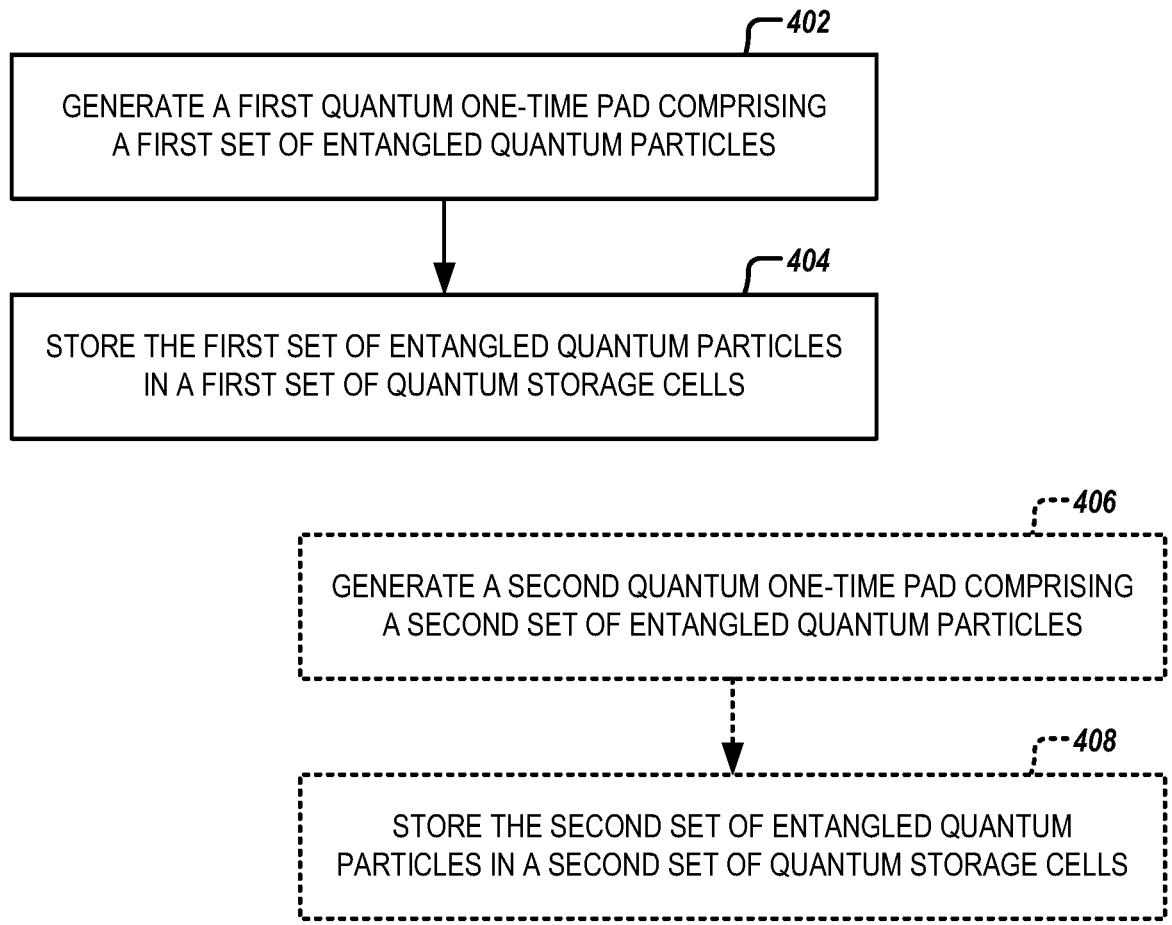
FIG. 4 illustrates an example flowchart for quantum one-time pad generation in accordance with some example embodiments described herein.

FIG. 4 illustrates an example flowchart 400 that contains example operations for quantum one-time pad generation in accordance with some example embodiments described herein. The operations illustrated in FIG. 4 may, for example, be performed by one or more components described with reference to QEA system 102 shown in FIG. 1; by a computing device 110, a QERNG device 111, a computing device 112, or a QERNG device 113, a computing device 114, a QERNG device 115, a remote server device 116, QERNG device 117 in communication with QEA system 102; by apparatus 200 shown in FIG. 2A; by apparatus 280 shown in FIG. 2B; by apparatus 290 shown in FIG. 2C; by one or more components described with reference to example quantum one-time pad 302A or 302B shown in FIG. 3A, 3B, or 3C; or by any combination thereof. In some embodiments, the various operations described in connection with FIG. 4 may be performed by the apparatus 200, the apparatus 280, the apparatus 290, or a combination thereof by or through the use of one or more of input-output circuitry 206, communications circuitry 208, classical communications circuitry 210, quantum communications circuitry 212, QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 402, the apparatus 200 or 280 includes means, such as quantum one-time pad generation circuitry 224 or the like, for generating a first quantum one-time pad comprising a first set of entangled quantum particles. In some embodiments, each entangled quantum particle in the first set of entangled quantum particles may be entangled with a respective entangled quantum particle in a second set of entangled quantum particles comprised by a second quantum one-time pad. In some embodiments, the apparatus 200 or 280 may be configured to generate the first quantum one-time pad based on a splitting of an output of a quantum particle source. For example, the apparatus 200 or 280 may be configured to split the output of the quantum particle source into a first beam of entangled quantum particles and a second beam of entangled quantum particles, wherein each entangled quantum particle in the first beam of entangled quantum particles is entangled with a respective entangled quantum particle in the second beam of entangled quantum particles. Subsequently, the apparatus 200 or 280 may be configured to generate the first quantum one-time pad based on the first beam of entangled quantum particles. In some embodiments, the apparatus 200 or 280 may generate the first quantum one-time pad as described in more detail with reference to FIG. 1, 2A, 2B, 2C, 3A, 3B, 3C, or a combination thereof.

As shown by operation 404, the apparatus 200 or 280 includes means, such as quantum storage circuitry 226 or the like, for storing the first set of entangled quantum particles in a first set of quantum storage cells. In some embodiments, the apparatus 200 or 280 may be configured to store each entangled quantum particle in the first set of entangled quantum particles in a respective quantum storage cell in the first set of quantum storage cells. In some embodiments, the first set of quantum storage cells may comprise a matrix of quantum storage cells, such as an M×N matrix of quantum storage cells, where each of M and N is an integer greater than or equal to one, and where M may or may not be equal to N. In some embodiments, the apparatus 200 or 280 may be configured to store the first quantum one-time pad in a first quantum authentication device (e.g., a first apparatus 290) configured to be communicatively coupled to a first computing device. In some embodiments, the apparatus 200 or 280 may be configured to store the first quantum one-time pad in a first QERNG device configured to be communicatively coupled to a server device. In some embodiments, the apparatus 200 or 280 may be configured to store or maintain the first quantum one-time pad in a centralized location (e.g., QEA system 102) for access by a first computing device, such as a server device or a first QERNG device configured to be communicatively coupled to the server device. In some embodiments, each entangled quantum particle in the first set of entangled quantum particles may be entangled with a respective entangled quantum particle in a second set of entangled quantum particles comprised by a second quantum one-time pad and stored in a second set of quantum storage cells. In some embodiments, the apparatus 200 or 280 may store the first set of entangled quantum particles as described in more detail with reference to FIG. 1, 2A, 2B, 2C, 3A, 3B, 3C, or a combination thereof.

Optionally, as shown by optional operation 406, the apparatus 200 or 280 includes means, such as quantum one-time pad generation circuitry 224 or the like, for generating a second quantum one-time pad comprising a second set of entangled quantum particles. In some embodiments, each entangled quantum particle in the second set of entangled quantum particles may be entangled with a respective entangled quantum particle in the first set of entangled quantum particles comprised by the first quantum one-time pad. In some embodiments, the apparatus 200 or 280 may be configured to generate the second quantum one-time pad based on a splitting of an output of a quantum particle source. For example, the apparatus 200 or 280 may be configured to generate the second quantum one-time pad based on the second beam of entangled quantum particles described above with reference to operation 402. In some embodiments, the apparatus 200 or 280 may generate the second quantum one-time pad as described in more detail with reference to FIG. 1, 2A, 2B, 2C, 3A, 3B, 3C, or a combination thereof.

Optionally, as shown by optional operation 408, the apparatus 200 or 280 includes means, such as quantum storage circuitry 226 or the like, for storing the second set of entangled quantum particles in a second set of quantum storage cells. In some embodiments, the apparatus 200 or 280 may be configured to store each entangled quantum particle in the second set of entangled quantum particles in a respective quantum storage cell in the second set of quantum storage cells. In some embodiments, the second set of quantum storage cells may comprise a matrix of quantum storage cells, such as a P×S matrix of quantum storage cells, where each of P and S is an integer greater than or equal to one, where P may or may not be equal to S or M, and where S may or may not be equal to N. In some embodiments, the apparatus 200 or 280 may be configured to store the second quantum one-time pad in a second quantum authentication device (e.g., a second apparatus 290) configured to be communicatively coupled to a second computing device. In some embodiments, the apparatus 200 or 280 may be configured to store the first quantum one-time pad in a second QERNG device configured to be communicatively coupled to a client device. In some embodiments, the apparatus 200 or 280 may be configured to store or maintain the second quantum one-time pad in a centralized location (e.g., QEA system 102) for access by a second computing device, such as a client device or a second QERNG device configured to be communicatively coupled to the client device. In some embodiments, each entangled quantum particle in the second set of entangled quantum particles may be entangled with a respective entangled quantum particle in the first set of entangled quantum particles comprised by the first quantum one-time pad and stored in the first set of quantum storage cells. In some embodiments, the apparatus 200 or 280 may store the second set of entangled quantum particles as described in more detail with reference to FIG. 1, 2A, 2B, 2C, 3A, 3B, 3C, or a combination thereof.

Optionally (not shown in FIG. 4 for the sake of brevity), the apparatus 200 or 280 includes means, such as quantum one-time pad generation circuitry 224, quantum storage circuitry 226, quantum communications circuitry 212, or the like, for transmitting the first quantum one-time pad to a first computing device, such as a first QERNG device configured to be communicatively coupled to a server device. In some embodiments, the apparatus 200 or 280 may be configured to transmit the second quantum one-time pad to a second computing device, such as a second QERNG device configured to be communicatively coupled to a client device. In some embodiments, the apparatus 200 or 280 may transmit the first quantum one-time pad, the second quantum one-time pad, or both as described in more detail with reference to FIG. 1, 2A, 2B, 2C, 3A, 3B, 3C, or a combination thereof.

In some embodiments, operations 402, 404, 406, and 408 may not necessarily occur in the order depicted in FIG. 4, and in some cases one or more of the operations depicted in FIG. 4 may occur substantially simultaneously, or additional steps may be involved before, after, or between any of the operations shown in FIG. 4.

Figure 5:
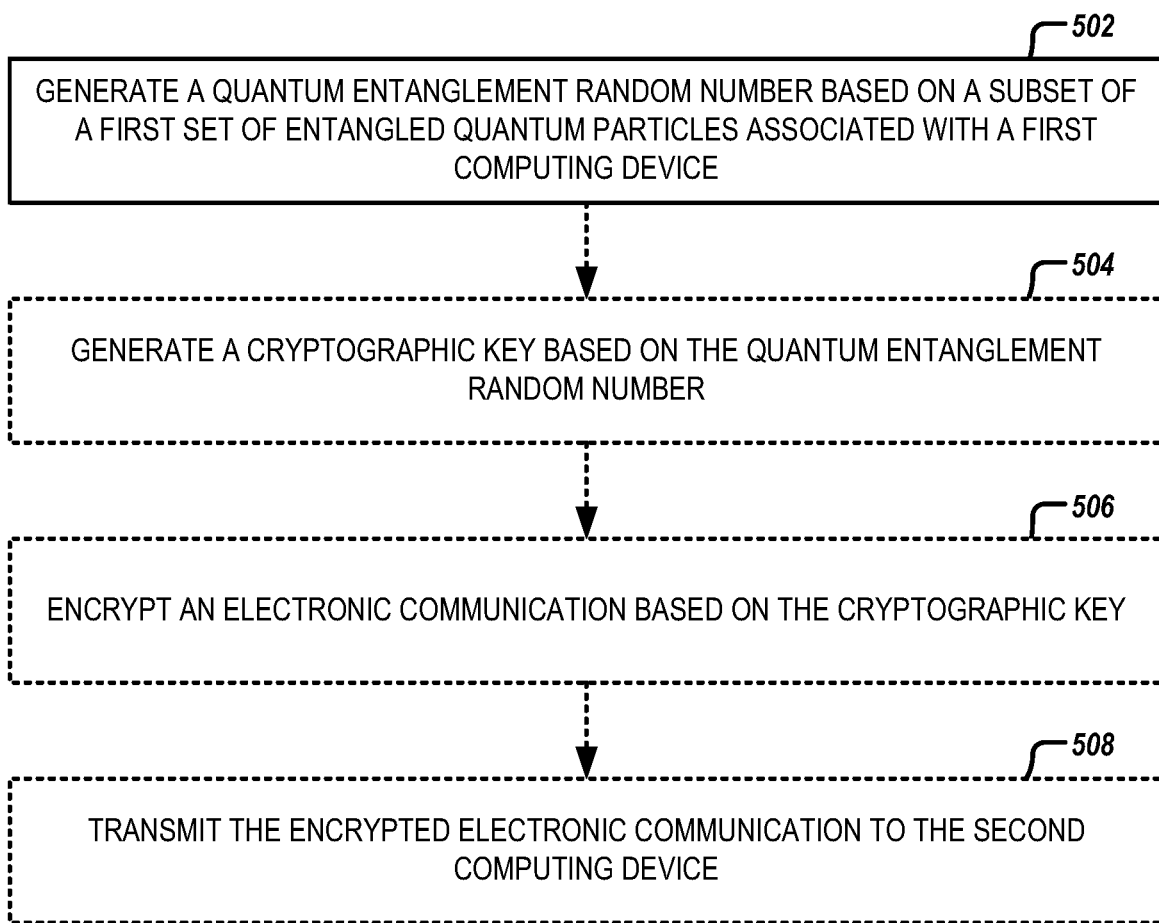
FIG. 5 illustrates an example flowchart for QERNG in accordance with some example embodiments described herein.

FIG. 5 illustrates an example flowchart 500 that contains example operations for QERNG in accordance with some example embodiments described herein. The operations illustrated in FIG. 5 may, for example, be performed by one or more components described with reference to QEA system 102 shown in FIG. 1; by a computing device 110, a QERNG device 111, a computing device 112, or a QERNG device 113 in communication with QEA system 102; by apparatus 200 shown in FIG. 2A; by apparatus 280 shown in FIG. 2B; by apparatus 290 shown in FIG. 2C; by one or more components described with reference to example quantum one-time pad 302A or 302B shown in FIG. 3A, 3B, or 3C; or by any combination thereof. In some embodiments, the various operations described in connection with FIG. 5 may be performed by the apparatus 200, the apparatus 280, the apparatus 290, or a combination thereof by or through the use of one or more of input-output circuitry 206, communications circuitry 208, classical communications circuitry 210, quantum communications circuitry 212, QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, HSM circuitry 274, any other suitable circuitry, and any combination thereof.

Optionally (not shown in FIG. 5 for the sake of brevity), the apparatus 200 or 280 includes means, such as quantum communications circuitry 212 or the like, for receiving a first set of entangled quantum particles associated with a first computing device. In some embodiments, the apparatus 200 or 280 may be configured to receive the first set of entangled quantum particles over a quantum line and store the received first set of entangled quantum particles in a quantum storage device. In some embodiments, the first set of entangled quantum particles may be a first quantum one-time pad stored in a quantum authentication device (e.g., apparatus 290), and the apparatus 200 or 280 may be configured to receive the first set of entangled quantum particles from the quantum authentication device. In some embodiments, the first set of entangled quantum particles may be stored in a remote quantum storage device, and the apparatus 200 or 280 may be configured to receive an electronic identification (including, but not limited to, links or pointers) of the respective quantum storage cell and state (e.g., indeterminate quantum state, measured quantum state, or qubit value) of each entangled quantum particle in the first set of entangled quantum particles. In some embodiments, each entangled quantum particle in the first set of entangled quantum particles may entangled with a respective entangled quantum particle in a second set of entangled quantum particles associated with a second computing device. In some embodiments, the apparatus 200 or 280 may receive the first set of entangled quantum particles as described in more detail with reference to FIG. 1, 2A, 2B, 2C, 3A, 3B, 3C, or a combination thereof.

As shown by operation 502, the apparatus 200 or 280 includes means, such as cryptographic circuitry 216 or the like, for generating a quantum entanglement random number based on a subset of a first set of entangled quantum particles associated with a first computing device. In some embodiments, each entangled quantum particle in the subset of the first set of entangled quantum particles may be entangled with a respective entangled quantum particle in a subset of a second set of entangled quantum particles associated with a second computing device. In some embodiments, the apparatus 200 or 280 may be configured to measure the subset of the first set of entangled quantum particles based on a set of quantum bases and generate the first quantum entanglement random number based on the measured subset of the first set of entangled quantum particles. In some embodiments, the apparatus 200 or 280 may be configured to receive a measurement initiation control signal indicative of an instruction to initiate measurement and measure the subset of the first set of entangled quantum particles in response to receipt of the measurement initiation control signal. In some embodiments, the apparatus 200 or 280 may generate the first quantum entanglement random number as described in more detail with reference to FIG. 1, 2A, 2B, 2C, 3A, 3B, 3C, or a combination thereof.

Optionally, as shown by operation 504, the apparatus 200 includes means, such as the cryptographic circuitry 216 or the like, for generating a cryptographic key based on the quantum entanglement random number. In some embodiments, the cryptographic key may be a symmetric cryptographic key, such an AES cryptographic key (e.g., an AES-256 cryptographic key, an AES-512 cryptographic key). In some embodiments, the cryptographic key may be a quantum asymmetric cryptographic key. In some embodiments, the apparatus 200 may generate the cryptographic key as described in more detail with reference to FIG. 1, 2A, 2B, 2C, 3A, 3B, 3C, or a combination thereof.

Optionally, as shown by optional operation 506, the apparatus 200 or 280 includes means, such as the cryptographic circuitry 216 or the like, for encrypting an electronic communication based on the cryptographic key. In some embodiments, the apparatus 200 or 280 may encrypt the electronic communication as described in more detail with reference to FIG. 1, 2A, 2B, 2C, 3A, 3B, 3C, or a combination thereof.

Optionally, as shown by optional operation 508, the apparatus 200 or 280 includes means, such as communications circuitry 208 or the like, for transmitting the encrypted electronic communication to the second computing device. In some embodiments, the apparatus 200 or may transmit the encrypted electronic communication as described in more detail with reference to FIG. 1, 2A, 2B, 2C, 3A, 3B, 3C, or a combination thereof.

In some embodiments, operations 502, 504, 506, and 508 may not necessarily occur in the order depicted in FIG. 5, and in some cases one or more of the operations depicted in FIG. 5 may occur substantially simultaneously, or additional steps may be involved before, after, or between any of the operations shown in FIG. 5.

Figure 6:
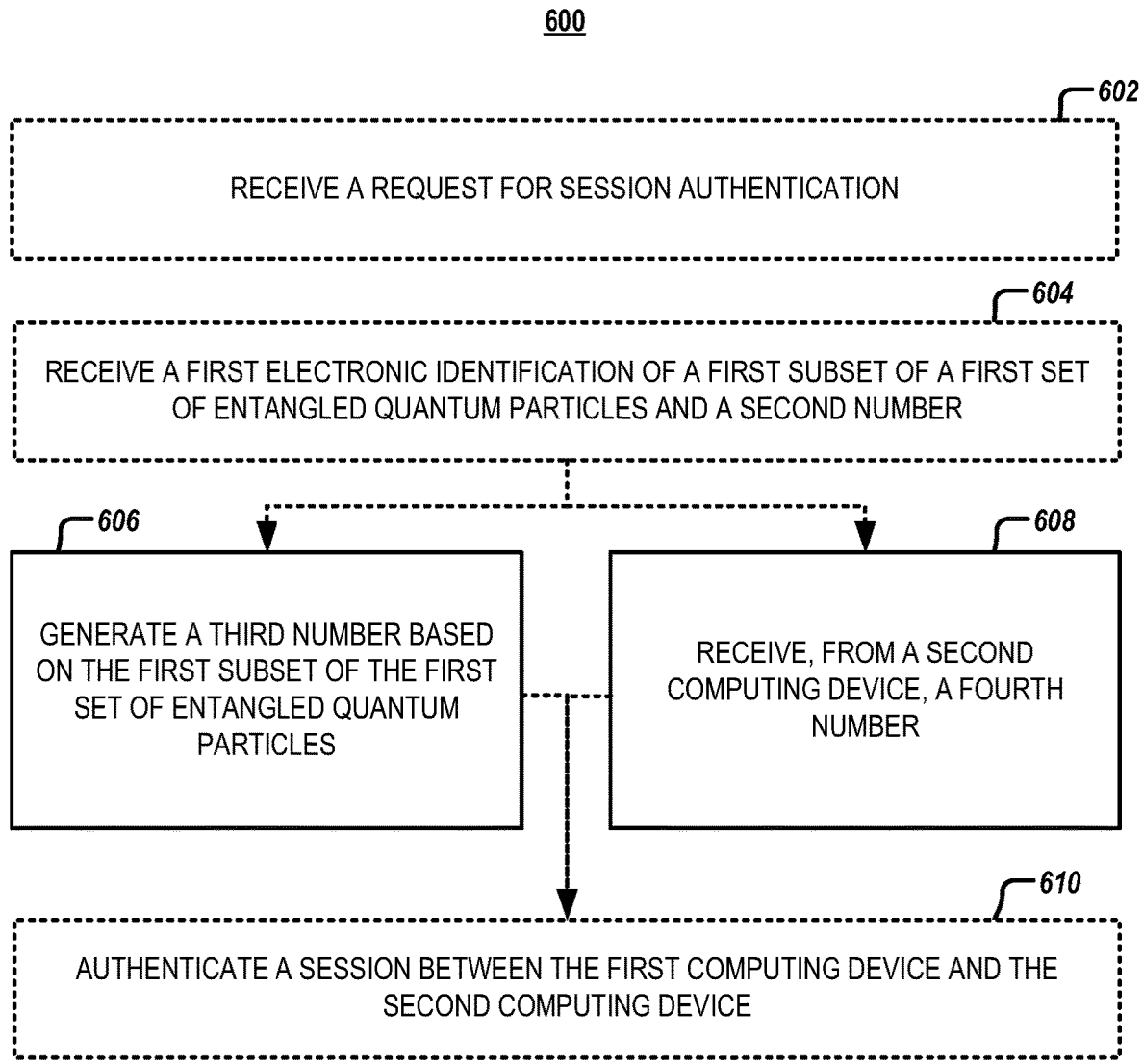
FIG. 6 illustrates an example flowchart for QEA in accordance with some example embodiments described herein.

FIG. 6 illustrates an example flowchart 600 that contains example operations for QEA in accordance with some example embodiments described herein. The operations illustrated in FIG. 6 may, for example, be performed by one or more components described with reference to QEA system 102 shown in FIG. 1; by a computing device 110, a QERNG device 111, a computing device 112, a QERNG device 113, a computing device 114, or a QERNG device 115 in communication with QEA system 102; by apparatus 200 shown in FIG. 2A; by apparatus 280 shown in FIG. 2B; by apparatus 290 shown in FIG. 2C; by one or more components described with reference to example quantum one-time pad 302A or 302B shown in FIG. 3A, 3B, or 3C; or by any combination thereof. In some embodiments, the various operations described in connection with FIG. 5 may be performed by the apparatus 200, the apparatus 280, the apparatus 290, or a combination thereof by or through the use of one or more of input-output circuitry 206, communications circuitry 208, classical communications circuitry 210, quantum communications circuitry 212, QC detection circuitry 214, cryptographic circuitry 216, non-PQC cryptographic circuitry 218, PQC cryptographic circuitry 220, quantum cryptographic circuitry 222, decoding circuitry, quantum basis determination circuitry, quantum one-time pad generation circuitry 224, quantum storage circuitry 226, RNG circuitry 228, PRNG circuitry 230, session authentication circuitry 232, UI circuitry 234, data storage circuitry 236, machine learning circuitry 238, gateway circuitry 264, concentrator circuitry 266, store controller circuitry 268, terminal manager circuitry 270, PoS software upgrade circuitry 272, HSM circuitry 274, any other suitable circuitry, and any combination thereof.

Optionally, as shown by optional operation 602, the apparatus 200 or 280 includes means, such as quantum communications circuitry 212 or the like, for receiving a request to authenticate a session, for example, between the first computing device and the second computing device. In some embodiments, as shown by operation 604, the apparatus 200 or 280 includes means, such as quantum communications circuitry 212 or the like, for receiving, at a first computing device, a first electronic identification of a first subset of a first set of entangled quantum particles and a second number, the second number generated based on a second subset of the first set of entangled quantum particles associated with a second computing device. Similarly, the second computing device may be configured for receiving a second electronic identification of a second subset of a first set of entangled quantum particles and a first number, the first number generated based on a first subset of the first set of entangled quantum particles associated with a first computing device. Each entangled quantum particle in the first set of entangled quantum particles is entangled with a respective entangled quantum particle in a second set of entangled quantum particles.

In some embodiments, the apparatus 200 or 280 may be configured to measure the first subset of the first set of entangled quantum particles based on a first set of quantum bases and measure the second subset of the first set of entangled quantum particles based on a second set of quantum bases. In some embodiments, the apparatus 200 or 280 may be configured to generate the first number based on the measured first subset of the first set of entangled quantum particles, and generate the second number based on the measured second subset of the first set of entangled quantum particles.

The apparatus 200 or 280 may include a first set of quantum storage cells, wherein each entangled quantum particle in the first set of entangled quantum particles is stored in a respective quantum storage cell in the first set of quantum storage cells. Moreover, the first electronic identification of the first subset of the first set of entangled quantum particles may comprise an electronic identification of the respective quantum storage cell of each entangled quantum particle in the first subset of the first set of entangled quantum particles. In some embodiments, the first electronic identification of the first subset of the first set of entangled quantum particles may comprise the first set of quantum bases, and the second electronic identification of the second subset of the first set of entangled quantum particles comprises the second set of quantum bases.

In some embodiments, the apparatus 200 or 280 may be configured to, for example, utilizing the quantum cryptographic circuitry, transmit a measurement initiation control signal indicative of an instruction to initiate measurement; and in response to receipt of the measurement initiation control signal, cause measurement of the first subset of the first set of entangled quantum particles and the second subset of the first set of entangled quantum particles. In some embodiments, the apparatus 200 or 280, as shown by operation 606, may be configured to then receive the third number. Once the first computing device 110 is in possession of the third number, a first session key may be generated, for example, based on the second number, which the first computing device 110, already possessed, and the newly received third number. In some embodiments, the second computing device may receive the fourth number and once the second computing device 112 is in possession of the fourth number, a second session key may be generated, for example, based on the first number, which the second computing device already possessed, and the newly received fourth number.

Subsequently, in some embodiments, as shown by operation 608, the apparatus 200 or 280 includes means, such as quantum communications circuitry 212 or the like, for receiving, for example, from the second computing device 112, a fourth number, or in some embodiments the first number and the fourth number, or in some embodiments, the second session key, the generation of which being based on the first number and the fourth number.

Finally, as shown by optional operation 610, the apparatus 200 or 280 includes means, such as quantum communications circuitry 212 or the like, for authenticating a session between the first computing device and the second computing device. For example, the apparatus 200 or 280 includes means, such as quantum communications circuitry 212 or the like, for receiving the first session key from the first computing device 110 and the second session key from the second computing device 112, and, for example, utilizing session authentication circuitry, in an instance in which the first session key corresponds to the second session key to authenticate a session between the first computing device and the second computing device.

In some embodiments, the apparatus 200 or 280 includes means, such as quantum communications circuitry 212 or the like, for receiving, from the second computing device, a first number and a fourth number. Subsequently, in some embodiments, computing device 110 may be configured to authenticate a session between the first computing device 110 and second computing device 112, for example, by session authentication circuitry of the first computing device, in an instance in which the third number corresponds to the first number and the fourth number corresponds to the second number, a session between the first computing device and the second computing device.

In some embodiments, the third number and the fourth number are determined and/or calculated, for example, by (i) measuring, using the set of quantum bases identified by the electronic identification, the subset of the second set of entangled quantum particles that corresponds to the subset of the first set of quantum particles identified by the electronic identification and (ii) generating the third and fourth number respectively based on the measured subset of the second set of entangled quantum particles. In particular, the measurement of the first subset of the first set of entangled quantum particles will have caused the corresponding subset of the second set of entangles quantum particles to collapse such that the subsequent measurement of the subset of the second set of entangled quantum particles yields identical, or correlated (e.g., complimentary), results. In such a case, the third and fourth numbers, respectively, generated based on that measurement will be a duplicate (e.g., identical, or complimentary) of the first and second numbers and have the same degree of randomness as the first and second numbers. In some embodiments, the apparatus 200 or 280 may receive the third and fourth numbers as described in more detail with reference to FIG. 1, 2A, 2B, 2C, 3A, 3B, 3C, or a combination thereof.

Specifically, the apparatus 200 or 280 includes means, such as session authentication circuitry 232 or the like, for authenticating a session between the first computing device and the second computing device in an instance in which the third number corresponds to the first number and the fourth number corresponds to the second number. In some embodiments, the third number may correspond to the first number when the third number is correlated (e.g., complimentary) or identical to the first number. In some embodiments, the fourth number may correspond to the second number when the fourth number is correlated (e.g., complimentary) or identical to the second number. In some embodiments, the apparatus 200 or may authenticate the session as described in more detail with reference to FIG. 1, 2A, 2B, 2C, 3A, 3B, 3C, or a combination thereof.

In some embodiments, operations 602, 604, 606, 608, 610, and 612 may not necessarily occur in the order depicted in FIG. 6, and in some cases one or more of the operations depicted in FIG. 6 may occur substantially simultaneously, or additional steps may be involved before, after, or between any of the operations shown in FIG. 6.

FIGS. 4, 5, and 6 thus illustrate flowcharts describing the operation of various systems (e.g., QEA system 102 described with reference to FIG. 1), apparatuses (e.g., apparatus 200 described with reference to FIG. 2A; apparatus 280 described with reference to FIG. 2B; apparatus 290 described with reference to FIG. 2C), methods, and computer program products according to example embodiments contemplated herein. It will be understood that each operation of each flowchart, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200, 280, 290) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 4, 5, and 6 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

Conclusion

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the QEA system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for Quantum Entanglement Authentication, the method comprising:
receiving, by a first computing device and from a remote server, a first electronic identification of a first subset of a first set of entangled quantum particles and a second number, the second number generated based on a second subset of the first set of entangled quantum particles associated with a second computing device,
wherein each entangled quantum particle in the first set of entangled quantum particles is entangled with a respective entangled quantum particle in a second set of entangled quantum particles;
receiving, by the first computing device and from the second computing device, a first number having been generated based on a first subset of the second set of entangled quantum particles and a fourth number having been generated based on a second subset of the second set of entangled quantum particles;

generating, by the first computing device, a third number based on the first subset of the first set of entangled quantum particles; and authenticating, by session authentication circuitry of the first computing device and based upon the third number being identical or complimentary to the first number and the fourth number being identical or complimentary to the second number, a session between the first computing device and the second computing device.

2. The method of claim 1, wherein the generation of the third number is based on a measurement of the first subset of the second set of entangled quantum particles, which would have collapsed upon a previous measurement of the first subset of the first set of entangled quantum particles.

3. The method of claim 1, wherein generation of the first number causes generation of the third number based on a measurement of the first subset of the second set of entangled quantum particles.

4. The method of claim 1, wherein the method further comprises:
generating, by the session authentication circuitry of the first computing device, a first session key based on the second number and the third number;
receiving an electronic communication from the second computing device, the electronic communication comprising a second session key, the second session key based on the first number and the fourth number; and
authenticating, by the session authentication circuitry of the first computing device, based on the first session key matching the second session key.

5. The method of claim 4, wherein the first session key is a mathematical product of the second number and the third number.

6. The method of claim 1, further comprising:
transmitting, to the remote server, a measurement initiation control signal indicative of an instruction to initiate measurement of the first subset of the first set of entangled quantum particles.

7. The method of claim 1,
generating a cryptographic key based on the second number and the third number; and
encrypting a second electronic communication based on the cryptographic key,
transmitting the second electronic communication to the second computing device.

8. The method of claim 7, wherein the cryptographic key is a symmetric cryptographic key.

9. The method of claim 7, wherein the cryptographic key is a quantum asymmetric cryptographic key.

10. The method of claim 7, further comprising:
measuring, by cryptographic circuitry of the first computing device, the first subset of the first set of entangled quantum particles based on a first set of quantum bases; and
generating, by the cryptographic circuitry of the first computing device, the third number based on the first set of quantum bases.

11. The method of claim 1, further comprising:
receiving a time-dependent quantum measurement schedule comprising a plurality of subsets of the first set of entangled quantum particles respectively corresponding to a plurality of time periods and a plurality of sets of quantum bases.

12. The method of claim 11, further comprising:
determining, by cryptographic circuitry of the first computing device, the first subset of the first set of entangled quantum particles based on the time-dependent quantum measurement schedule and a measurement time value,
wherein the first electronic identification of the first subset of the first set of entangled quantum particles comprises an electronic indication of the measurement time value.

13. The method of claim 1, further comprising:
receiving a sequence-dependent quantum measurement schedule comprising a plurality of subsets of the first set of entangled quantum particles respectively corresponding to a plurality of sequence identifiers and a plurality of sets of quantum bases.

14. The method of claim 13, further comprising:
determining, by cryptographic circuitry of the first computing device, the first subset of the first set of entangled quantum particles based on the sequence-dependent quantum measurement schedule and a measurement sequence value,
wherein the first electronic identification of the first subset of the first set of entangled quantum particles comprises an electronic indication of the measurement sequence value.

15. The method of claim 1, further comprising:
receiving a third-party number, the third-party number generated based on a third subset of the first set of entangled quantum particles associated with a third computing device.

16. The method of claim 15, further comprising:
generating an updated session key based on the second number, the third number, and the third-party number.

17. The method of claim 16, wherein the updated session key is a mathematical product of the second number, the third number, and the third-party number.

18. The method of claim 16, further comprising:
receiving, from one or both of the second computing device and the third computing device, a second updated session key; and
authenticating the updated session key, by the session authentication circuitry of the first computing device, based on the updated session key matching the second updated session key.

19. A system for quantum entanglement authentication, the system comprising:
quantum cryptographic circuitry;
classical communications circuitry; and
session authentication circuitry,
wherein the classical communications circuitry is configured to:
receive, by a first computing device and from a remote server, a first electronic identification of a first subset of a first set of entangled quantum particles and a second number, the second number generated based on a second subset of the first set of entangled quantum particles associated with a second computing device,
wherein each entangled quantum particle in the first set of entangled quantum particles is entangled with a respective entangled quantum particle in a second set of entangled quantum particles; and
receive, by the first computing device and from the second computing device, a first number having been generated based on a first subset of the second set of entangled quantum particles and a fourth number having been generated based on a second subset of the second set of entangled quantum particles, wherein the session authentication circuitry is configured to:
  generate a third number based on the first subset of the first set of entangled quantum particles; and
  authenticate, based upon the third number being identical or complimentary to the first number and the fourth number being identical or complimentary to the second number, a session between the first computing device and the second computing device.

20. A computer program product for quantum entanglement authentication, the computer program product comprising at least one non-transitory computer-readable storage medium storing program instructions that, when executed, cause a system to:
  receive, by a first computing device and from a remote server, a first electronic identification of a first subset of a first set of entangled quantum particles and a second number, the second number generated based on a second subset of the first set of entangled quantum particles associated with a second computing device, wherein each entangled quantum particle in the first set of entangled quantum particles is entangled with a respective entangled quantum particle in a second set of entangled quantum particles;
  receive, by the first computing device and from the second computing device, a first number having been generated based on a first subset of the second set of entangled quantum particles and a fourth number having been generated based on a second subset of the second set of entangled quantum particles;
  generate, by the first computing device, a third number based on the first subset of the first set of entangled quantum particles; and
  authenticate, by session authentication circuitry of the first computing device and based upon the third number being identical or complimentary to the first number and the fourth number being identical or complimentary to the second number, a session between the first computing device and the second computing device.

* * * * *